US012162125B2

(12) United States Patent
Bandy et al.

(10) Patent No.: US 12,162,125 B2
(45) Date of Patent: Dec. 10, 2024

(54) POWERED FASTENER DRIVER

(71) Applicant: MILWAUKEE ELECTRIC TOOL CORPORATION, Brookfield, WI (US)

(72) Inventors: Nathan Bandy, Wauwatosa, WI (US); David S. Koper, Milwaukee, WI (US); David A. Bierdeman, New Berlin, WI (US); Andrew J. Weber, Cudahy, WI (US); Andrew R. Wyler, Pewaukee, WI (US); Caleb M. Schober, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/514,198

(22) Filed: Oct. 29, 2021

(65) Prior Publication Data

US 2022/0134525 A1 May 5, 2022

Related U.S. Application Data

(60) Provisional application No. 63/221,078, filed on Jul. 13, 2021, provisional application No. 63/127,805, filed on Dec. 18, 2020, provisional application No. 63/107,617, filed on Oct. 30, 2020.

(51) Int. Cl.
*B25C 5/16* (2006.01)
*B25C 5/13* (2006.01)
*B25C 5/15* (2006.01)

(52) U.S. Cl.
CPC .............. *B25C 5/1617* (2013.01); *B25C 5/13* (2013.01); *B25C 5/15* (2013.01); *B25C 5/1665* (2013.01)

(58) Field of Classification Search
CPC ........... B25C 5/1617; B25C 5/13; B25C 5/15; B25C 5/1665; B25F 5/026
See application file for complete search history.

(56) References Cited

U.S. PATENT DOCUMENTS

| | | | |
|---|---|---|---|
| 957,756 | A | 5/1910 | Emanuel |
| 1,311,903 | A | 8/1919 | Leschander |
| 1,478,932 | A | 12/1923 | Wetz et al. |
| 1,510,360 | A | 9/1924 | Rijmenam |
| 1,543,764 | A | 6/1925 | Garford |
| 2,033,613 | A | 3/1936 | Crosby |

(Continued)

FOREIGN PATENT DOCUMENTS

| | | | |
|---|---|---|---|
| CN | 2213049 | Y | 11/1995 |
| CN | 2449881 | Y | 9/2001 |

(Continued)

OTHER PUBLICATIONS

International Search Report and Written Opinion for Application No. PCT/US2021/057219 dated Apr. 13, 2022 (17 pages).

*Primary Examiner* — Thomas M Wittenschlaeger
*Assistant Examiner* — Katie L Gerth
(74) *Attorney, Agent, or Firm* — Michael Best & Friedrich LLP

(57) ABSTRACT

A powered staple driver includes a magazine configured to receive staples and a nosepiece having a staple driving channel from which consecutive staples from the magazine are driven, the staple driving channel extending along a driving axis. The magazine obliquely extends from the nosepiece in both a first plane containing the driving axis and a second plane that is perpendicular to the driving axis.

20 Claims, 41 Drawing Sheets

(56) References Cited

U.S. PATENT DOCUMENTS 2,067,359 A 1/1937 Tumminello
2,111,404 A 3/1938 Pankonin
2,122,814 A 7/1938 Hansen
2,140,593 A 12/1938 Pankonin
2,232,994 A 2/1941 Bernstein
2,275,683 A 3/1942 Rutledge
2,283,814 A 5/1942 Place
2,433,914 A 1/1948 Lang
2,528,685 A 11/1950 Brown
2,641,154 A 6/1953 Heller
2,710,963 A 6/1955 Francis
2,733,440 A 2/1956 Jenny
2,801,415 A 8/1957 Jenny
2,801,417 A 8/1957 Jenny
2,801,418 A 8/1957 Jenny
2,849,715 A 9/1958 Kopf
2,867,807 A 1/1959 Anstett
2,931,040 A 4/1960 Lawler
2,991,477 A 7/1961 Hoyle, Jr. et al.
3,049,715 A 8/1962 Allen
3,060,439 A 10/1962 Dieter
3,128,667 A 4/1964 Tremblay
3,156,920 A 11/1964 Mysiak
3,198,412 A 8/1965 Roosa
3,215,324 A 11/1965 Dorney
3,273,777 A 9/1966 Juilfs et al.
3,347,439 A 10/1967 Doherty
3,347,440 A 10/1967 Doherty
3,463,304 A 8/1969 Gallee et al.
3,510,043 A 5/1970 Larson
3,543,987 A 12/1970 Obergfell et al.
3,568,908 A 3/1971 Bader
3,610,505 A 10/1971 Males et al.
3,611,708 A 10/1971 Moore et al.
3,618,447 A 11/1971 Goins
3,672,029 A 6/1972 Butriss
3,703,981 A 11/1972 Smith
3,708,097 A 1/1973 Fisher
3,742,577 A 7/1973 Buttriss
3,755,949 A 9/1973 Hancox
3,757,629 A 9/1973 Scheider
3,771,709 A 11/1973 Breschinsky
3,786,980 A 1/1974 Passer
3,788,187 A 1/1974 Knohl
3,800,653 A 4/1974 Barth et al.
3,800,654 A 4/1974 Larson
3,811,269 A 5/1974 Larson
3,813,985 A 6/1974 Perkins
3,820,705 A 6/1974 Beals
3,840,165 A 10/1974 Howard
3,847,322 A 11/1974 Smith
3,855,688 A 12/1974 Knohl
3,858,780 A 1/1975 Perkins et al.
3,871,152 A 3/1975 Lindeman
3,874,263 A 4/1975 Barth et al.
3,893,610 A 7/1975 Smith
3,908,884 A 9/1975 Schrepferman
3,934,778 A 1/1976 Males
3,945,293 A 3/1976 Krol
3,969,975 A 7/1976 Krol
3,980,179 A 9/1976 Schrepferman
4,011,785 A 3/1977 Schrepferman
4,014,244 A 3/1977 Larson
4,049,181 A 9/1977 Kametaki
4,053,094 A 10/1977 Males
4,087,035 A 5/1978 Harmon
4,094,342 A 6/1978 Nishikawa et al.
4,139,137 A 2/1979 Gupta
4,187,589 A 2/1980 Jobe, II
4,197,974 A 4/1980 Morton et al.
4,220,070 A 9/1980 Anstett
4,251,017 A 2/1981 Doyle et al.
4,253,598 A 3/1981 Haytayan
4,263,830 A 4/1981 Burstrom
4,265,160 A 5/1981 Martinez
4,304,349 A 12/1981 Novak et al.
4,319,706 A 3/1982 Halstead
4,327,858 A 5/1982 Powers
4,367,837 A 1/1983 Manino
4,380,312 A 4/1983 Landrus
4,389,012 A 6/1983 Grikis et al.
4,436,236 A 3/1984 Jobe
4,454,875 A 6/1984 Pratt et al.
4,463,888 A 8/1984 Geist et al.
4,467,952 A * 8/1984 Morrell, Jr. ........... B25C 5/1665 227/123
4,470,531 A 9/1984 Anstett
4,549,681 A 10/1985 Yamamoto et al.
4,566,621 A 1/1986 Becht
4,570,623 A 2/1986 Ellison et al.
4,597,517 A 7/1986 Wagdy
4,610,381 A 9/1986 Kramer et al.
4,614,291 A 9/1986 Monacelli
4,621,758 A 11/1986 Anstett
4,624,401 A 11/1986 Gassner et al.
4,641,772 A 2/1987 Skuthan
4,667,865 A 5/1987 Judge
4,671,443 A 6/1987 Becht
4,688,710 A 8/1987 Massari, Jr. et al.
4,697,045 A 9/1987 Beatty
4,706,864 A 11/1987 Jacobsen et al.
4,724,839 A 2/1988 Bedi et al.
4,732,309 A 3/1988 Judge
4,767,043 A 8/1988 Canlas, Jr.
4,801,062 A 1/1989 Austin
4,815,647 A 3/1989 Chou
4,836,372 A 6/1989 Shelton
4,858,812 A 8/1989 Fealey
4,903,880 A 2/1990 Austin et al.
4,932,821 A 6/1990 Steffen et al.
4,942,996 A 7/1990 Wolfberg et al.
5,009,356 A 4/1991 Chang
5,038,993 A 8/1991 Schafer et al.
5,053,038 A 10/1991 Sheehan
5,058,315 A 10/1991 Wagner
5,076,481 A 12/1991 Maestri
5,083,694 A 1/1992 Lemos
5,108,422 A 4/1992 Green et al.
5,137,112 A 8/1992 Nichols
5,163,596 A 11/1992 Ravoo et al.
5,197,647 A 3/1993 Howell
5,211,722 A 5/1993 Wagner
5,238,168 A 8/1993 Oda
5,273,200 A 12/1993 Hoefler
5,293,881 A 3/1994 Green et al.
5,297,713 A 3/1994 Perra et al.
5,322,189 A 6/1994 Oda
5,350,103 A 9/1994 Monacelli
5,368,213 A 11/1994 Massari, Jr.
5,433,367 A 7/1995 Liu
5,441,373 A 8/1995 Kish et al.
5,511,714 A * 4/1996 Bauer ..................... B25C 1/047 227/120
5,593,423 A 1/1997 Person et al.
5,626,274 A 5/1997 Shkolnikov et al.
5,642,848 A 7/1997 Ludwig et al.
5,642,849 A 7/1997 Chen
5,649,660 A 7/1997 Akiba et al.
5,658,312 A 8/1997 Green et al.
5,683,024 A 11/1997 Eminger et al.
5,735,444 A 4/1998 Wingert
5,803,338 A 9/1998 Singer et al.
5,839,638 A 11/1998 Ronn
5,873,509 A 2/1999 Liao
5,884,829 A 3/1999 Wingert
5,909,836 A 6/1999 Shkolnikov et al.
5,918,789 A 7/1999 Olvera et al.
5,931,364 A 8/1999 Dennis
5,975,400 A 11/1999 Yang
5,979,735 A 11/1999 Olvera et al.
6,056,182 A * 5/2000 Chen ..................... B25C 5/1665 227/123
6,071,053 A 6/2000 Kuhns
6,076,722 A 6/2000 Huang

(56) References Cited

U.S. PATENT DOCUMENTS 6,082,536 A 7/2000 Ito et al.
6,082,604 A 7/2000 Dennis
6,095,737 A 8/2000 Barker et al.
6,126,372 A 10/2000 Takata
6,131,787 A 10/2000 Curtis
6,145,724 A 11/2000 Shkolnikov et al.
6,189,759 B1 2/2001 Canlas et al.
D440,136 S 4/2001 Buck
6,209,770 B1 4/2001 Perra
6,290,115 B1 9/2001 Chen
6,296,167 B1 10/2001 Jen
6,318,618 B1 11/2001 Jen
6,325,268 B1 12/2001 Liang
6,371,348 B1 4/2002 Canlas et al.
6,386,811 B2 5/2002 Almeras et al.
6,409,068 B1 6/2002 Lee
6,422,447 B1 7/2002 White et al.
6,431,428 B1 8/2002 Chen
6,431,429 B1 8/2002 Canlas et al.
6,431,430 B1 8/2002 Jalbert et al.
6,450,387 B1 * 9/2002 Chen ....................... B25C 1/008 227/8
6,454,152 B1 9/2002 Nayrac et al.
6,481,612 B1 11/2002 Mangone, Jr.
6,488,195 B2 12/2002 White et al.
6,499,643 B1 12/2002 Hewitt
6,554,852 B1 4/2003 Oberlander
6,557,743 B2 5/2003 Schuster
6,592,016 B2 7/2003 Hamano et al.
6,598,776 B2 7/2003 Adachi et al.
6,604,664 B2 8/2003 Robinson
6,609,646 B2 8/2003 Miller et al.
6,612,476 B2 9/2003 Smolinski
6,641,022 B2 11/2003 Hamano et al.
6,648,202 B2 11/2003 Miller et al.
6,651,862 B2 11/2003 Driscoll et al.
6,659,127 B2 12/2003 Keast
6,672,498 B2 1/2004 White et al.
6,675,999 B2 1/2004 Mukoyama et al.
6,679,413 B2 1/2004 Miller et al.
6,679,414 B2 1/2004 Rotharmel
6,685,078 B2 2/2004 Wohlwend et al.
6,763,989 B2 7/2004 Wang
6,769,591 B2 8/2004 Yamamoto et al.
6,772,931 B2 8/2004 Miller et al.
6,779,700 B2 8/2004 Bruins et al.
6,779,958 B2 8/2004 Rosenbaum
6,786,380 B2 9/2004 Driscoll et al.
6,808,101 B2 10/2004 Laubach et al.
6,834,788 B2 12/2004 Popovich et al.
6,880,739 B1 4/2005 Zhu
6,892,921 B2 5/2005 Beville
6,902,092 B2 6/2005 Osuga et al.
6,913,180 B2 7/2005 Schuster
6,915,937 B2 7/2005 Lat et al.
6,926,186 B2 8/2005 Wells
6,938,809 B1 9/2005 Schnell
6,938,812 B2 9/2005 Miller et al.
6,938,813 B1 9/2005 Chen
RE38,834 E 10/2005 Perra
6,957,756 B2 10/2005 Lat et al.
6,968,945 B2 11/2005 Bruins et al.
6,997,367 B2 2/2006 Hu
7,021,514 B2 4/2006 Beville
7,025,242 B1 4/2006 Schnell
7,028,875 B1 4/2006 Beville et al.
7,032,796 B1 4/2006 Lin
7,040,522 B2 5/2006 Osuga et al.
7,044,351 B2 5/2006 Ronconi
7,048,169 B2 5/2006 Sun
7,070,081 B2 7/2006 Tadayoshi et al.
7,070,082 B2 7/2006 Ronconi
7,083,074 B2 8/2006 Chen
7,104,741 B2 9/2006 Krohn
7,108,130 B2 9/2006 Herelier et al.
7,108,709 B2 9/2006 Cummins
7,143,508 B2 12/2006 Schnell et al.
7,156,012 B2 1/2007 Komazaki et al.
7,175,063 B2 2/2007 Osuga et al.
7,175,064 B2 2/2007 Schell et al.
7,185,712 B2 3/2007 Miller et al.
7,225,959 B2 6/2007 Patton et al.
7,243,831 B2 7/2007 Ishizawa et al.
7,284,685 B1 10/2007 Wojcicki
7,314,155 B2 1/2008 Moeller et al.
7,320,422 B2 1/2008 Schell et al.
7,325,709 B2 2/2008 Ishizawa et al.
7,325,711 B2 2/2008 Schiestl et al.
7,328,494 B2 2/2008 Kitagawa et al.
7,328,826 B2 2/2008 Shkolnikov
7,344,058 B2 3/2008 Bruins et al.
7,398,647 B2 7/2008 Komazaki et al.
7,441,683 B2 10/2008 Ishizawa et al.
7,455,205 B2 11/2008 Pally et al.
7,484,647 B2 2/2009 Yang
7,494,035 B2 2/2009 Weaver et al.
7,494,037 B2 2/2009 Simonelli et al.
7,513,404 B2 4/2009 Shkolnikov et al.
7,516,532 B2 4/2009 Wojcicki
7,527,106 B2 5/2009 Miller et al.
7,549,562 B2 6/2009 Wu et al.
7,600,662 B2 10/2009 Nayrac et al.
7,641,089 B2 1/2010 Schell et al.
7,641,090 B2 1/2010 Ho
7,703,649 B2 4/2010 Wywialowski et al.
7,726,533 B2 6/2010 Wojcicki
7,748,588 B2 7/2010 Osuga et al.
7,794,475 B2 9/2010 Hess et al.
7,802,500 B2 9/2010 Kolodziej et al.
7,815,087 B2 10/2010 Jian
7,887,563 B2 2/2011 Cummins
7,896,212 B2 3/2011 Uejima et al.
7,918,374 B2 4/2011 Gardner et al.
7,918,873 B2 4/2011 Cummins
7,938,305 B2 5/2011 Simonelli et al.
7,950,556 B2 5/2011 Hagan
7,959,049 B2 6/2011 Dittrich et al.
7,963,393 B2 6/2011 Nakagawa et al.
7,971,767 B2 7/2011 Komazaki et al.
7,971,768 B2 7/2011 Wywialowski et al.
7,980,441 B2 7/2011 Dittrich et al.
8,006,882 B2 8/2011 Kameda et al.
8,006,883 B2 8/2011 Schell et al.
8,007,512 B2 8/2011 Ginn et al.
8,011,411 B2 9/2011 Eitel et al.
8,011,441 B2 9/2011 Leimbach et al.
8,011,547 B2 9/2011 Leimbach et al.
8,033,394 B2 10/2011 Nakagawa et al.
8,047,366 B2 11/2011 Nakagawa et al.
8,047,414 B2 11/2011 Kunz et al.
8,061,437 B2 11/2011 Liang
8,066,165 B2 11/2011 Ishizawa et al.
RE42,987 E 12/2011 Akiba
8,074,855 B2 12/2011 Johnson
8,083,454 B2 12/2011 Doole
8,087,440 B2 1/2012 Preisner et al.
8,109,386 B2 2/2012 Krohn
8,118,204 B2 2/2012 Ishida et al.
8,181,836 B2 5/2012 Shkolnikov et al.
8,201,605 B2 6/2012 Preisner et al.
8,205,778 B2 6/2012 Wang
D662,808 S 7/2012 Vandenberg
8,230,941 B2 7/2012 Leimbach et al.
8,251,271 B2 8/2012 Nakano et al.
8,267,296 B2 9/2012 Leimbach et al.
8,267,297 B2 9/2012 Leimbach et al.
8,282,328 B2 10/2012 Gardner et al.
8,286,722 B2 10/2012 Leimbach et al.
8,292,144 B2 10/2012 Maltais et al.
8,328,012 B2 12/2012 Miescher
8,376,204 B2 2/2013 Buetow et al.
D677,147 S 3/2013 Vandenberg
8,387,718 B2 3/2013 Leimbach et al.
8,413,867 B2 4/2013 Gardner et al.

(56) References Cited

U.S. PATENT DOCUMENTS 8,453,901 B2 6/2013 Suda
8,480,343 B2 7/2013 Vandenberg
8,485,407 B2 7/2013 Liu et al.
8,505,798 B2 8/2013 Simonelli et al.
8,523,506 B2 9/2013 MacDonald et al.
8,556,148 B2 10/2013 Schell et al.
D693,210 S 11/2013 Vandenberg
8,602,282 B2 12/2013 Leimbach et al.
8,631,986 B2 1/2014 Hlinka et al.
8,657,173 B2 2/2014 Uejima et al.
8,672,204 B2 3/2014 Vandenberg
8,679,123 B2 3/2014 Kinmon et al.
8,690,036 B2 4/2014 Schell et al.
8,721,244 B2 5/2014 Nakagawa et al.
8,728,099 B2 5/2014 Cohn et al.
8,728,119 B2 5/2014 Cummins
8,729,098 B2 5/2014 Daniel et al.
8,733,609 B2 5/2014 Weigmann et al.
8,747,043 B2 6/2014 Vandenberg
8,763,874 B2 7/2014 Mccardle et al.
8,800,835 B2 8/2014 Perron et al.
8,808,325 B2 8/2014 Hess et al.
8,833,628 B2 9/2014 Schwartzenberger
8,834,659 B2 9/2014 Preisner et al.
8,888,826 B2 11/2014 Kinmon et al.
8,893,943 B2 11/2014 Wywialowski et al.
8,894,669 B2 11/2014 Nering et al.
8,899,460 B2 12/2014 Wojcicki
8,905,284 B2 12/2014 Kunz et al.
8,925,644 B2 1/2015 Vandenberg
8,939,340 B2 1/2015 Gardner et al.
8,955,210 B2 2/2015 Vandenberg
8,960,087 B2 2/2015 Preisner et al.
9,051,726 B2 6/2015 Vandenberg
9,055,945 B2 6/2015 Miksza et al.
9,107,661 B2 8/2015 Euteneuer et al.
9,109,711 B2 8/2015 Mattson et al.
9,120,214 B2 9/2015 Vandenberg
9,121,427 B2 9/2015 Young
9,125,650 B2 9/2015 Euteneuer et al.
9,144,896 B2 9/2015 Vandenberg
9,238,298 B2 1/2016 Wu et al.
9,246,421 B2 1/2016 Lim
9,469,021 B2 10/2016 Gregory et al.
9,473,053 B2 10/2016 Lim et al.
9,486,904 B2 11/2016 Gregory et al.
9,498,871 B2 11/2016 Gregory et al.
9,616,557 B2 4/2017 Hays et al.
9,623,544 B2 4/2017 Yang et al.
9,630,305 B1 4/2017 Litzinger
9,643,305 B2 5/2017 Gregory et al.
9,649,755 B2 5/2017 Gregory et al.
9,649,756 B1 5/2017 Litzinger
9,656,376 B2 5/2017 Maltais et al.
9,657,761 B2 5/2017 Yang et al.
9,676,088 B2 6/2017 Leimbach et al.
9,751,197 B2 9/2017 Vandenberg
9,770,819 B2 9/2017 Lam et al.
9,784,296 B2 10/2017 Vandenberg
9,796,072 B2 10/2017 Young
9,802,300 B2 10/2017 Vandenberg
9,808,924 B2 11/2017 Wu
9,827,658 B2 11/2017 Gregory et al.
9,868,196 B2 1/2018 Chien
9,908,226 B1 3/2018 Litzinger
10,022,848 B2 7/2018 Gross et al.
10,058,985 B2 8/2018 Raggl et al.
10,076,830 B2 9/2018 Raggl et al.
10,130,359 B2 11/2018 Hess et al.
10,150,208 B2 12/2018 Lin
10,173,310 B2 1/2019 Wyler et al.
10,315,295 B2 6/2019 Vandenberg
10,350,741 B2 7/2019 Brendel et al.
10,393,282 B2 8/2019 Farah et al.
10,406,661 B2 9/2019 Hays et al.
10,414,033 B2 9/2019 Ekstrom et al.
10,434,634 B2 10/2019 Garbe
10,436,236 B2 10/2019 Hodsdon et al.
10,443,642 B2 10/2019 Smeaton et al.
10,471,579 B2 11/2019 Zhang
10,478,954 B2 11/2019 Leimbach et al.
10,500,705 B2 12/2019 French
10,518,398 B2 12/2019 Wang et al.
10,549,412 B2 2/2020 McCardle et al.
10,556,331 B2 2/2020 Chien
10,563,685 B2 2/2020 Tao
10,625,407 B2 4/2020 Sato et al.
10,632,600 B2 4/2020 Pomeroy et al.
10,632,601 B2 4/2020 Pomeroy et al.
10,632,604 B2 4/2020 Perron et al.
10,639,779 B2 5/2020 Wang et al.
10,702,980 B2 7/2020 Pomeroy et al.
10,710,227 B2 7/2020 Pomeroy et al.
10,717,179 B2 7/2020 Koenig et al.
10,730,172 B2 8/2020 Po
10,744,630 B2 8/2020 Pomeroy et al.
10,766,127 B2 9/2020 Curtis et al.
10,821,585 B2 11/2020 Kabbes et al.
10,821,586 B2 11/2020 Wu et al.
10,838,365 B2 11/2020 Podvin et al.
10,843,317 B2 11/2020 Sato et al.
10,843,318 B2 * 11/2020 Kobori .................... B25C 1/047
10,875,166 B2 * 12/2020 Ueda ....................... B25C 1/047
10,890,266 B2 1/2021 Farah et al.
10,898,994 B2 * 1/2021 Carrier ...................... B25C 1/06
10,908,557 B2 2/2021 Podvin et al.
10,926,385 B2 2/2021 Myers et al.
10,926,390 B2 2/2021 Dittrich et al.
10,946,506 B1 3/2021 Ueda
10,967,491 B2 4/2021 Yasutomi et al.
11,034,007 B2 6/2021 Leimbach et al.
11,072,058 B2 7/2021 Wyler et al.
11,098,811 B2 8/2021 Meshaikhis et al.
2002/0017548 A1 2/2002 Jalbert et al.
2002/0117531 A1 8/2002 Schell et al.
2003/0019903 A1 1/2003 Lin
2003/0021655 A1 1/2003 Correll et al.
2003/0022211 A1 1/2003 Blatcher et al.
2003/0057248 A1 3/2003 Bruins et al.
2003/0062394 A1 4/2003 Wang
2003/0116604 A1 6/2003 Driscoll et al.
2003/0146262 A1 8/2003 Hwang et al.
2003/0222116 A1 12/2003 Chen et al.
2004/0084499 A1 5/2004 Tsai
2004/0118720 A1 6/2004 Powers et al.
2004/0238591 A1 12/2004 Kitagawa et al.
2004/0262461 A1 12/2004 Del Re et al.
2005/0001007 A1 1/2005 Butzen et al.
2005/0001008 A1 * 1/2005 Sun ........................... B25C 1/06
227/131
2005/0017047 A1 1/2005 Yao
2005/0145666 A1 7/2005 Lat et al.
2005/0218175 A1 * 10/2005 Schell ..................... B25C 1/188
227/123
2005/0263419 A1 12/2005 Herelier et al.
2006/0011693 A1 1/2006 Wywialowski et al.
2006/0086589 A1 4/2006 Chen
2006/0091177 A1 5/2006 Cannaliato et al.
2006/0102683 A1 5/2006 Schnell et al.
2006/0102685 A1 5/2006 Phillips et al.
2006/0108389 A1 5/2006 Phillips
2006/0108390 A1 5/2006 Schnell et al.
2006/0144888 A1 7/2006 Schnell
2006/0191973 A1 8/2006 Chen et al.
2006/0231582 A1 10/2006 Hong et al.
2006/0243020 A1 11/2006 Herod
2006/0249554 A1 11/2006 Butzen et al.
2007/0039993 A1 * 2/2007 Huang .................... B25C 1/042
227/130
2007/0160443 A1 7/2007 Tseng
2007/0243322 A1 10/2007 Preisner et al.
2007/0251971 A1 11/2007 Ogawa et al.
2008/0017689 A1 1/2008 Simonelli et al.
2008/0035700 A1 2/2008 Huang

(56) References Cited

U.S. PATENT DOCUMENTS

| | | | |
|---|---|---|---|
| 2008/0048000 A1 | 2/2008 | Simonelli et al. | |
| 2008/0067089 A1 | 3/2008 | Zhu | |
| 2008/0067212 A1 | 3/2008 | Wen | |
| 2008/0156844 A1 | 7/2008 | Braganza et al. | |
| 2008/0179371 A1 | 7/2008 | Gardner et al. | |
| 2008/0264998 A1 | 10/2008 | Lee | |
| 2008/0271836 A1 | 11/2008 | Richter et al. | |
| 2008/0296340 A1 | 12/2008 | Wang | |
| 2008/0296342 A1 | 12/2008 | Huang | |
| 2009/0152322 A1 | 6/2009 | Lin | |
| 2009/0242607 A1 | 10/2009 | Liu | |
| 2009/0263187 A1 | 10/2009 | Lee | |
| 2010/0001034 A1 | 1/2010 | Huang | |
| 2010/0133313 A1* | 6/2010 | Nakano | B25C 1/008 227/8 |
| 2010/0230463 A1 | 9/2010 | Yang | |
| 2010/0312275 A1 | 12/2010 | Euteneuer et al. | |
| 2011/0079627 A1 | 4/2011 | Cardinale et al. | |
| 2011/0220702 A1 | 9/2011 | Chen et al. | |
| 2011/0278342 A1 | 11/2011 | Kuo | |
| 2012/0017728 A1 | 1/2012 | Schmidt | |
| 2012/0111916 A1 | 5/2012 | Chen | |
| 2013/0153628 A1 | 6/2013 | Euteneuer | |
| 2013/0181028 A1 | 7/2013 | Wu | |
| 2013/0221056 A1 | 8/2013 | Chen | |
| 2013/0320063 A1 | 12/2013 | Gregory et al. | |
| 2013/0320064 A1 | 12/2013 | Gregory et al. | |
| 2014/0021237 A1 | 1/2014 | Chang | |
| 2014/0197222 A1 | 7/2014 | Howe | |
| 2014/0361066 A1 | 12/2014 | Liu et al. | |
| 2015/0063940 A1 | 3/2015 | Marczynski | |
| 2015/0136828 A1 | 5/2015 | Li | |
| 2015/0202755 A1 | 7/2015 | Tanji | |
| 2015/0306753 A1 | 10/2015 | Po | |
| 2017/0036333 A1 | 2/2017 | Lin | |
| 2017/0066116 A1 | 3/2017 | Garber et al. | |
| 2017/0095917 A1 | 4/2017 | Lai et al. | |
| 2018/0001451 A1 | 1/2018 | Meyer et al. | |
| 2018/0029211 A1 | 2/2018 | Young | |
| 2018/0036870 A1 | 2/2018 | Komazaki et al. | |
| 2018/0071904 A1 | 3/2018 | Gregory et al. | |
| 2018/0085904 A1 | 3/2018 | Gregory et al. | |
| 2018/0093370 A1 | 4/2018 | Yip et al. | |
| 2018/0126529 A1* | 5/2018 | Pomeroy | B25C 1/06 |
| 2018/0126532 A1* | 5/2018 | Pomeroy | B25C 1/06 |
| 2018/0133877 A1* | 5/2018 | Ueda | B25F 5/006 |
| 2018/0207779 A1 | 7/2018 | Marks | |
| 2018/0290279 A1* | 10/2018 | Kobori | B25C 1/047 |
| 2018/0290280 A1 | 10/2018 | Gross et al. | |
| 2018/0318996 A1 | 11/2018 | Bodin et al. | |
| 2019/0077001 A1* | 3/2019 | Wang | B25C 5/11 |
| 2019/0120271 A1 | 4/2019 | Parker et al. | |
| 2019/0126452 A1 | 5/2019 | Po | |
| 2019/0224834 A1 | 7/2019 | Fairbanks et al. | |
| 2019/0255689 A1 | 8/2019 | Leimbach et al. | |
| 2019/0299382 A1 | 10/2019 | Meyer et al. | |
| 2019/0351535 A1 | 11/2019 | Hays et al. | |
| 2019/0375084 A1 | 12/2019 | Bierdeman et al. | |
| 2020/0039043 A1 | 2/2020 | Garber | |
| 2020/0039046 A1 | 2/2020 | Takidis et al. | |
| 2020/0055177 A1 | 2/2020 | Scott et al. | |
| 2020/0094389 A1 | 3/2020 | Hubschmid et al. | |
| 2020/0114500 A1 | 4/2020 | Bierdeman et al. | |
| 2020/0130157 A1 | 4/2020 | Rux | |
| 2020/0130159 A1 | 4/2020 | French | |
| 2020/0156228 A1 | 5/2020 | Mccardle et al. | |
| 2020/0164498 A1 | 5/2020 | Wechselberger et al. | |
| 2020/0215672 A1 | 7/2020 | Pomeroy et al. | |
| 2020/0230791 A1 | 7/2020 | Pomeroy et al. | |
| 2020/0262044 A1 | 8/2020 | Ferris et al. | |
| 2020/0282534 A1 | 9/2020 | Po | |
| 2020/0318794 A1 | 10/2020 | Brown et al. | |
| 2020/0338707 A1 | 10/2020 | Li et al. | |
| 2020/0346333 A1 | 11/2020 | Po et al. | |
| 2020/0363015 A1 | 11/2020 | Adams et al. | |
| 2020/0391364 A1 | 12/2020 | Yasutomi et al. | |
| 2020/0406439 A1 | 12/2020 | Fujimoto et al. | |
| 2021/0008701 A1 | 1/2021 | Tan et al. | |
| 2021/0016424 A1 | 1/2021 | Kabbes et al. | |
| 2021/0023686 A1 | 1/2021 | Tan et al. | |
| 2021/0031347 A1 | 2/2021 | Sato et al. | |
| 2021/0031348 A1 | 2/2021 | Kobori et al. | |
| 2021/0114191 A1 | 4/2021 | Xu | |
| 2021/0138623 A1* | 5/2021 | Bierdeman | B25C 1/047 |
| 2021/0197352 A1 | 7/2021 | Ueda | |
| 2021/0205969 A1 | 7/2021 | Zhu | |
| 2021/0213595 A1 | 7/2021 | Yasutomi et al. | |
| 2021/0237242 A1 | 8/2021 | Carrier | |
| 2021/0245344 A1 | 8/2021 | Liu et al. | |
| 2021/0245345 A1 | 8/2021 | Ueda et al. | |
| 2021/0291335 A1* | 9/2021 | Liu | B25C 1/06 |
| 2021/0299835 A1* | 9/2021 | Ward | B25C 1/043 |

FOREIGN PATENT DOCUMENTS

| | | | |
|---|---|---|---|
| CN | 2701596 | Y | 5/2005 |
| CN | 201070759 | Y | 6/2008 |
| CN | 201128143 | Y | 10/2008 |
| CN | 201833342 | U | 5/2011 |
| CN | 203527407 | U | 4/2014 |
| CN | 203532939 | U | 4/2014 |
| CN | 105215940 | A | 1/2016 |
| CN | 105215941 | A | 1/2016 |
| CN | 104209926 | B | 5/2016 |
| CN | 106142002 | A | 11/2016 |
| CN | 205734728 | U | 11/2016 |
| CN | 205734729 | U | 11/2016 |
| CN | 105171696 | B | 5/2017 |
| CN | 206185818 | U | 5/2017 |
| CN | 207358996 | U | 5/2018 |
| CN | 207465145 | U | 6/2018 |
| CN | 207841214 | U | 9/2018 |
| CN | 207892959 | U | 9/2018 |
| CN | 106541366 | B | 11/2018 |
| CN | 109202810 | A | 1/2019 |
| CN | 109277989 | A | 1/2019 |
| CN | 208391950 | U | 1/2019 |
| CN | 109551429 | A | 4/2019 |
| CN | 109571373 | A | 4/2019 |
| CN | 109605285 | A | 4/2019 |
| CN | 109648525 | A | 4/2019 |
| CN | 208734685 | U | 4/2019 |
| CN | 208867117 | U | 5/2019 |
| CN | 109877784 | A | 6/2019 |
| CN | 110605688 | A | 12/2019 |
| CN | 211811342 | U | 10/2020 |
| DE | 1536451 | A1 | 5/1970 |
| DE | 1812301 | A1 | 6/1970 |
| DE | 1814629 | A1 | 6/1970 |
| DE | 1930490 | A1 | 12/1970 |
| DE | 2021567 | A1 | 11/1971 |
| DE | 2356883 | A1 | 5/1974 |
| DE | 2437063 | A1 | 2/1976 |
| DE | 3014548 | C2 | 9/1984 |
| DE | 3402298 | A1 | 7/1985 |
| DE | 8612162 | U1 | 6/1986 |
| DE | 8711784 | U1 | 11/1987 |
| DE | 3715293 | A1 | 12/1988 |
| DE | 4123645 | A1 | 1/1993 |
| DE | 29505437 | U1 | 8/1995 |
| DE | 29604187 | U1 | 4/1996 |
| DE | 19609456 | A1 | 9/1997 |
| DE | 3730049 | C2 | 7/1998 |
| DE | 29917830 | U1 | 2/2000 |
| DE | 4213309 | C2 | 3/2000 |
| DE | 20200539 | U1 | 4/2002 |
| DE | 10109962 | A1 | 9/2002 |
| DE | 10133988 | C1 | 1/2003 |
| DE | 20217134 | U1 | 1/2003 |
| DE | 202004017123 | U1 | 12/2004 |
| DE | 10358442 | A1 | 7/2005 |
| DE | 202005008988 | U1 | 5/2006 |
| DE | 102011013292 | A1 | 9/2012 |
| DE | 202013006362 | U1 | 8/2013 |

(56) References Cited

FOREIGN PATENT DOCUMENTS

| | | | |
|---|---|---|---|
| DE | 202014000807 | U1 | 3/2014 |
| DE | 102013011804 | A1 | 1/2015 |
| DE | 202017104823 | U1 | 8/2017 |
| DE | 202020107580 | U1 | 3/2021 |
| EP | 0069710 | B1 | 5/1987 |
| EP | 0798503 | A2 | 10/1997 |
| EP | 0838284 | B1 | 5/2003 |
| EP | 1364750 | A2 | 11/2003 |
| EP | 1612000 | A2 | 1/2006 |
| EP | 2400197 | A1 | 12/2011 |
| EP | 2604390 | A1 | 6/2013 |
| EP | 3326757 | A2 | 5/2018 |
| EP | 3243605 | B1 | 12/2018 |
| GB | 1323682 | A | 7/1973 |
| WO | WO8800168 | A1 | 1/1988 |
| WO | 2006033033 | A1 | 3/2006 |
| WO | WO2008032861 | A1 | 3/2008 |
| WO | WO2012169734 | A2 | 12/2012 |
| WO | WO2014012911 | A1 | 1/2014 |
| WO | WO2015037299 | A1 | 3/2015 |
| WO | WO2019071252 | A1 | 4/2019 |
| WO | WO2019113423 | A1 | 6/2019 |
| WO | WO2020059666 | A1 | 3/2020 |
| WO | WO2020126407 | A1 | 6/2020 |
| WO | WO2020214558 | A1 | 10/2020 |
| WO | WO2021176909 | A1 | 9/2021 |
| WO | WO2021192838 | A1 | 9/2021 |

* cited by examiner

POWERED FASTENER DRIVER

CROSS-REFERENCE TO RELATED APPLICATION

This application claims priority to U.S. Provisional Patent Application No. 63/221,078, filed on Jul. 13, 2021, U.S. Provisional Patent Application No. 63/127,805, filed on Dec. 18, 2020, and U.S. Provisional Patent Application No. 63/107,617, filed on Oct. 30, 2020, the entire contents of each of which are incorporated herein by reference.

FIELD OF THE INVENTION

The present invention relates to powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a powered staple driver including a magazine configured to receive staples and a nosepiece including a staple driving channel from which consecutive staples from the magazine are driven. The staple driving channel extending along a driving axis. The magazine obliquely extends from the nosepiece in both a first plane containing the driving axis and a second plane that is perpendicular to the driving axis.

In some aspects, the nosepiece includes a nosepiece base and a nosepiece cover that together form the staple driving channel. In some aspects, the magazine includes a fastener channel along the length thereof, and wherein the fastener channel is in communication with the staple driving channel. In some aspects, the powered staple driver further comprises a housing defining a cylinder housing portion, a motor housing portion extending from the cylinder housing portion, and a handle portion extending from the cylinder housing portion. In some aspects, the powered staple driver further comprises a drive piston and drive blade movable from a top dead center (TDC) position toward a bottom dead center (BDC) position by a gas spring, the drive piston and the drive blade positioned within the cylinder housing portion, and a lifter mechanism for returning the drive piston and drive blade toward the TDC position, the lifter mechanism positioned within the motor housing portion. In some aspects, the powered staple driver further comprises a motor positioned within the motor housing portion, the motor coupled to the lifter mechanism, and a battery pack electrically connectable to the motor for supplying electrical power to the motor, the battery pack coupled to handle portion. In some aspects, the magazine is angled such that the magazine overlaps at least a portion of the motor housing portion when viewed from a side view. In some aspects, the magazine is angled such that a majority of the motor housing portion is visible when viewed from a bottom view.

The present invention provides, in another aspect, a fastener driver including a magazine configured to receive fasteners, a nosepiece including nosepiece base and a nosepiece cover defining a fastener driving channel therebetween from which consecutive fasteners from the magazine are driven, the fastener driving channel extending along a driving axis, the nosepiece cover movably coupled to the nosepiece base via a joint having multiple degrees of freedom, the nosepiece cover movable relative to the nosepiece base between a closed position and an open position, and a latch mechanism releasably coupling the nosepiece cover to the nosepiece base, the latch mechanism adjustable between a latched state and a released state. The latch mechanism is adjustable from the latched state to the released state prior to adjustment of the nosepiece cover from the closed position to the open position. When the latch mechanism is in the released state, the nosepiece cover is movable relative to the nosepiece base in a direction parallel with the driving axis. When the latch mechanism is in the released state, the nosepiece cover is pivotable relative to the nosepiece base.

In some aspects, the joint includes at least one elongated slot defined by the nosepiece base, wherein the at least one elongated slot is configured to receive a shaft for movement along the at least one elongated slot, and wherein the nosepiece cover is pivotably supported relative to the nosepiece base by the shaft. In some aspects, the latch mechanism includes a lever having a top surface defining a surface area that is configured to be grasped by a user, the surface area of the lever being greater than 500 square millimeters. In some aspects, the nosepiece cover extends between a first end and a second end, and wherein the first end includes a bracket assembly configured to receive the shaft for pivotably coupling the nosepiece cover to the nosepiece base. In some aspects, the nosepiece cover includes a first retaining member and a second retaining member positioned proximate the second end of the nosepiece cover. In some aspects, the first and second retaining members are configured as wedges positioned at opposite lateral edges of the nosepiece cover. In some aspects, the nosepiece base includes first and second projections extending therefrom, and where the first and second retaining members of the nosepiece cover are slidably engageable with the first and second projections. In some aspects, the latch mechanism includes a lever that is pivotable about the nosepiece cover and is configured to be grasped by a user. In some aspects, the latch mechanism includes a spring having a first end connected to the lever and a second end opposite the first end, and wherein the second end is received within hooks on the nosepiece base.

The present invention provides, in yet another aspect, a fastener driver including a magazine configured to receive fasteners, the magazine including a rail defining a fastener channel extending along a length thereof, the rail including an edge portion at least partially defining the fastener channel, the rail formed from a first material, and a guide supported by the edge portion and extending at least partially along the fastener channel, the guide having a shape corresponding to the shape of the edge portion, the guide formed from a second material that is different than the first material, wherein the guide is configured to reduce wear on the magazine along the fastener channel.

In some aspects, the guide has a U-shaped cross-section. In some aspects the first material has a first hardness and the second material has a second hardness, and wherein the first hardness is less than the second hardness. In some aspects, the first material is aluminum and the second material is steel. In some aspects, the fasteners are staples that each have a crown portion and two leg portions extending at each end of the crown portion, and wherein the crown portion of the staple is positioned on the guide.

The present invention provides, in still yet another aspect, a fastener driver including a magazine configured to receive fasteners, the magazine having a length extending between a first end and a second end, the magazine including a latch member positioned proximate the second end, a nosepiece including a fastener driving channel from which consecutive fasteners from the magazine are driven, the nosepiece coupled to the first end of the magazine, a pusher slidably coupled to the magazine, the pusher including a body and a lever movably coupled to the body, the body configured to contact one of the fasteners for biasing the fasteners toward the nosepiece, the lever including a first end and a second end opposite the first end, and a spring configured to bias the first end of the lever away from the body of the pusher. The first end of the lever is configured to selectively engage with the latch member when the pusher is moved toward the second end of the magazine for retaining the pusher in a rearward position, and wherein the second end of the lever is movable by a user for releasing the engagement between the first end of the lever and the latch member.

In some aspects, the fastener driver further comprises a fastener support member coupled to the end of the body and extending between the body and a last one of the fasteners within the magazine. In some aspects, the fastener support member has a similar shape as the fasteners. In some aspects, the magazine includes a rail defining a fastener channel extending along the length thereof, the rail includes an edge portion at least partially defining the fastener channel, and the fastener support member is wrapped around the edge portion of the rail. In some aspects, the spring is supported by a first portion of the body of the pusher and the lever is pivotally coupled to a second portion of the body of the pusher. In some aspects, the latch member includes an opening formed on the magazine proximate the second end of the magazine.

The present invention provides, in another aspect, a powered staple driver including a magazine including a rail defining an edge portion and two opposed sidewalls adjacent the edge portion, the magazine configured to receive a strip of collated staples straddling the edge portion and the sidewalls of the rail, a pusher slidably coupled to one of the sidewalls of the rail, and a support member coupled to the pusher for movement therewith. The support member straddles the edge portion and the sidewalls of the rail to engage the strip of collated staples supported upon the edge portion of the rail.

In some aspects, the pusher includes a body and a lever movably coupled to the body, and wherein the support member is integrated with the body and is configured to contact one of the staples for biasing the strip of collated staples toward the nosepiece. In some aspects, the first end of the lever is configured to selectively engage with a latch member when the pusher is moved toward the second end of the magazine for retaining the pusher in a rearward position, and wherein the second end of the lever is movable by a user for releasing the engagement between the first end of the lever and the latch member. In some aspects, the support member has a similar shape as the staples. In some aspects, each of the staples in the strip of collated staples includes a crown portion and two leg portions extending from opposite ends of the crown portion, and wherein the support member contacts the entirety of the crown portion and the leg portions of a rearmost staple in the strip of collated staples. In some aspects the powered staple driver further comprises a nosepiece defining a staple driving channel from which consecutive staples from the magazine are driven, and a workpiece contact element extending along the nosepiece. In some aspects the powered staple driver further comprises a blocking member that extends from the support member towards the nosepiece, and wherein the blocking member is configured to block movement of the workpiece contact element relative to the nosepiece in at least one direction.

The present invention provides, in yet another aspect, a powered staple driver including a magazine including a rail defining an edge portion and two opposed sidewalls adjacent the edge portion, the magazine configured to receive a strip of collated staples straddling the edge portion and the sidewalls of the rail, the magazine extending between a first end and a second end, a nosepiece including a staple driving channel from which consecutive staples from the magazine are driven, the nosepiece coupled to the first end of the magazine, a pusher slidably coupled to the magazine, the pusher including a body, a first pawl proximate a first of the sidewalls and coupled to the body, and a second pawl proximate a second of the sidewalls and coupled to the body, the first and second pawls configured to bias the staples toward the nosepiece, and a first spring and a second spring configured to bias, respectively, an end of each of the first pawl and the second pawl toward the first and second sidewalls. The end of each of the first pawl and the second pawl is movable away from the first and second sidewalls, respectively, in response to the pusher being moved toward the second end of the magazine.

In some aspects, the magazine defines a staple channel having a U-shaped cross-sectional shape formed by a cross-member portion, and a first leg portion and a second leg portion extending therefrom, and wherein the end of the first pawl is selectively received in the first leg portion, and the end of the second pawl is selectively received in the second leg portion of the staple channel. In some aspects, the body of the pusher includes a bridge portion, and first and second arm portions extending from the bridge portion. In some aspects, the first pawl is pivotally coupled to the first arm portion, and the second pawl is pivotally coupled to the second arm portion. In some aspects, the first spring extends between the first arm portion and the first pawl, and wherein the second spring extends between the second arm portion and the second pawl. In some aspects the powered staple driver further comprises a third spring supported within a first cavity defined by the bridge portion and a fourth spring supported within a second cavity defined by the bridge portion, wherein the third and fourth springs are configured to bias the pusher toward the first end of the magazine.

The present invention provides, in a further aspect, a fastener driver including a drive piston and drive blade movable from a top dead center (TDC) position toward a bottom dead center (BDC) position by a gas spring, a lifter mechanism for returning the drive piston and drive blade toward the TDC position, and a latch assembly including a latch engageable with the drive blade for maintaining the drive blade in a ready position between the BDC and TDC positions, and a latch engagement member integrated with the lifter mechanism and operatively coupled to the latch for selectively moving the latch from a locked position to a released position to permit driving of the drive piston and drive blade toward the BDC position.

In some aspects, the latch engagement member includes a cam member located at a predetermined circumferential location about a circumference of the lifter mechanism, wherein the cam member is operable for selectively moving the latch from the locked position to the released position. In some aspects, the latch assembly further includes a latch actuator member configured to transfer rotation of the cam member to pivoting movement of the latch between the locked position and the released position, wherein the latch actuator member includes a body extending between a first end and a second end, and wherein the body defines a sliding axis extending through the first end and the second end. In some aspects, the sliding axis extends at an angle relative to a driving axis extending centrally through drive blade. In some aspects, the body further defines a first elongated slot extending along the sliding axis and a second elongated slot positioned between the first elongated slot and the second end of the body. In some aspects, the second elongated slot extends perpendicular to the sliding axis. In some aspects the fastener driver further comprises a connector movably supporting the latch actuator member to a nosepiece of the fastener driver, and a biasing member received within the first elongated slot, wherein the biasing member is configured to bias the latch actuator member toward the lifter mechanism. In some aspects, the second elongated slot receives a protrusion of the latch, and wherein the protrusion is engageable with and movable relative to the latch actuator member.

The invention provides, in a further aspect, a fastener driver including a housing defining a cylinder housing portion, a motor housing portion extending from the cylinder housing portion, and a handle portion extending from the cylinder housing portion, an inner cylinder positioned within the cylinder housing portion, an outer storage chamber cylinder positioned within the cylinder housing portion, the outer storage chamber in fluid communication with the inner cylinder to provide pressurized gas thereto, a moveable piston positioned within the inner cylinder, a drive blade attached to the movable piston, and a fill valve assembly in communication with the outer storage chamber cylinder to selectively refill the outer storage chamber with compressed gas.

In some aspects the fastener driver further comprises a port extending from the outer storage chamber, a fill valve positioned within the port, and a plug removably coupled to the port upstream of the fill valve to selectively prevent access to the fill valve. In some aspects the fastener driver further comprises a window defined within the housing and positioned adjacent the fill valve assembly. In some aspects, the window is at least partially positioned within the handle portion. In some aspects, the fastener driver further comprises further comprising a cover removably received in the window to selectively provide access to the fill valve assembly.

The invention provides, in a further aspect, a fastener driver including a housing defining a cylinder housing portion and a handle portion extending from the cylinder housing portion, a cylinder positioned within the cylinder housing portion, a fill valve assembly in selective fluid communication with the cylinder, the fill valve assembly is at least partially positioned within the handle portion of the housing, the fill valve assembly including a port and a fill valve positioned within the port, a window defined within the handle portion, wherein the port of the fill valve assembly is accessible through the window, and a cover member is removably receivable in the window to prevent access to the fill valve assembly.

In some aspects, the cylinder is an outer storage chamber cylinder that is in fluid communication with an inner cylinder to provide pressurized gas thereto. In some aspects the fastener driver further comprises a plug removably coupled to the port upstream of the fill valve to selectively prevent access to the fill valve. In some aspects, the window is positioned adjacent the plug.

The invention provides, in a further aspect, a fastener driver includes a housing defining a cylinder housing portion, a motor housing portion extending from the cylinder housing portion, and a handle portion extending from the cylinder housing portion, the housing defining a recess therein, a mounting portion having an insert positioned within the recess of the housing, and a tether pivotably supported within the mounting portion.

In some aspects, the housing is a clam-shell housing having a first portion and a second portion fixed to the first portion. In some aspects the fastener driver further comprises a cylinder positioned within the cylinder housing portion, a drive piston positioned within the cylinder, a drive blade coupled to the drive piston and movable from a top dead center (TDC) position toward a bottom dead center (BDC) position along a driving axis, a magazine configured to receive fasteners, and a nosepiece defining a fastener driving channel from which consecutive fasteners from the magazine are driven. In some aspects, the recess is formed in each of the first and second portions of the housing in a direction perpendicular to the driving axis. In some aspects, the mounting portion is positioned between the cylinder and the nosepiece. In some aspects, the insert is slidably received within the recess.

The invention provides, in a further aspect, a fastener driver including a housing defining a cylinder housing portion, a motor housing portion extending from the cylinder housing portion, and a handle portion extending from the cylinder housing portion, a trigger coupled to the handle portion, the trigger configured to initiate a fastener driving operation, and a gap defined between a central portion of the trigger and a central portion of the motor housing portion. The central portion of the handle portion is offset from the central portion of the motor housing portion.

In some aspects, the gap is greater than or equal to 30 millimeters. In some aspects, the offset between the central portion of the handle portion and the central portion of the motor housing portion is greater than or equal to 25 millimeters. In some aspects, a distance defined between the trigger and the motor housing portion positioned directly in front of the trigger is larger than the gap. In some aspects, the distance is greater than or equal to 35 millimeters. In some aspect the fastener driver further comprises a cylinder positioned within the cylinder housing portion, a drive piston positioned within the cylinder, a drive blade coupled to the drive piston and movable from a top dead center (TDC) position toward a bottom dead center (BDC) position along a driving axis, a magazine configured to receive fasteners, and a nosepiece defining a fastener driving channel therebetween from which consecutive fasteners from the magazine are driven.

The invention provides, in a further aspect a fastener driver including a housing defining a cylinder housing portion, a motor housing portion extending from the cylinder housing portion, and a handle portion extending from the cylinder housing portion, a battery attachment portion coupled to an end of the handle portion and extending between the motor housing portion and the handle portion, and a power button coupled to the battery attachment portion and positioned between the handle portion and the motor housing portion.

In some aspects, the power button has an outer diameter that is greater than or equal to 17 millimeters. In some aspects the fastener driver further comprises a cylinder positioned within the cylinder housing portion, a drive piston positioned within the cylinder, a drive blade coupled to the drive piston and movable from a top dead center (TDC) position toward a bottom dead center (BDC) position along a driving axis, a magazine configured to receive fasteners, and a nosepiece defining a fastener driving channel therebetween from which consecutive fasteners from the magazine are driven. In some aspects the fastener driver further comprises a trigger coupled to the handle portion, wherein the trigger is configured to initiate a fastener driving operation, and wherein a gap is defined between a central portion of the trigger and a central portion of the motor housing portion. In some aspects, the power button is positioned within the gap. In some aspects, the central portion of the handle portion is offset from the central portion of the motor housing portion.

The invention provides, in a further aspect a fastener driver including a magazine configured to receive fasteners, a nosepiece including nosepiece base and a nosepiece cover defining a fastener driving channel therebetween from which consecutive fasteners from the magazine are driven, the fastener driving channel extending along a driving axis, a workpiece contact element supported by nosepiece, the workpiece contact element having a first portion and a second portion, and a depth of drive adjustment mechanism movably coupling the first and second portions of the workpiece contact element to adjust an effective length of the workpiece contact element, the depth of drive adjustment mechanism including a screw portion extending between the first and second portions of the workpiece contact element, and an adjustment knob threadably coupled to the screw portion, the adjustment knob configured to adjust the position of the workpiece contact element.

In some aspects the fastener driver further comprises a reference marking formed on the nosepiece and depth adjustment markings positioned on the workpiece contact element that correlate to the effective length of the workpiece contact element. In some aspects, depth adjustment markings are molded into the workpiece contact element as a series of lines. In some aspects, the depth adjustment markings are positioned on a top portion of the workpiece contact member. In some aspects the fastener driver further comprises a cylinder, a drive piston positioned within the cylinder, and a drive blade coupled to the drive piston and movable from a top dead center (TDC) position toward a bottom dead center (BDC) position along the driving axis. In some aspects, the adjustment knob includes an outer diameter that is greater than or equal to 24 millimeters. In some aspects, the depth of drive adjustment mechanism further includes a linear guide bolt configured to guide the adjustment knob and the workpiece contact element together in response to rotation of the adjustment knob.

The invention provides, in a further aspect a powered fastener driver including a housing, a magazine configured to receive staples, a nosepiece including a fastener driving channel from which consecutive fasteners from the magazine are driven, the fastener driving channel extending along a driving axis, and a magazine support extending between the housing and the magazine, the magazine support defining a wire guiding structure configured to the engage a wire during a fastener driving operation.

In some aspects, the wire guiding structure is spaced from the nosepiece. In some aspects, the wire guiding structure is formed as a first recess in a front portion of the magazine support. In some aspects the powered fastener driver further comprises a cylinder, a drive piston positioned within the cylinder, and a drive blade coupled to the drive piston and movable from a top dead center (TDC) position toward a bottom dead center (BDC) position along the driving axis. In some aspects the powered fastener driver further comprises a workpiece contact element supported by nosepiece, and wherein a second recess is defined in the workpiece contact element. In some aspects, the first recess in the wire guiding structure is aligned with the second recess in the workpiece contact element.

The invention provides, in a further aspect a powered staple driver including a magazine having a rail defining a staple channel extending along a length thereof, the rail includes an edge portion at least partially defining the staple channel, the magazine is configured to receive a strip of collated staples straddling the edge portion of the rail, and a fastener retention portion is positioned on the edge portion and extends at least partially along the length of the magazine, the fastener retention portion is configured to engage with at least one of the collated staples of the strip of collated staples for retaining the strip of collated staples on the magazine.

In some aspects, the fastener retention portion includes a first projection and a second projection laterally extending away from and on opposite sides of the edge portion. In some aspects, at least one of the first and second projections extends along the length of the magazine. In some aspects, each of the staples in the strip of collated staples includes a crown portion, two leg portions extending from opposite ends of the crown portion, and two bends located between the respective leg portions and the crown portion, and wherein the first and second projections are received within the bends. In some aspects, the fastener retention portion has a complementary shape to that of the strip of collated staples.

The invention provides, in a further aspect a fastener driver including a housing defining a cylinder housing portion, a motor housing portion extending from the cylinder housing portion, and a handle portion extending from the cylinder housing portion, an attachment portion coupled to the housing, and a secondary handle coupled to the attachment portion.

In some aspects, the secondary handle is coupled to a front portion of the cylinder housing portion. In some aspects, the secondary handle is coupled to the motor housing portion of the fastener driver. In some aspects, the attachment portion is removably coupled to the housing.

The invention provides, in a further aspect a powered staple driver including a magazine configured to receive a collated strip of staples, a nosepiece including nosepiece base and a nosepiece cover defining a staple driving channel therebetween from which consecutive staples from the magazine are driven, the staple driving channel extending along a driving axis, and a magnet coupled to the nosepiece, the magnet configured to retain the forward-most staple in the collated strip within the staple driving channel prior to a firing operation.

In some aspects, the magnet is received within a hole formed in the nosepiece base or the nosepiece cover. In some aspects, the magnet is a first magnet and the hole is a first hole, and wherein the driver further comprises a second magnet received within a second hole formed in the nosepiece base or the nosepiece cover. In some aspects the powered staple driver further comprises a first bushing configured to receive the first magnet and a second bushing configured to receive the second magnet. In some aspects, the first and second bushings are respectively pressed in the first and second holes. In some aspects, the first and second magnets are aligned, respectively, with the first and second legs of the staple positioned within the staple driving channel.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
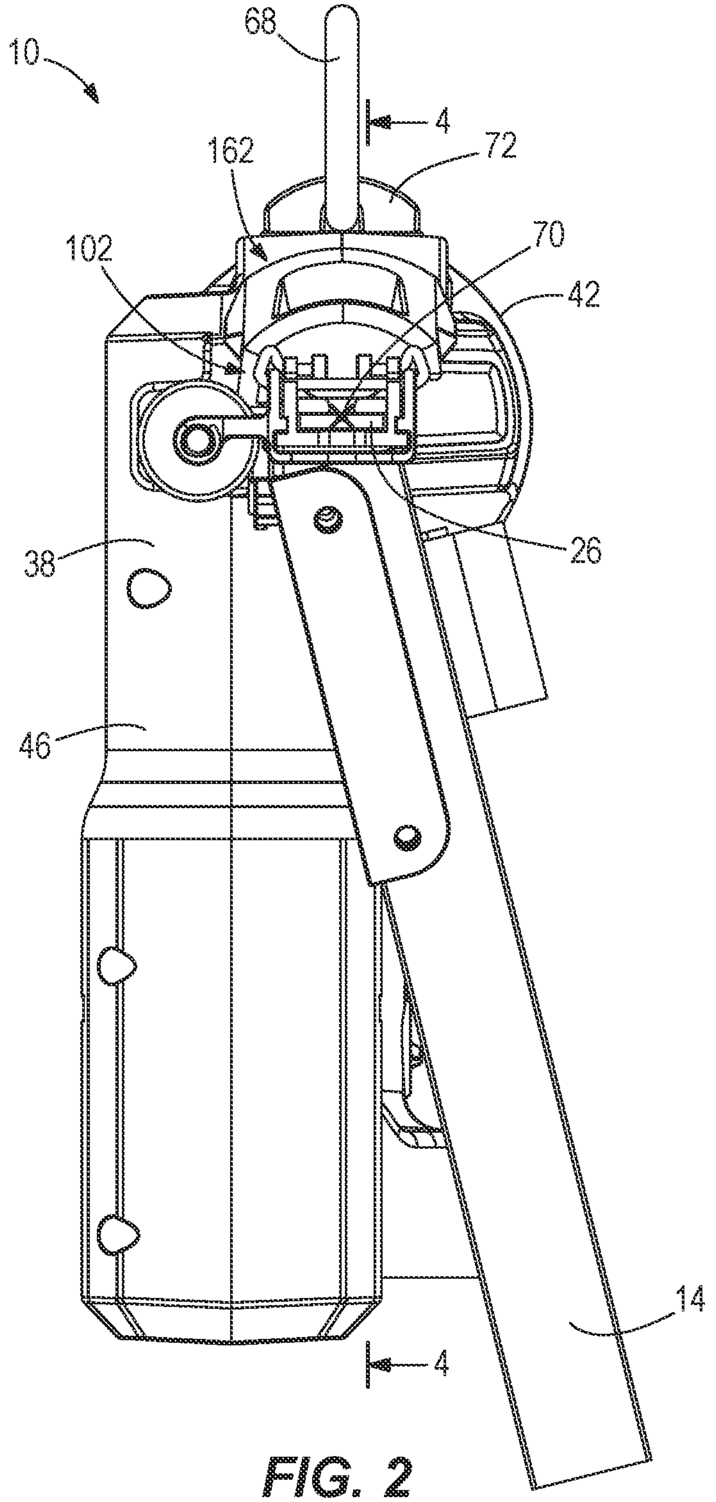
FIG. 2 is a bottom view of the powered fastener driver of FIG. 1.
Figure 3:
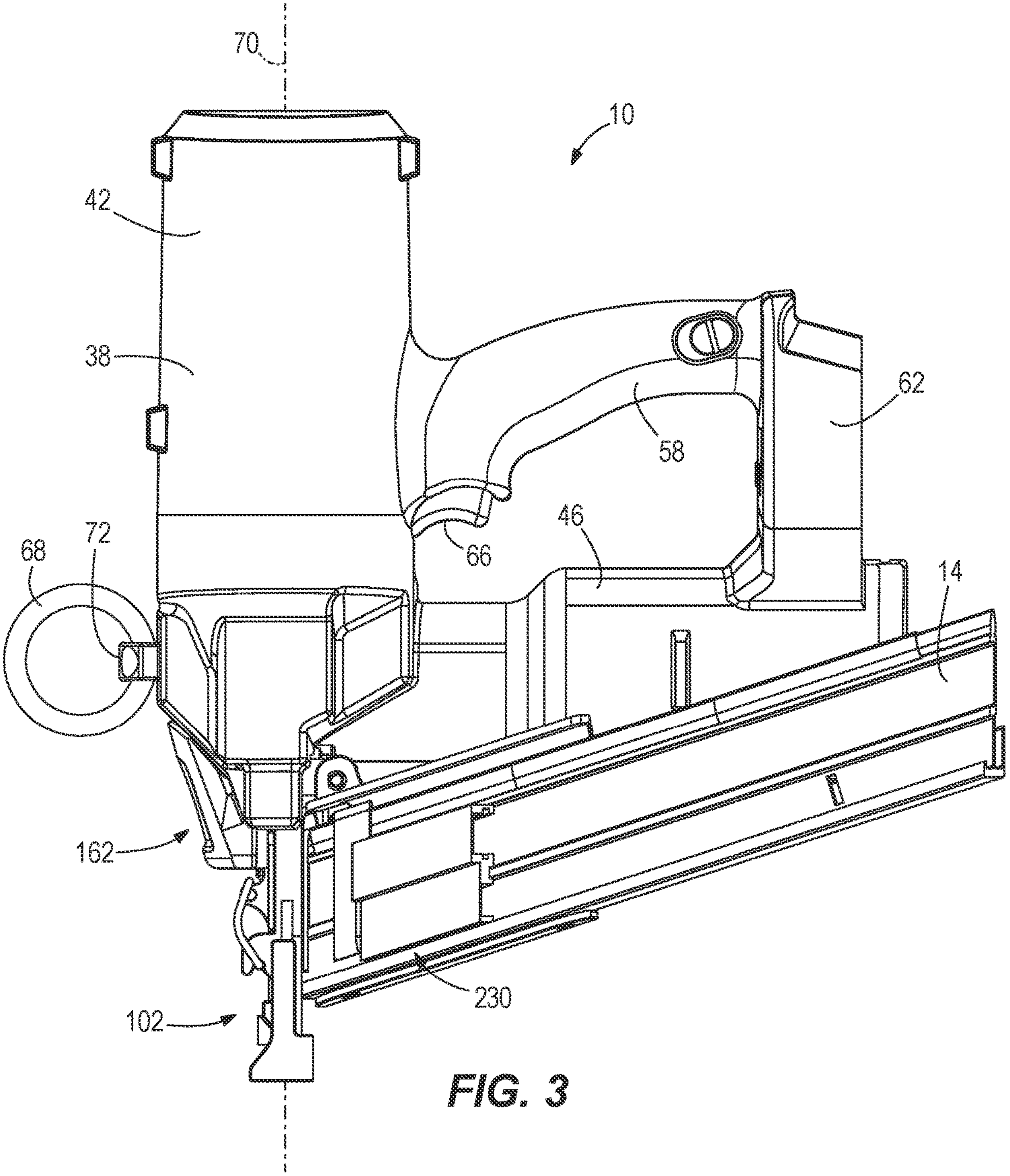
FIG. 3 is a side view of the powered fastener driver of FIG. 1.
Figure 4:
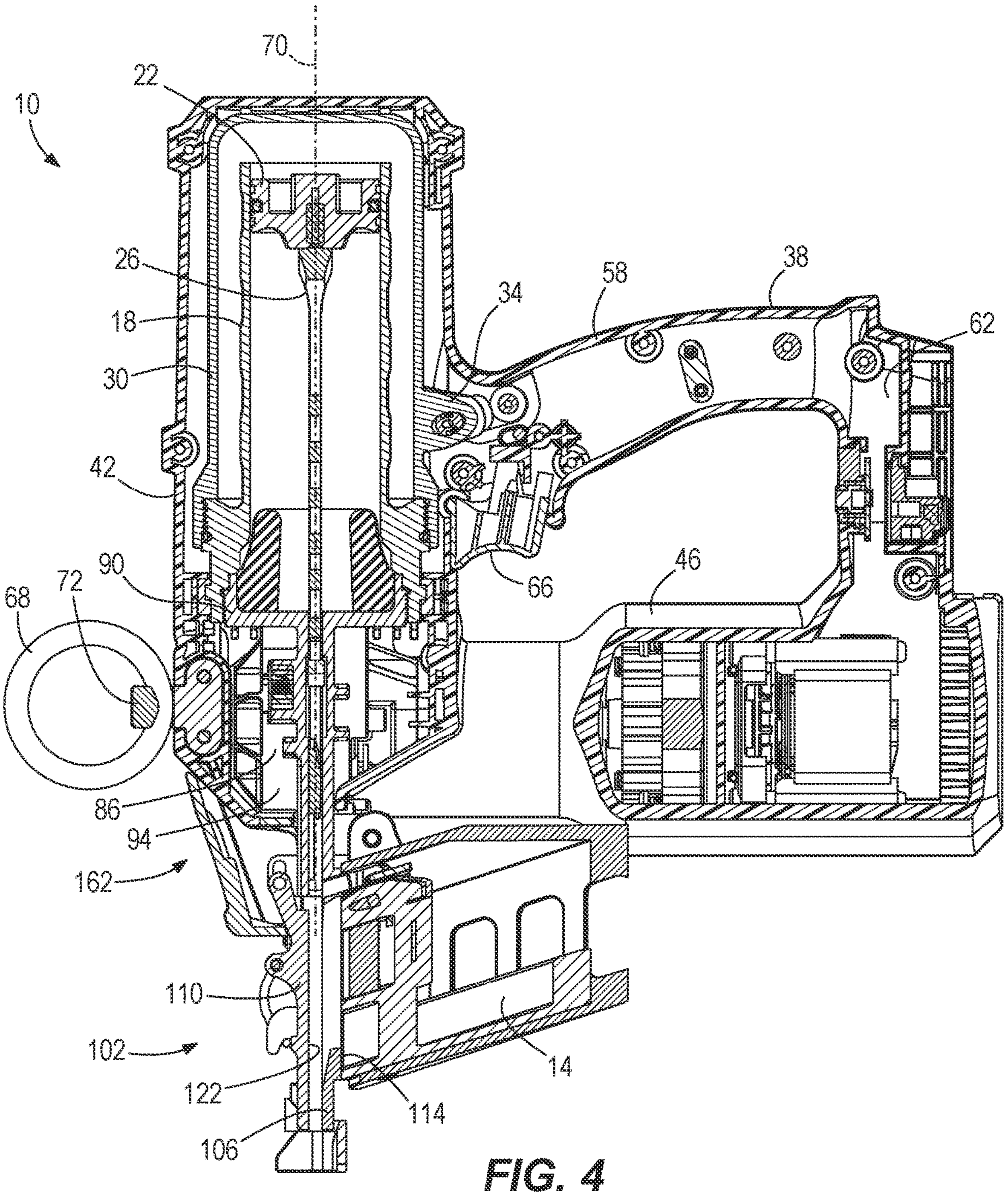
FIG. 4 is a side cross-sectional view of the powered fastener driver of FIG. 3, illustrating a frame and a nosepiece of the powered fastener driver of FIG. 1.
Figure 5:
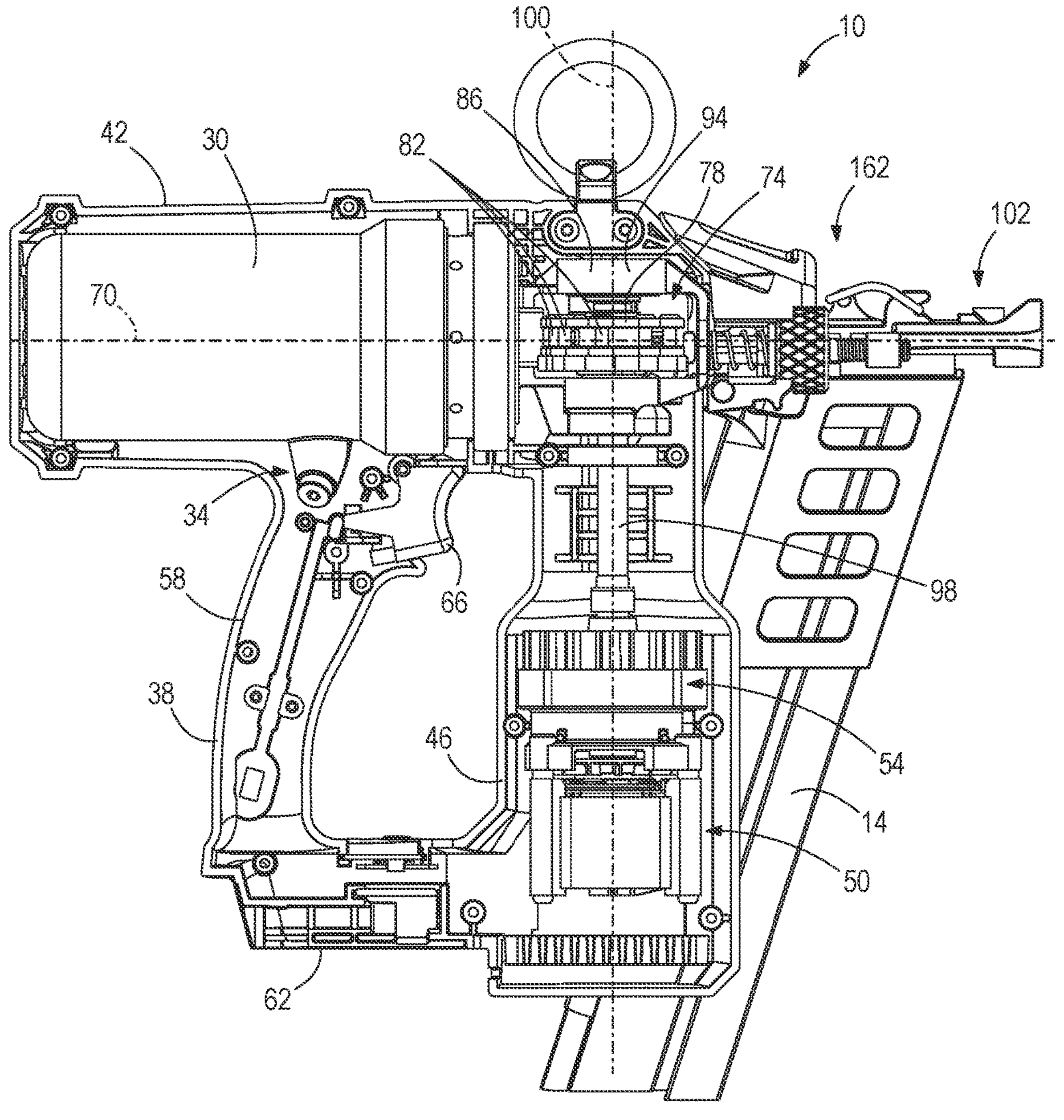
FIG. 5 is another side view of the powered fastener driver of FIG. 1, with portions of a housing removed for clarity and illustrating a motor, transmission, and lifter assembly of the powered fastener driver of FIG. 1.
Figure 14:
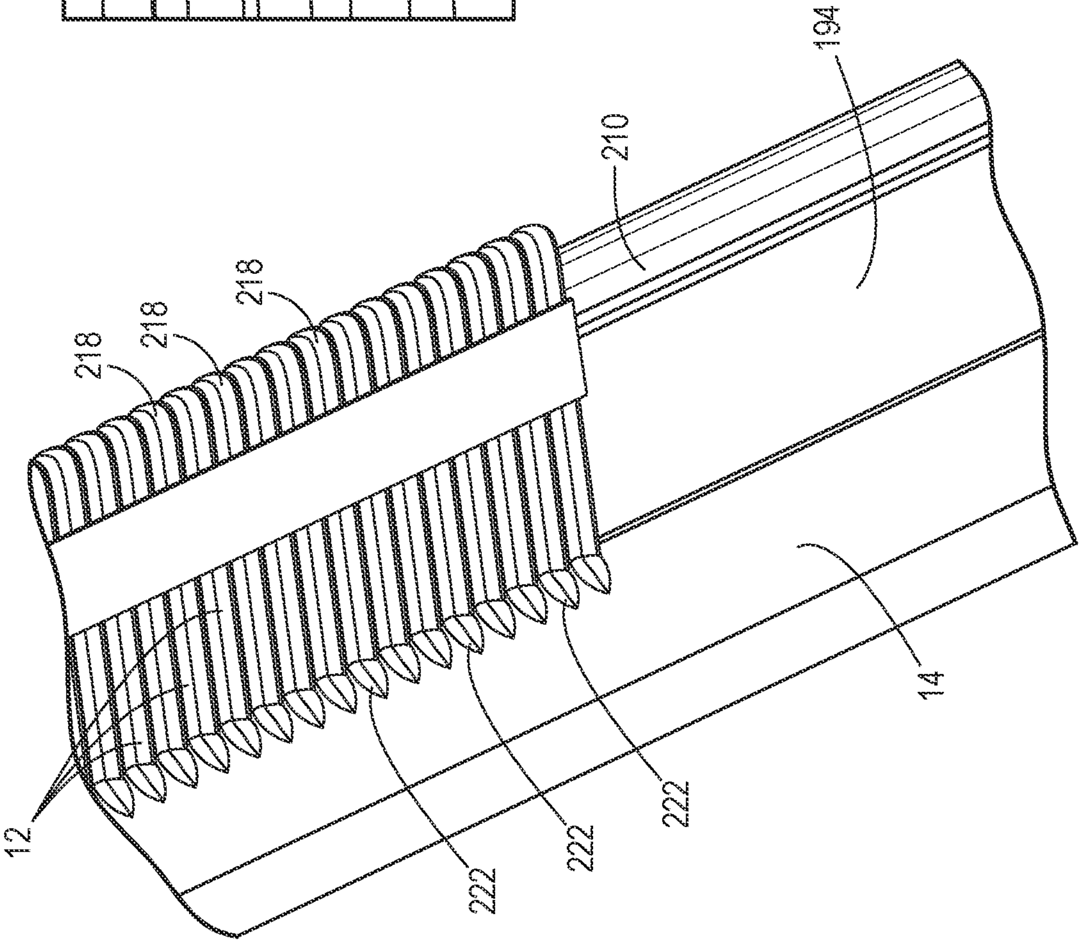
FIG. 14 is a partial cutaway of the magazine of FIG. 12 and including a plurality of fasteners positioned in a fastener channel of the magazine of FIG. 12.

With reference to FIGS. 1-5, a powered fastener driver 10 is operable to drive fasteners 12 (e.g., staples, tacks, nails, etc.) held within a magazine 14 into a workpiece. In the illustrated embodiment, the powered fastener driver 10 is a stapler operable to drive staples (FIG. 14). The fastener driver 10 includes an inner cylinder 18 and a moveable piston 22 positioned within the cylinder 18 (FIG. 4). The fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the inner cylinder 18. In the illustrated embodiment, the inner cylinder 18 and moveable piston 22 are positioned within the storage chamber cylinder 30. With reference to FIG. 5, the driver 10 further includes a fill valve assembly 34 coupled to the storage chamber cylinder 30. When connected with a source of compressed gas, the fill valve assembly 34 permits the storage chamber cylinder 30 to be refilled with compressed gas if any prior leakage has occurred. The fill valve assembly 34 may be configured as a Schrader valve, for example.

With reference to FIG. 5, the fastener driver 10 includes a housing 38 having a cylinder housing portion 42 and a motor housing portion 46 extending therefrom. The cylinder housing portion 42 is configured to support the cylinders 18, 30, whereas the motor housing portion 46 is configured to support a motor 50 and a transmission 54 operatively coupled to the motor 50.

The housing 38 further includes a handle portion 58 extending from the cylinder housing portion 42, and a battery attachment portion 62 coupled to an opposite end of the handle portion 58. A battery pack (not shown) is electrically connectable to the motor 50 for supplying electrical power to the motor 50. The handle portion 58 supports a trigger 66, which is depressed by a user to initiate a firing cycle of the fastener driver 10. A hog ring or tether 68 may be coupled to the housing 38 via a mounting structure 72. In the illustrated embodiment, the tether 68 is pivotably supported within the mounting structure 72. The tether 68 may be coupled to a lanyard or the like (e.g., via a carabiner) to connect the driver 10 to the user.

With reference to FIGS. 4 and 5, the inner cylinder 18 and the driver blade 26 define a driving axis 70. During a driving cycle, the driver blade 26 and piston 22 are moveable between a top-dead-center (TDC) (i.e., retracted) position and a driven or bottom-dead-center (BDC) (i.e., extended) position. The fastener driver 10 further includes a lifting assembly 74 (FIG. 5), which is powered by the motor 50, and which is operable to move the driver blade 26 from the BDC position to the TDC position.

In operation, the lifting assembly 74 drives the piston 22 and the driver blade 26 toward the TDC position by energizing the motor 50. In particular, the lifting assembly 74 includes a lifter 78 that has drive pins 82 that are sequentially engageable with teeth 84 (FIG. 28) of the driver blade 26 to raise the driver blade 26 from the BDC position toward the TDC position. As the piston 22 and the driver blade 26 are driven toward the TDC position, the gas above the piston 22 and the gas within the storage chamber cylinder 30 is compressed. Prior to reaching the TDC position, the motor 50 is deactivated and the piston 22 and the driver blade 26 are held in a ready position, which is located between the TDC and the BDC positions, until being released by user activation of the trigger 66. When released, the compressed gas above the piston 22 and within the storage chamber cylinder 30 drives the piston 22 and the driver blade 26 toward the BDC position, thereby driving a fastener into the workpiece. The illustrated fastener driver 10 therefore operates on a gas spring principle utilizing the lifting assembly 74 and the piston 22 to further compress the gas within the inner cylinder 18 and the storage chamber cylinder 30. Further detail regarding the structure and operation of the fastener driver 10 is provided below.

With continued reference to FIGS. 4 and 5, the driver 10 further includes a frame 86 positioned within the housing 38. The frame 86 is coupled to one end of the inner cylinder 18. The frame 86 is formed by a plurality of portions 90, 94. The illustrated frame 86 includes a cylinder support portion 90, and a lifter housing portion 94. The cylinder support portion 90 is coupled to the inner cylinder 18 (FIG. 4). In the illustrated embodiment, the cylinder support portion 90 is threadably coupled to an inner surface of the inner cylinder 18 (FIG. 4). The lifter housing portion 94 supports the lifting assembly 74 (FIG. 5).

With reference to FIG. 5, the transmission 54, which raises the driver blade 26 from the BDC position toward the TDC position, is operatively coupled to the motor 50. Accordingly, the motor 50 provides torque to the transmission 54 when activated. The transmission 54 further includes an output shaft 98 extending to the lifter 78 of the lifting assembly 74, which is operable to move the driver blade 26 from the BDC position toward the TDC position. In other words, the transmission 54 provides torque to the lifter 78 from the motor 50. The transmission 54 may be configured as a planetary transmission having a multi-stage planetary transmission including any number of planetary stages (e.g., two planetary stages, three planetary stages, etc.). In alternative embodiments, the transmission 54 may be a single-stage planetary transmission. The output shaft 98 defines a rotational axis 100, about which the lifter 78 rotates.

Figure 6:
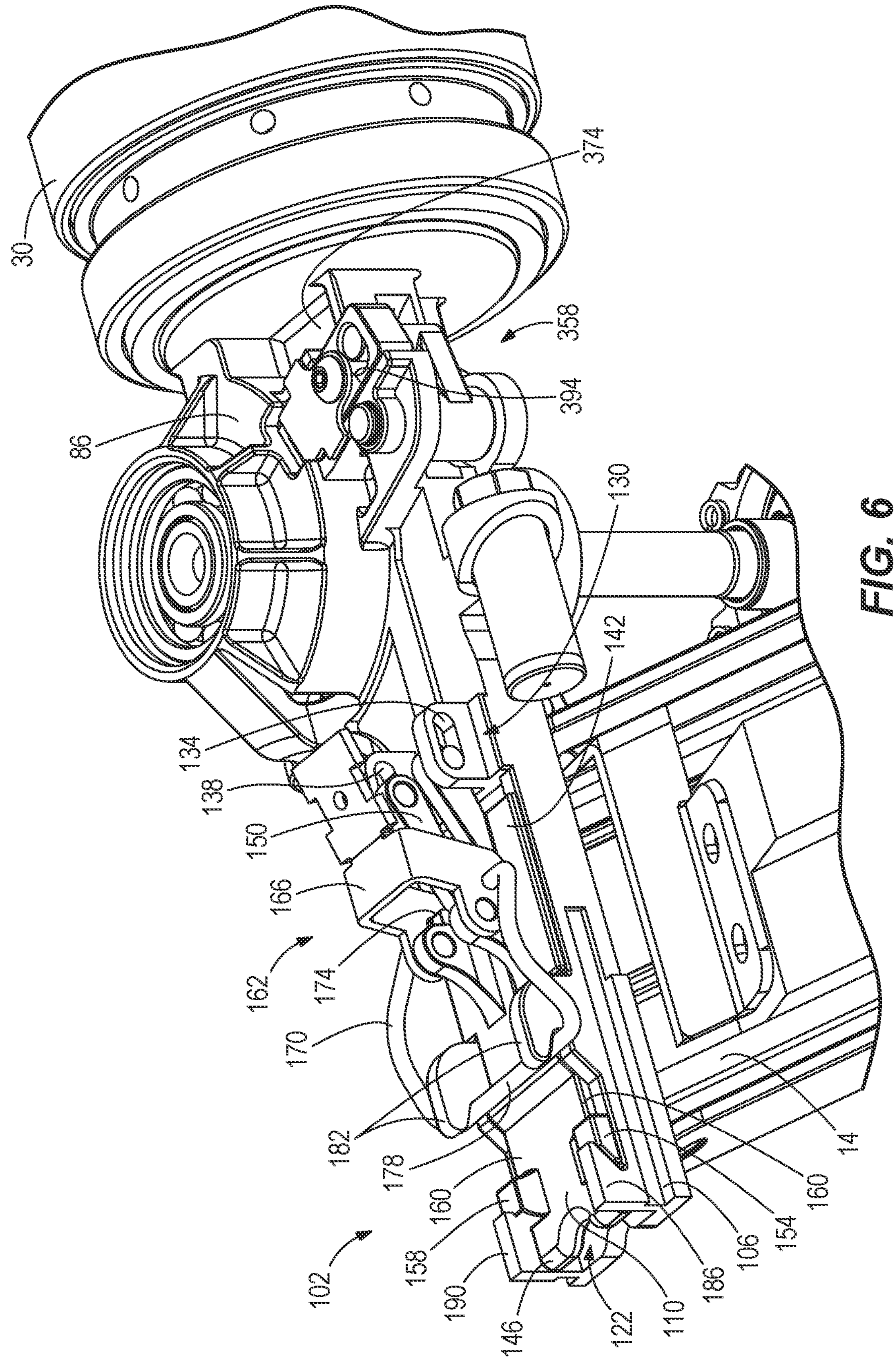
FIG. 6 is a perspective view of the frame and nosepiece of FIG. 4, illustrating the nosepiece in a closed position and a latch mechanism of the nosepiece in a latched state.
Figure 25:
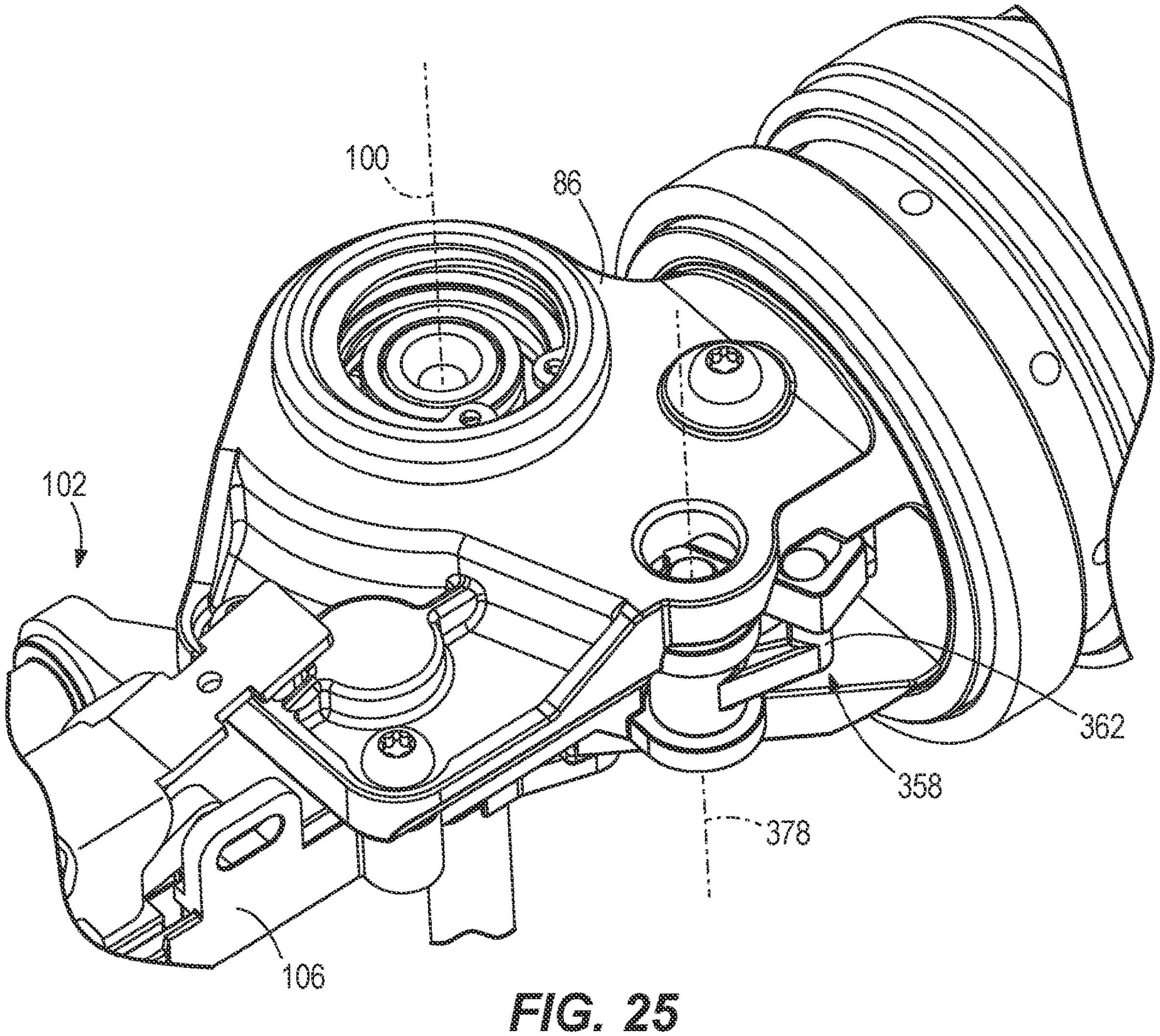
FIG. 25 is a perspective view of another frame and nosepiece of FIG. 6, illustrating a latch for selectively holding the driver blade in a ready position between a bottom-dead-center position and a top-dead-center position.

With reference to FIGS. 4 and 6-8, the driver 10 further includes a nosepiece 102 supported by the frame 86. The nosepiece 102 includes a nosepiece base 106 and a nosepiece cover 110 movably coupled to the nosepiece base 106. In the illustrated embodiment, the nosepiece base 106 is integral with the frame 86. In other embodiments, as shown in FIG. 25, the nosepiece base 106 is separate and affixed to the frame 86. The nosepiece base 106 is positioned at a front end 114 (FIG. 4) of the magazine 14. The nosepiece cover 110 substantially covers the nosepiece base 106 (FIG. 6). In the illustrated embodiment, the nosepiece cover 110 is releasably coupled to the nosepiece base 106 by a latch 162. In other embodiments, the nosepiece cover 110 is completely separate from the nosepiece base 106.

The nosepiece base 106 and the nosepiece cover 110 form a firing channel 122 therebetween (FIG. 4). The magazine 14 includes a fastener channel 126 (FIG. 12) along a length thereof. The firing channel 122 is in communication with the fastener channel 126. The firing channel 122 is configured to consecutively receive the staples 12 from a collated staple strip (e.g., staples 12; FIG. 14) stored in the fastener channel 126 of the magazine 14. The firing channel 122 is aligned with the driving axis 70 of the driver blade 26.

Figure 7:
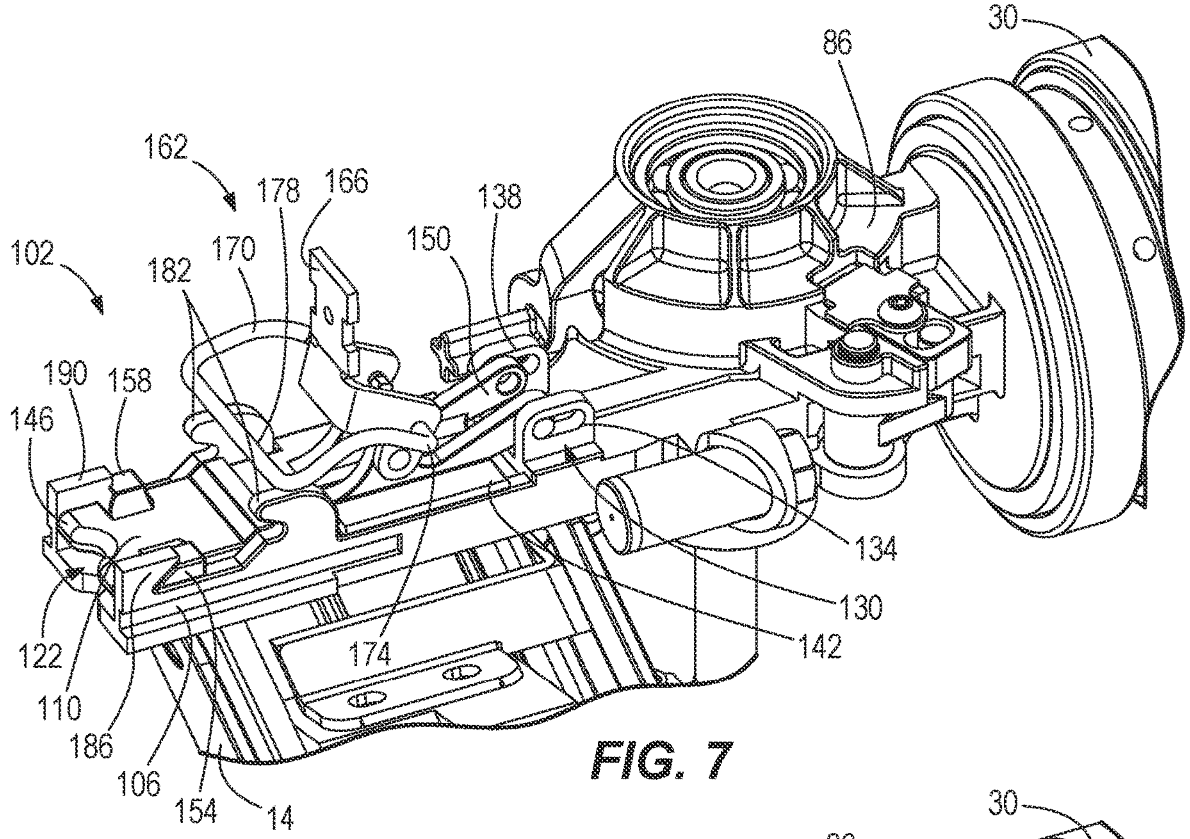
FIG. 7 is another perspective view of the frame and nosepiece of FIG. 6, illustrating the latch mechanism in a released state.
Figure 8:
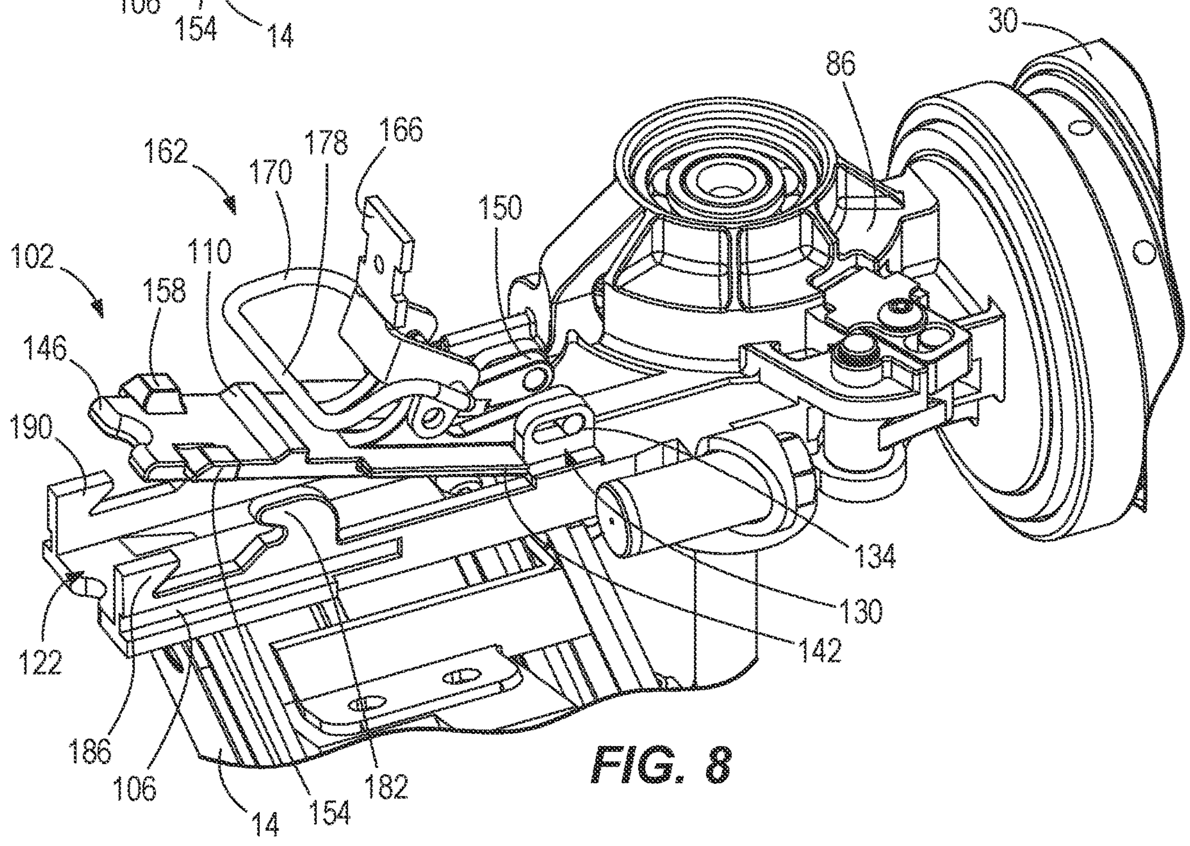
FIG. 8 is another perspective view of the frame and nosepiece of FIG. 6, illustrating the latch mechanism in the released position, and the nosepiece in an open position.

With reference to FIGS. 6-8, the nosepiece cover 110 is movably secured to the nosepiece base 106 by a joint 130 having multiple degrees of freedom. In the illustrated embodiment, the joint 130 is a pivoting and sliding joint 130. In particular, the nosepiece base 106 includes an elongated first guiding slot 134 and an elongated second guiding slot 138. The nosepiece cover 110 is pivotably supported relative to the nosepiece base 106 by an axle or shaft (not shown). In particular, the shaft is received within the first and second guiding slots 134, 138. In some embodiments, the shaft is integral with the nosepiece cover 110. In other embodiments, the shaft is separate and affixed to the nosepiece cover 110. In addition, the nosepiece cover 110 is slidable relative to the nosepiece base 106 by sliding movement of the shaft within the first and second guiding slots 134, 138. More specifically, the nosepiece cover 110 is slidable in a direction parallel to the driving axis 70.

With reference to FIG. 6, the nosepiece cover 110 extends between a first end 142 and a second end 146. The first end 142 includes a bracket assembly 150 configured to receive the shaft for pivotably coupling the nosepiece cover 110 to the nosepiece base 106. The nosepiece cover 110 also includes a first retaining member 154 and a second retaining member 158 positioned proximate the second end 146 of the nosepiece cover 110. The illustrated first and second retaining members 154, 158 are configured as wedges positioned at opposite lateral edges 160 of the nosepiece cover 110.

If a fastener 12 becomes jammed within the firing channel 122, the nosepiece cover 110 can be pivoted to an open position to clear the jam. The nosepiece cover 110 is secured in a closed position by the latch 162. The latch 162 includes a lever 166 that is pivotable about the nosepiece cover 110 and is configured to be grasped by a user. The latch 162 further includes a spring 170 having a first end 174 connected to the lever 166, and a second end 178 opposite the first end 174. The second end 178 of the spring 170 is received within hooks 182 formed on the nosepiece base 106 for securing the nosepiece cover 110 to the nosepiece base 106, thereby positioning the latch 162 in a latched state (FIG. 6). The latch 162 is adjustable from the latched state to a released state (FIGS. 7 and 8).

The nosepiece base 106 further includes first and second projections 186, 190 extending therefrom. The first and second retaining members 154, 158 of the nosepiece cover 110 are slidably engageable with the first and second projections 186, 190, respectively. More specifically, the first and second projections 186, 190 have ramped surfaces corresponding to ramped surfaces of the first and second retaining members 154, 158, respectively. Engagement between the first and second retaining members 154, 158 and the first and second projections 186, 190, respectively, is configured to selectively inhibit pivoting movement of the nosepiece cover 110 relative to the nosepiece base 106 until the retaining members 154, 158 are moved (i.e., slid) completely out of the way of the projections 186, 190.

To secure the nosepiece cover 110 in the closed position, the nosepiece cover 110 is slidably moved relative to the nosepiece base 106 in a first direction (e.g., to the left from the frame of reference of FIG. 6), such that the shaft also moves in the first direction within the first and second guiding slots 134, 138, until the first and second retaining members 154, 158 are completely engaged with the first and second projections 186, 190, respectively, and the second end 178 of the spring 170 is engaged with the hooks 182 of the nosepiece base 106, thereby adjusting the latch 162 into the latched state. To release the nosepiece cover 110, the lever 166 is rotated away from the nosepiece cover 110 (FIG. 7), releasing the second end 178 of the spring 170 from engagement with the hooks 182, thereby adjusting the latch 162 from the latched state to the released state. Subsequently, the nosepiece cover 110 is slidably moved by a user in a second, opposite direction (e.g., to the right from the frame of reference of FIG. 7) such that the shaft within the first and second guiding slots 134, 138 is also moved in the second direction until the first and second retaining members 154, 158 are moved completely out of engagement with the first and second projections 186, 190, respectively. A user then pivots the nosepiece cover 110 away from the nosepiece base 106 by the shaft toward the open position (FIG. 8).

Figure 9:
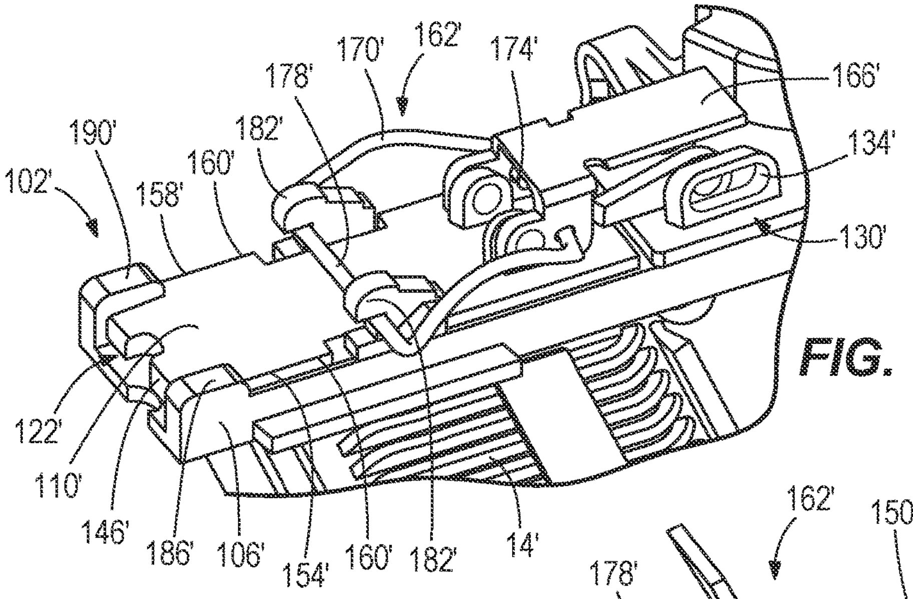
FIGS. 9, 10, and 11 illustrate an alternative embodiment of the nosepiece of FIGS. 6-8 in use with the latch mechanism of FIGS. 6-8.
Figure 10:
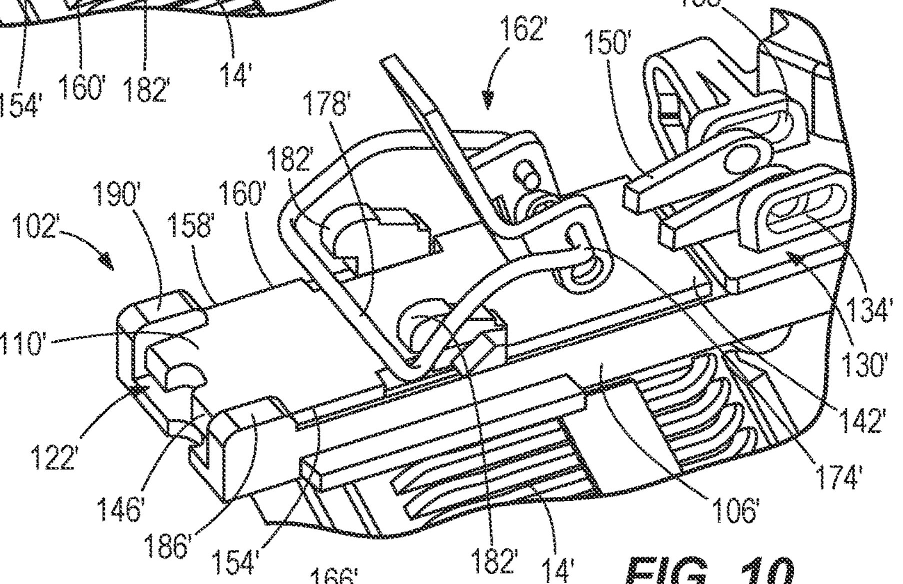
Figure 11:
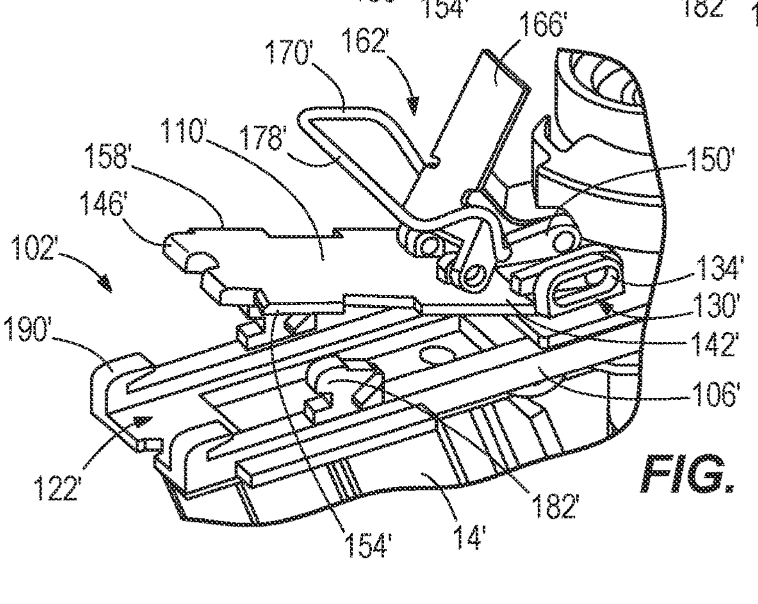

FIGS. 9-11 illustrate an alternative nosepiece 102' of the powered fastener driver 10 according to another embodiment of the invention, with like components and features as the first embodiment of the nosepiece 102 and jam release latch 162 of the powered fastener driver 10 shown in FIGS. 6-8 being labeled with like reference numerals plus a prime symbol "'". The nosepiece 102' and jam release latch 162' is adapted for use with the powered fastener driver 10 of FIGS. 1-5 and, accordingly, the discussion of the powered fastener driver 10 above similarly applies to the nosepiece 102' and jam release latch 162' and is not re-stated. In particular, rather than protruding from a front surface of the nosepiece cover 110' like the first and second retaining members 154, 158 of the first embodiment (FIG. 8), the first and second retaining members 154', 158' protrude from the lateral edges 160' of the nosepiece cover 110'. Like the first and second retaining members 154, 158 of the first embodiment, the first and second retaining members 154', 158' have ramped surfaces corresponding to the ramped surfaces of the first and second projections 186', 190' (FIG. 11).

Figure 16:
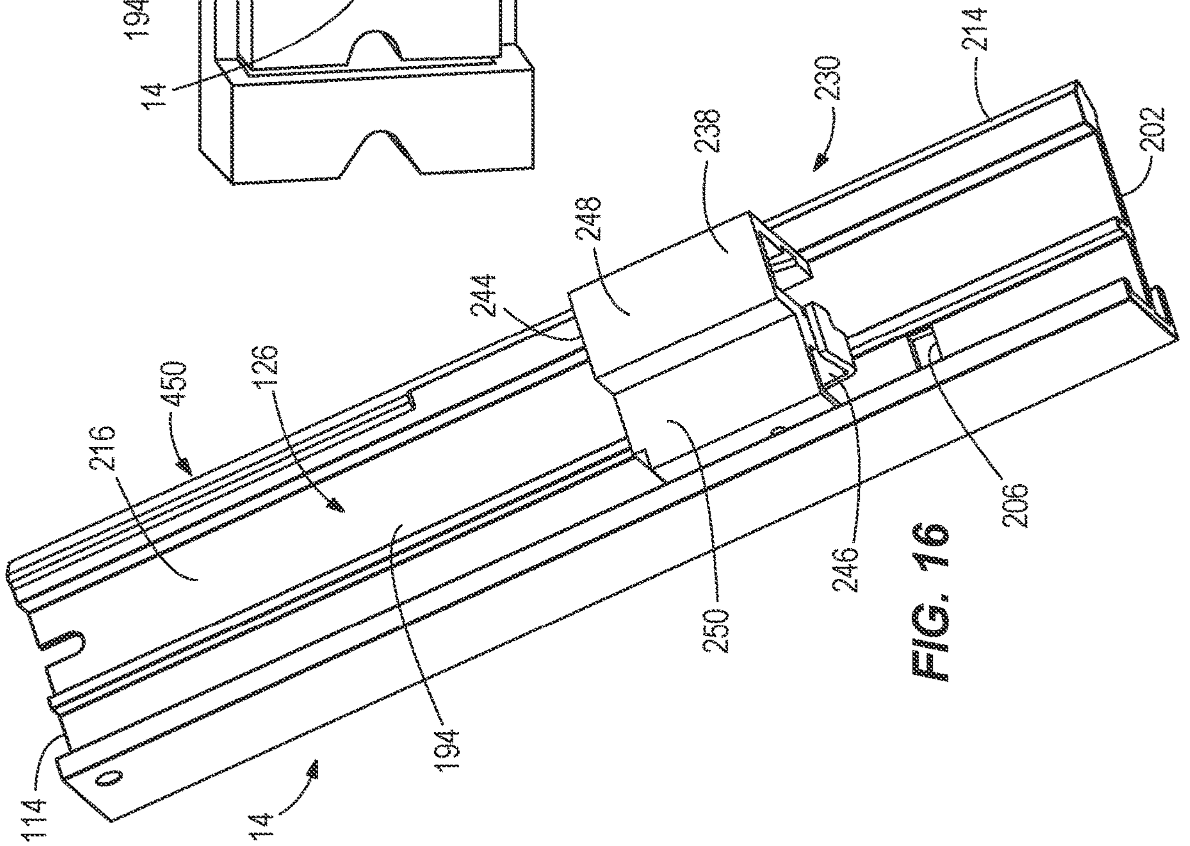
FIG. 16 is a perspective view of the magazine and a portion of the pusher assembly of FIG. 1, illustrating a lever movably supported by the pusher assembly.

With reference to FIGS. 1-3 and 12, the magazine 14 is formed by a single extruded rail 194 defining the fastener channel 126 configured to receive the staples 12. In the illustrated embodiment, the fastener channel 126 has a U-shape (represented by the dotted lines in FIG. 17) corresponding to the U-shape of the staples 12. The illustrated rail 194 includes an edge portion 214 and two opposed sidewalls 216 adjacent the edge portion 214 (FIG. 16). Each of the staples 12 is configured to straddle the edge portion 214 and the sidewalls 216 of the rail 194 when the staples 12 are received in the fastener channel 126. The illustrated magazine 14 further includes a second support member 198 (FIG. 12) coupled to the magazine 14 and positioned proximate the front end 114 of the magazine 14. The second support member 198 is positioned to inhibit or prevent the staples 12 from falling out of the fastener channel 126 (e.g., such as if the powered fastener driver 10 is moved or tipped toward a ceiling). The magazine 14 extends between the first, front end 114 and a second, rear end 202. The magazine 14 includes an opening 206 positioned proximate the second end 202, as further discussed below. In particular, the opening 206 extends through the sidewalls 216 of the rail 194.

The magazine 14 obliquely extends from the nosepiece 102 in both a plane containing the driving axis 70 (FIG. 3) and a plane that is perpendicular to the driving axis 70 (FIG. 2). In other words, the magazine 14 appears angled or obliquely oriented from both a side view (FIG. 3) of the powered fastener driver 10 and a bottom or end view (FIG. 2) of the powered fastener driver 10. For example, the magazine 14 is angled such that the magazine 14 overlaps at least a portion of the motor housing portion 46 when viewed from the side view (FIG. 3). In addition, the magazine 14 is angled such that a majority of the motor housing portion 46 is visible when viewed from the bottom view (FIG. 2).

With reference to FIGS. 12-15, the magazine 14 further includes a guide 210 positioned along the edge portion 214 of the rail 194. In addition, the guide 210 is positioned within and extends along the fastener channel 126 of the magazine 14. In particular, the collated staples 12 are received on and slidable along the guide 210. The guide 210 has a shape corresponding to a shape of the edge portion 214. The illustrated guide 210 has a "U-shaped" cross-section.

Figure 15:
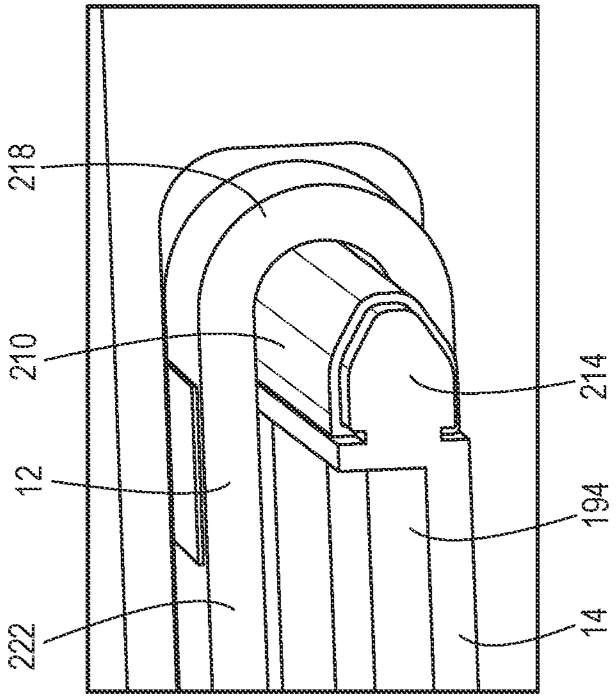
FIG. 15 is another partial cutaway of the magazine of FIG. 14 including the plurality of fasteners positioned in the fastener channel.

The rail 194 is formed from a first material and the guide 210 is formed from a second material different than the second material. Additionally, the first material has a first hardness, and the second material has a second hardness. The hardness of the first material is less than a hardness of the second material. For example, in the illustrated embodiment, the first material is aluminum, and the second material is steel. In the illustrated embodiment, magazine 14 is extruded from aluminum to form the rail 194, and the guide 210 is configured as a wear strip and is composed of a stamped metal. The guide 210 is configured to reduce wear on the plastic magazine 14 along the fastener channel 126. In other embodiments, the first material and/or second material may be plastic, metal, and/or other suitable materials. The staples 12 each have]'[; (i.e., only one leg portion 222 for each staple is shown in FIGS. 14 and 15). The crown portion 218 of the staples 12 are positioned on the guide 210, such that the guide 210 is configured to prevent the crown portion 218 from wearing the edge portion 214 of the rail 194.

Figure 17:
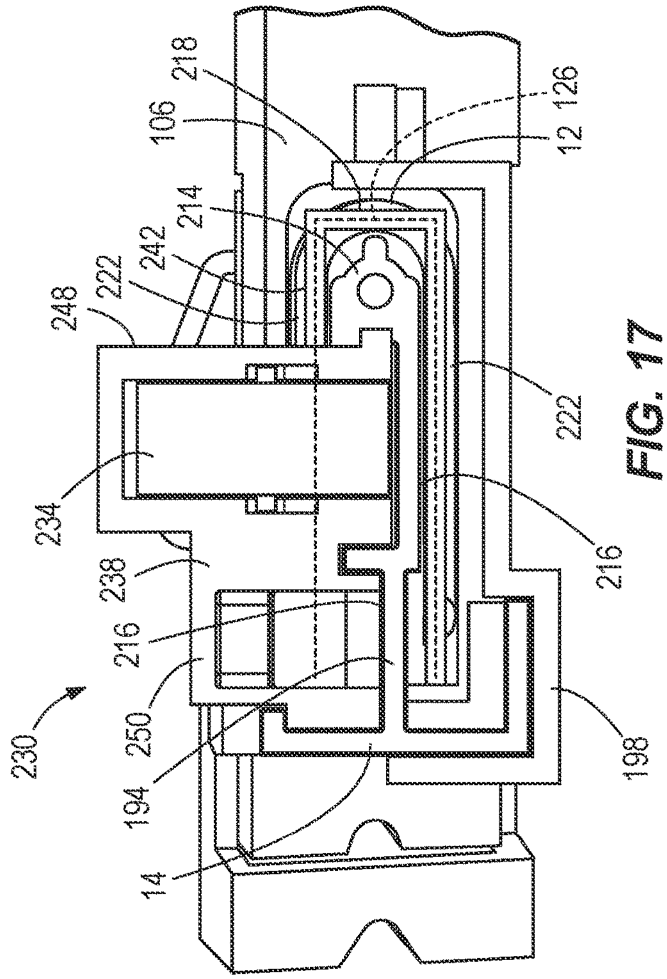
FIG. 17 is cross-sectional view of the magazine and pusher assembly of FIG. 1, illustrating a spring of the pusher assembly.

With reference to FIGS. 1 and 16-19, the magazine 14 further includes a pusher assembly 230 positioned within the fastener channel 126 of the magazine 14. The pusher assembly 230 is slidably coupled to the magazine 14 and biases the collated fastener strip toward the front end 114 of the magazine 14. In the illustrated embodiment, the pusher assembly 230 is slidably coupled to one of the sidewalls 216 of the rail 194. The magazine 14 includes a spring (e.g., coil spring 234; FIG. 17) configured to bias the pusher assembly 230 toward the front end 114 of the magazine 14 (i.e., toward the nosepiece 102). In some embodiments, the spring 234 may include one or more springs, may be an extension spring, torsion spring, and/or may be a compression spring.

Figure 1:
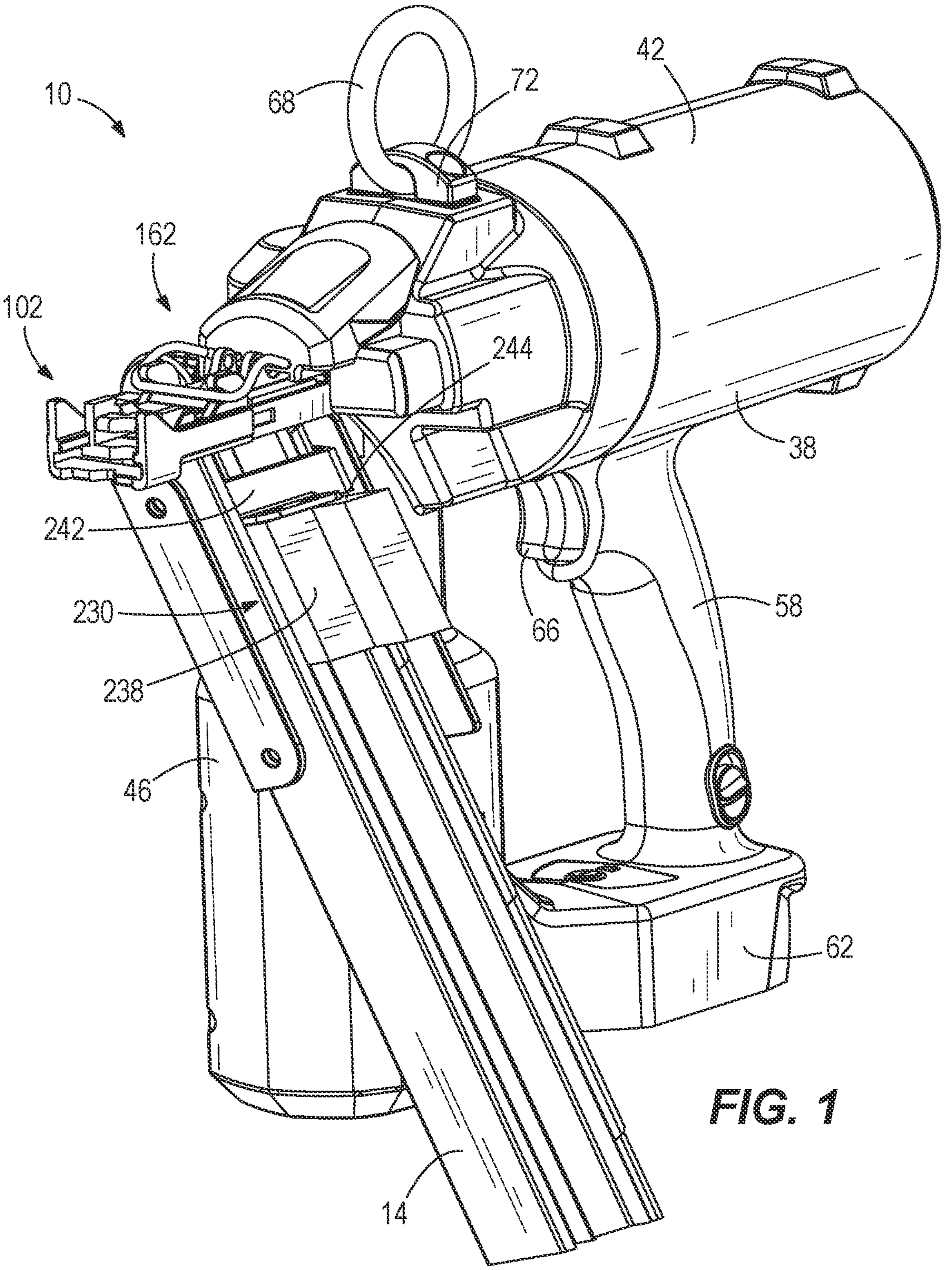
FIG. 1 is a perspective view of a powered fastener driver, illustrating a magazine and a pusher assembly.

With particular reference to FIGS. 1 and 17, the pusher assembly 230 includes a pusher body 238 and a fastener support member 242 integrated with the pusher body 238. In the illustrated embodiment, the fastener support member 242 is a separate piece coupled to an end 244 (FIG. 1) of the pusher body 238. In other embodiments, the fastener support member 242 is integrally formed with the pusher body 238.

The fastener support member 242 is configured to straddle the edge portion 214 and the sidewalls 216 of the rail 194.

The fastener support member 242 extends between the pusher body 238 and a last one of the staples 12 held within the magazine 14. In other words, the fastener support member 242 is positioned between the last one of the staples 12 and the end 244 of the pusher body 238. Furthermore, the fastener support member 242 is shaped to contact at least a portion of the shape of one of the staples 12 (i.e., the last staple in the collated strip) held within the fastener channel 126. In the illustrated embodiment, the fastener support member 242 is shaped to contact the entire shape of one of the staples 12. More specifically, in the illustrated embodiment, the fastener support member 242 is shaped to contact the entirety of the crown and legs portions 218, 222 of the rearmost staple 12 in the collated strip. As such, in the illustrated embodiment as shown in FIG. 17, the fastener support member 242 (only a portion of which is shown) is shaped to wrap around the edge portion 214 of the rail 194 of the magazine 14 corresponding to the crown portion 218 and the opposite leg portion 222. In other words, the fastener support member 242 is configured to straddle the edge portion 214 and the sidewalls 216 of the rail 194 to engage the strip of collated staples 12 supported upon the edge portion 214 of the rail 194. Accordingly, the fastener support member 242 is configured to support the entire shape of one of the staples 12 held within the fastener channel 126 of the magazine 14. In further embodiments, the fastener support member 242 is shaped to contact a plurality of staples 12.

Figure 18:
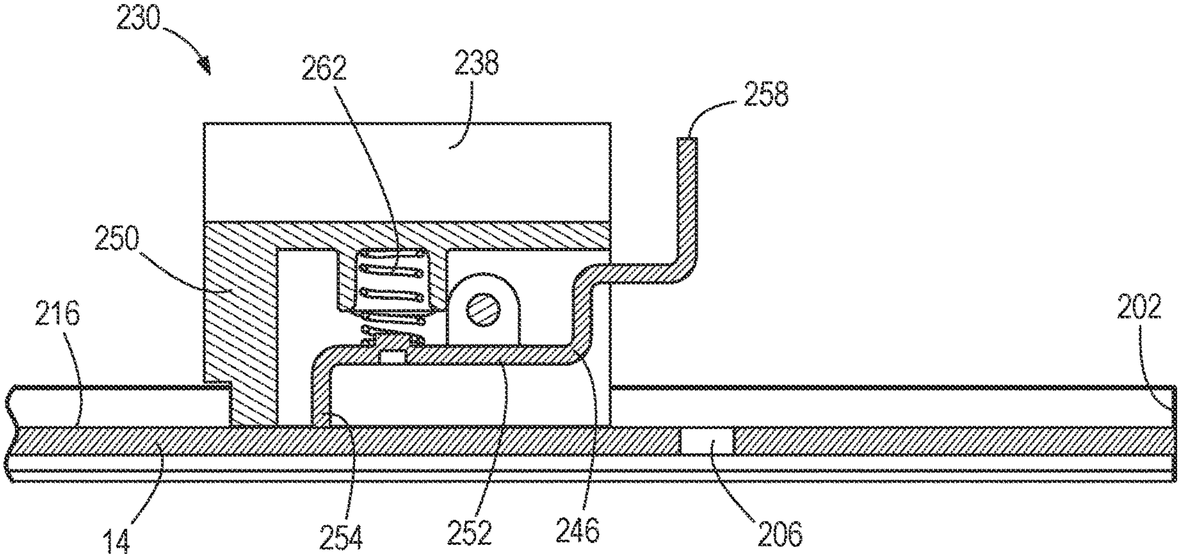
FIG. 18 is a cross-sectional view of the portion of the pusher assembly of FIG. 16, illustrating the lever in a first position.
Figure 19:
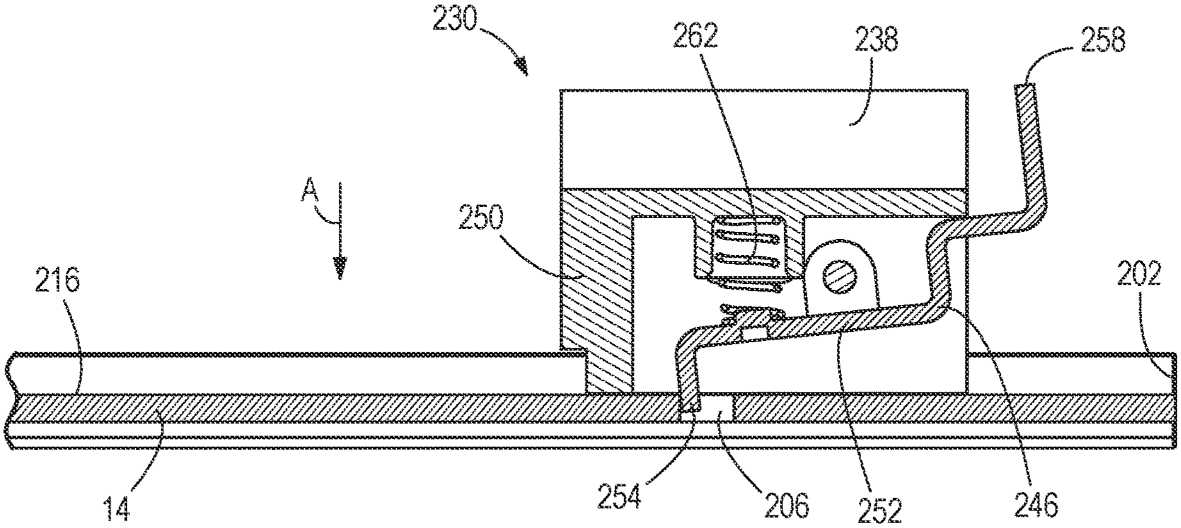
FIG. 19 is another cross-sectional view of the portion of the pusher assembly of FIG. 16, illustrating the lever in a second position.

With reference to FIGS. 16 and 18-19, the pusher assembly 230 further includes a lever 246 movably coupled to the pusher body 238. The spring 234 is supported by a first portion 248 of the pusher body 238. The lever 246 is pivotally coupled to a second portion 250 of the pusher body 238. The lever 246 includes a body 252 (FIGS. 18-19) extending between a first end 254 and a second end 258. The first end 254 is selectively receivable within the opening 206. The second end 258 is configured to be grasped by a user.

With continued reference to FIGS. 16 and 18-19, the pusher assembly 230 further includes a compression spring 262 extending between the second portion 250 of the pusher body 238 and the body 252 of the lever 246. The compression spring 262 is configured to bias the first end 254 of the lever 246 inward away from the pusher body 238 toward one of the sidewalls 216 of the rail 194 of the magazine 14. The lever 246 is pivotable relative to the pusher body 238 between a first position (FIG. 18) in which the first end 254 of the lever 246 is in contact with the sidewall 216 of the magazine 14, and a second position (FIG. 19) in which the first end 254 is received in the opening 206 of the magazine 14. The opening 206 is configured as a latch member, as further discussed below.

In operation, the pusher assembly 230 is adjustable between a normal operating state in which the collated strip of staples 12 is biased toward the nosepiece 102 by the pusher assembly 230, and a bypass state (FIG. 4) in which the pusher assembly 230 is retained in a rearward position relative to the magazine 14 such that the collated strip of staples 12 can be loaded into the magazine 14 in front of the pusher assembly 230 (i.e., along arrow A in FIG. 4). When the pusher assembly 230 is in the normal operating state, the first end 254 of the lever 246 is in contact with the sidewall 216 of the magazine 14 to maintain the lever 246 in the first position (FIG. 3) against the bias of the compression spring 262. To adjust the pusher assembly 230 into the bypass state, the user pulls the pusher assembly 230 rearward toward the second end 202 of the magazine 14 such that the coil spring 234 uncoils until the first end 254 of the lever 246 is positioned proximate the opening 206. Subsequently, the compression spring 262 pivots the first end 254 of the lever 246 inward such that the first end 254 is received in the opening 206.

The first end 254 of the lever 246 is biased into engagement with the opening 206 of the magazine 14 by the coil spring 234 for maintaining the pusher assembly 230 in the bypass state. The user may then load the collated strip of staples 12 in the magazine 14 in front of the pusher assembly 230, making the magazine 14 "top loading." To adjust the pusher assembly 230 from the bypass state into the normal operating state, the user pushes the second end 258 of the lever 246 inward toward the sidewall 216 of the magazine 14 against the bias of the compression spring 262 (from the frame of reference of FIG. 4), thereby pivoting the first end 254 of the lever 246 out of the opening 206, and the coil spring 234 biases the pusher assembly 230 toward the nosepiece 102 until the fastener support member 242 contacts a rearmost staple 12 in the collated strip.

FIGS. 20-24 illustrate an alternative magazine 14' and pusher assembly 230' of the powered fastener driver 10 according to another embodiment of the invention, with like components and features as the first embodiment of the magazine 14 and pusher assembly 230 of the powered fastener driver 10 shown in FIGS. 16-19 being labeled with like reference numerals plus a prime symbol "'". The magazine 14' and pusher assembly 230' is adapted for use with the powered fastener driver 10 of FIGS. 1-19 and, accordingly, the discussion of the powered fastener driver 10 above similarly applies to the magazine 14' and pusher assembly 230' and is not re-stated. In addition, only differences between magazine 14 and pusher assembly 230 of FIGS. 1-19 and the magazine 14' and pusher assembly 230' of FIGS. 20-24 are specifically noted herein.

Figure 20:
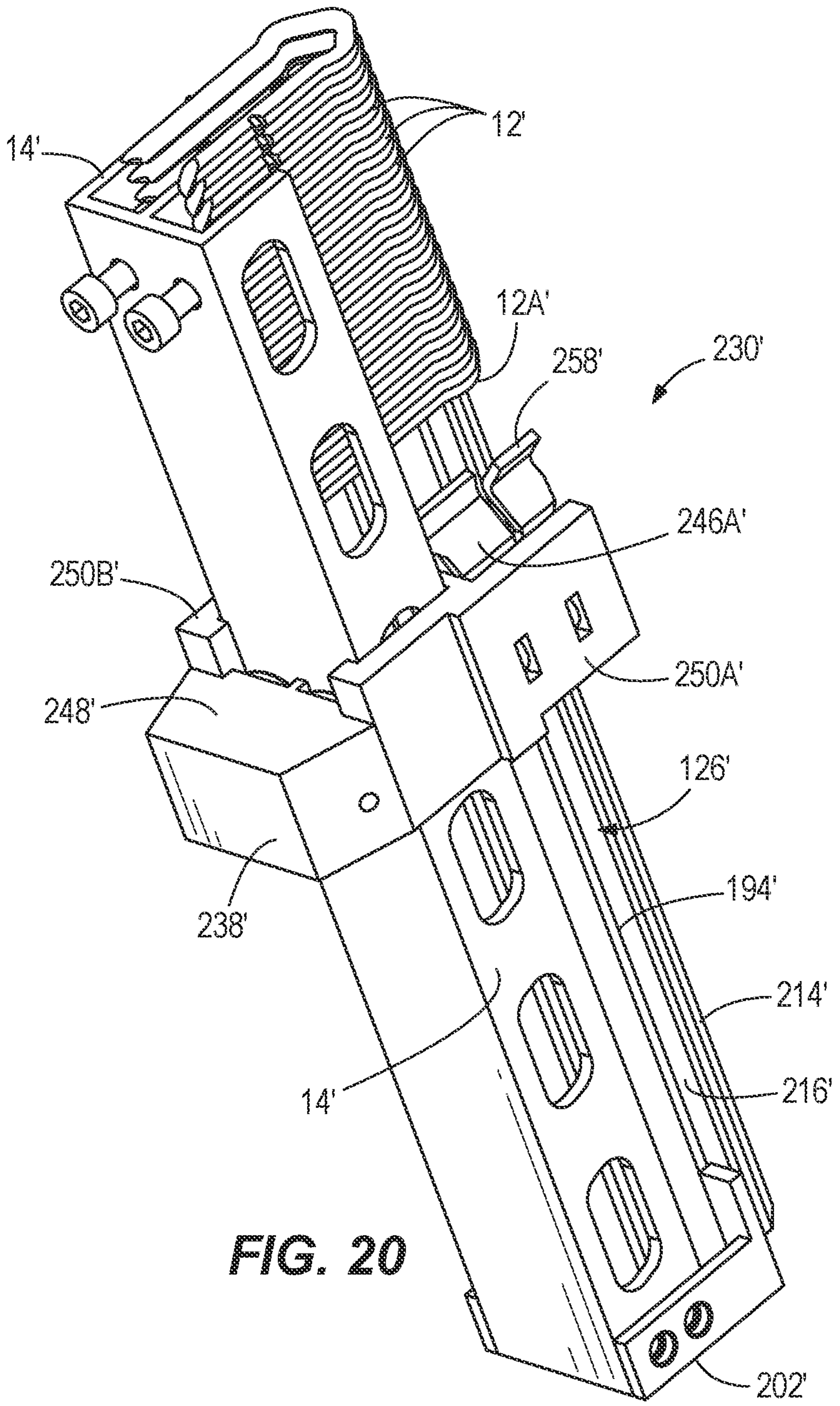
FIG. 20 is a perspective view of another magazine and pusher assembly for use with the powered fastener driver of FIG. 1.
Figure 21:
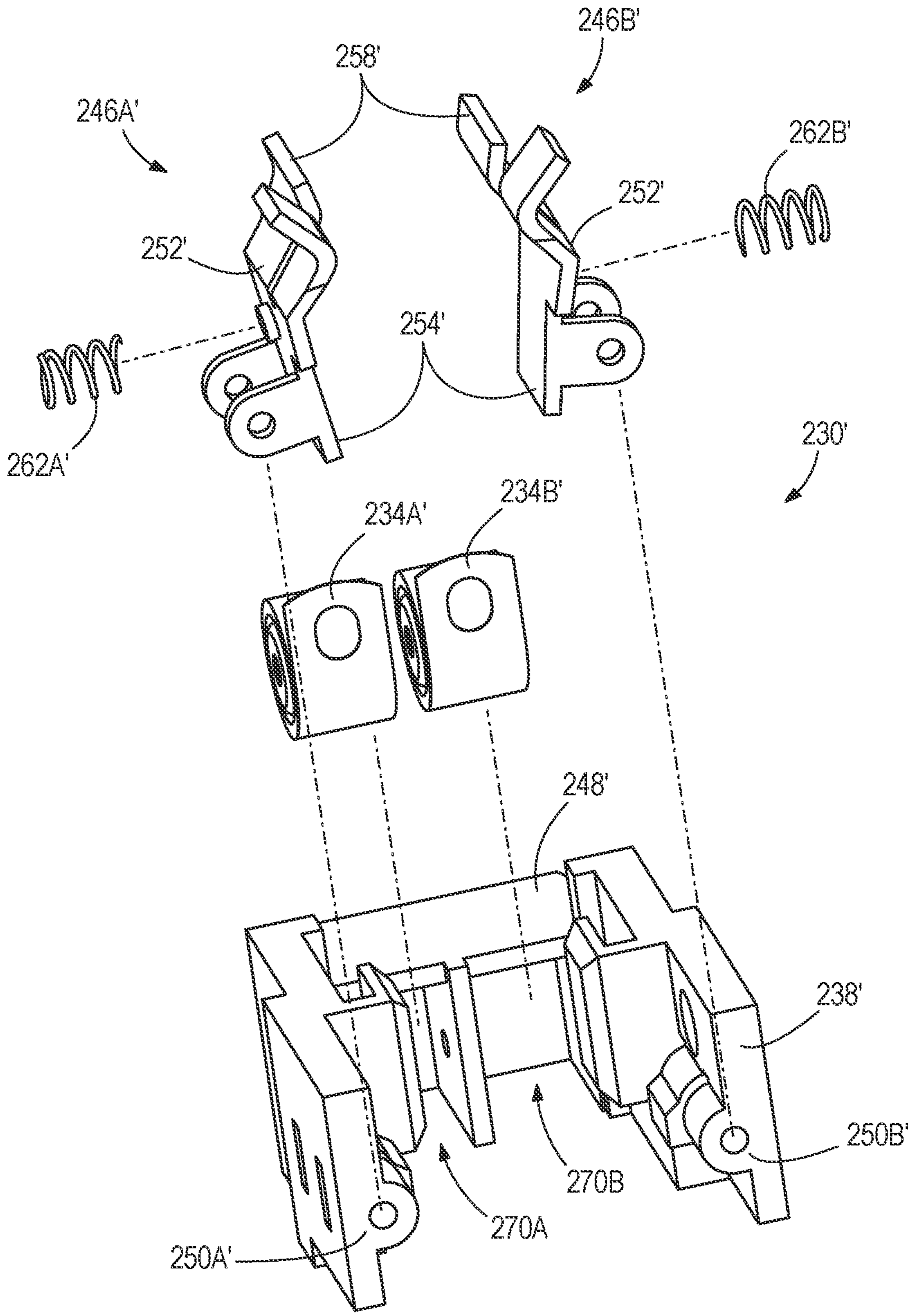
FIG. 21 is an exploded of the pusher assembly of FIG. 20, illustrating two levers of the pusher assembly of FIG. 20.

With reference to FIGS. 20-21, the pusher assembly 230' is slidably coupled to the magazine 14' and includes a pusher body 238'. The magazine 14' includes a rail 194' defining an edge portion 214' and two opposed sidewalls 216' adjacent the edge portion 214' (only one of which is shown in FIG. 20). Each of the staples 12' is configured to straddle the edge portion 214' and the sidewalls 216' of the rail 194' when the staples 12' are received in the fastener channel 126'. The illustrated pusher body 238' includes a first, bridge portion 248', and two second, arm portions 250A', 250B' extending therefrom. The pusher assembly 230' further includes a first coil spring 234A' and a second coil spring 234B' (FIG. 21) supported within first and second cavities 270A, 270B, respectively, defined by the bridge portion 248'. The first and second coil springs 234A', 234B' are configured to bias the pusher assembly 230' toward the front end 114' of the magazine 14'.

With continued reference to FIGS. 20-21, the pusher assembly 230' further includes a first pawl 246A' and a second pawl 246B' movably coupled to the pusher body 238'. In particular, the first pawl 246A' is pivotally coupled to the arm portion 250A', and the second pawl 246B' is pivotally coupled to the arm portion 250B' of the pusher body 238'. Each pawl 246A', 246B' includes a body 252' (FIG. 21) extending between a first end 254' and a second end 258'. The first end 254' is pivotally coupled to the pusher body 238'. The second end 258' is configured to contact the last or rearmost staple 12A' (FIG. 20) of the collated strip within the magazine 14'. In some embodiments, each pawl 246A', 246B' is configured to move linearly (e.g., translate) relative to the body 252', instead of pivotal movement. In further embodiments, the pusher assembly 230' includes a single pawl 246 movably coupled to the pusher body 238' and configured to support each leg portion 222 of the rearmost staple 12A'.

With reference to FIGS. 20-24, the pusher assembly 230' further includes a first compression spring 262A' and a second compression spring 262B'. Each compression spring 262A', 262B' extends between the respective arm portion 250A', 250B' of the pusher body 238 and the body 252 of the respective pawl 246A', 246B'. Each compression spring 262A', 262B' is configured to bias the second end 258' of the pawl 246A', 246B' toward the sidewalls 216' of the magazine 14' from the frame of reference of FIG. 22. More specifically, the compression spring 262A', 262B' is configured to bias the second end 258' of each pawl 246A', 246B' inward into alignment with the fastener channel 126' of the magazine 14'. Each pawl 246A', 246B' is pivotable relative to the pusher body 238' between a first position (FIGS. 22 and 24) in which the second end 258' of each pawl 246A', 246B' is in alignment with the fastener channel 126' of the magazine 14', and a second position (FIG. 23) in which the second end 258' of each pawl 246A', 246B' is moved away (e.g., laterally) from the respective sidewall 216' of the magazine 14' and out of alignment with the fastener channel 126'. More specifically, the illustrated fastener channel 126' has a U-shaped cross sectional shape formed by a cross-member portion, and a first leg portion and a second leg portion extending therefrom, and the second end 258' of the each pawl 246A', 246B' is moved in and out of the respective first and second leg portions of the fastener channel 126' when the first and second pawl 246A', 246B' are adjusted between the first and second positions.

Figure 22:
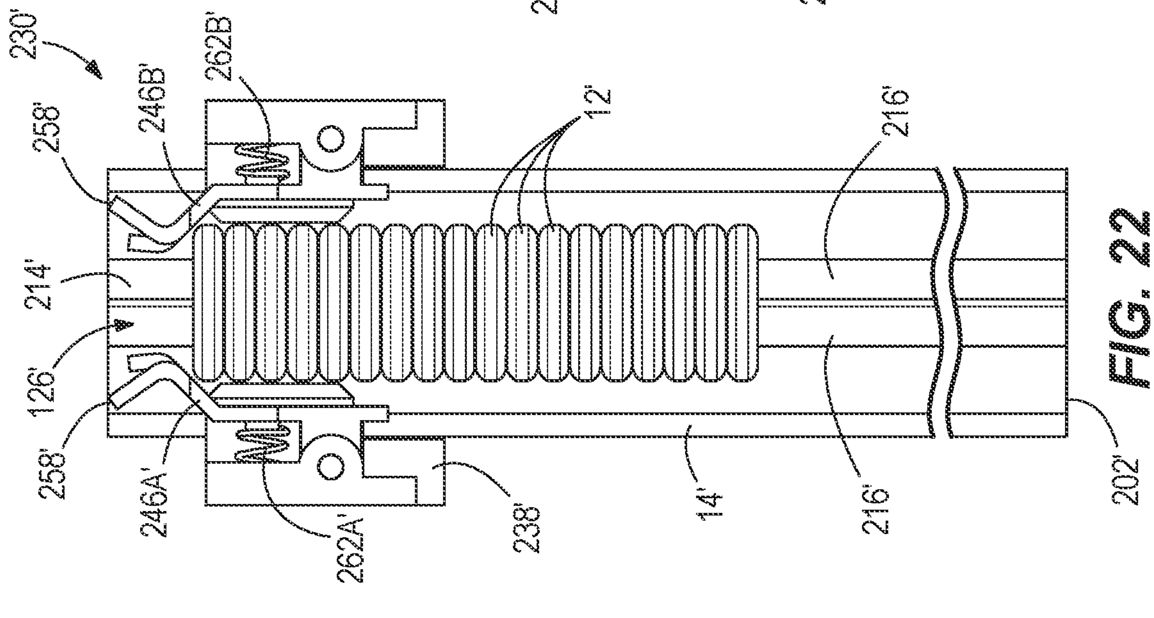
FIG. 22 is a top view of the magazine of FIG. 20, illustrating the two levers of the pusher assembly in a first position.
Figure 23:
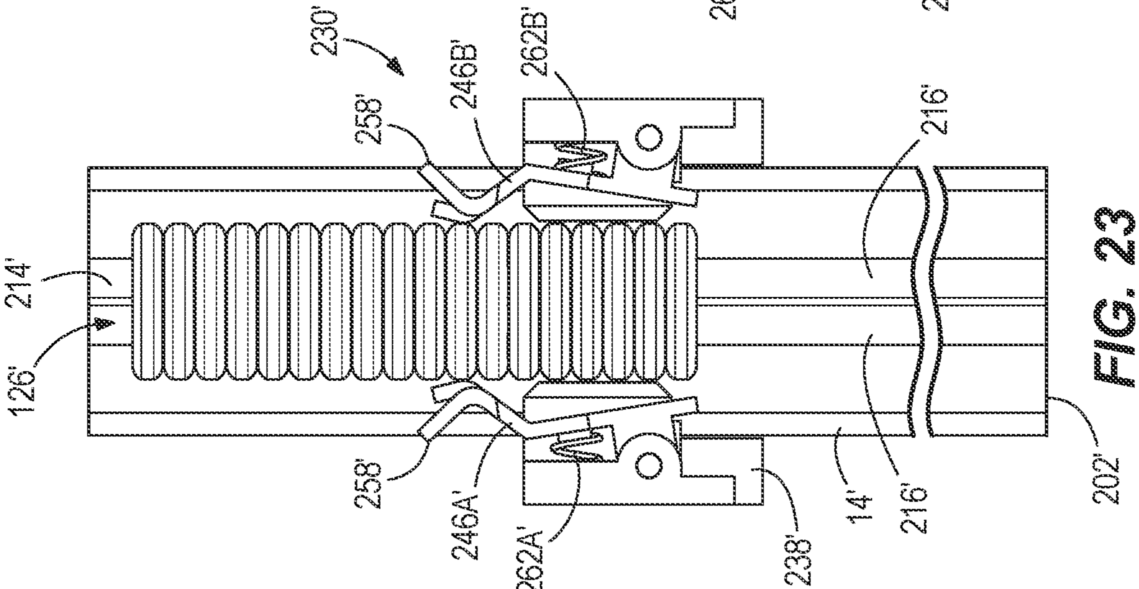
FIG. 23 is another top view of the magazine of FIG. 20, illustrating the two levers of the pusher assembly in a second position.
Figure 24:
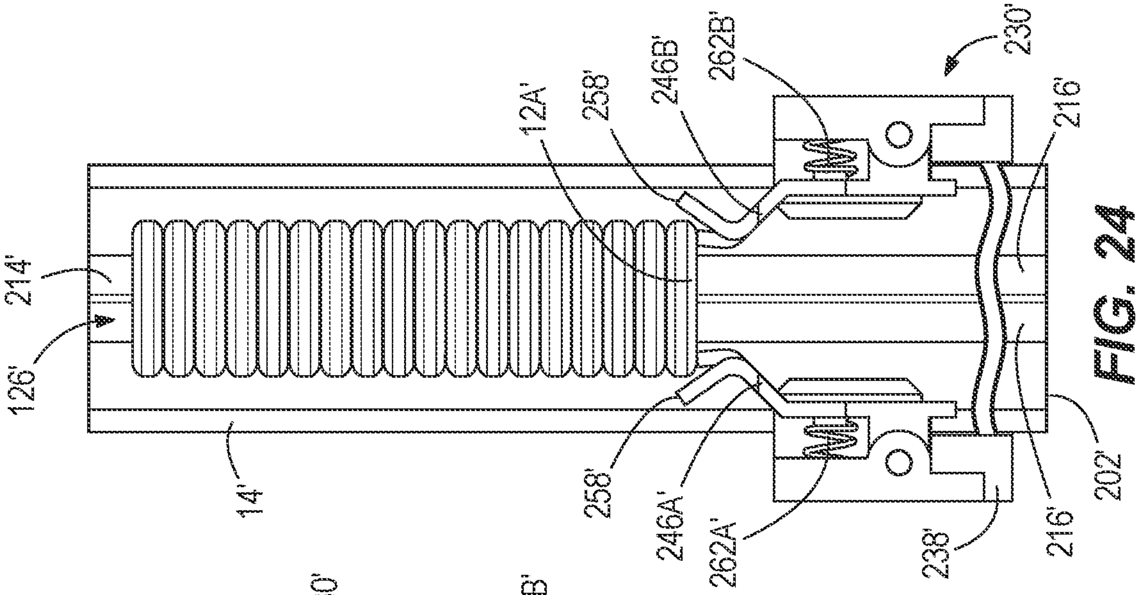
FIG. 24 is another top view of the magazine of FIG. 20, illustrating the pusher assembly in a normal operating state including the two levers in the first position.

In operation, with reference to FIGS. 22-24, the pusher assembly 230' is adjustable between a normal operating state (FIG. 24) in which the collated staple strip is biased toward the nosepiece 102 by the pusher assembly 230', and a bypass state (FIG. 23) in which each of the first and second pawls 246A', 246B' of the pusher assembly 230' are moved by the fasteners 12' within the fastener channel 126' against the bias of the first and second compression springs 262A', 262B' toward the second position as the pusher assembly 230' is moved rearward to permit the first and second pawls 246A', 246B' to bypass a new collated staple strip being loaded at the second (rear) end 202' of the magazine 14'. More specifically, the first and second compression springs 262A' 262B' bias the first and second pawls 246A', 246B toward the first position when the pusher assembly 230' is in the normal operating state. To adjust the pusher assembly 230' into the bypass state, the user pulls the pusher assembly 230' rearward (e.g., such as from a position shown in FIG. 22) toward the second end 202' of the magazine 14' such that the first and second coil springs 234A, 234B' uncoil, and the staples 12' of the new collated staple strip engage the second end 258' of each pawl 246A', 246B', thereby pivoting each end 258' of the respective pawl 246A', 246B' toward the second position against the bias of the respective compression spring 262A', 262B' (FIG. 23). Once the end 258' of each pawl 246A', 246B' clears the last or rearmost staple 12A' of the new collated staple strip, the compression springs 262A', 262B' bias the respective pawls 246A', 246B' toward the first position, thereby automatically adjusting the first and second pawls 246A', 246B' from the second position to the first position. As such, the magazine 14' is "rear loading" and the pusher assembly 230' permits the pawls 246A', 246B' to bypass the new, preloaded collated staple strip when the pusher assembly 230' is returned to its rearmost position within the magazine 14' to locate the pawls 246A', 246B' behind the collated staple strip.

In other embodiments, the first and second pawls 246A', 246B', respectively, are configured to be actuated (e.g., via a lever) by a user for moving the first and second pawls 246A', 246B' toward the second position. In further embodiments, the first and second pawls 246A', 246B' may be maintained in a latched position (e.g., such as the latch member of FIGS. 18-19) for loading.

Figure 37:
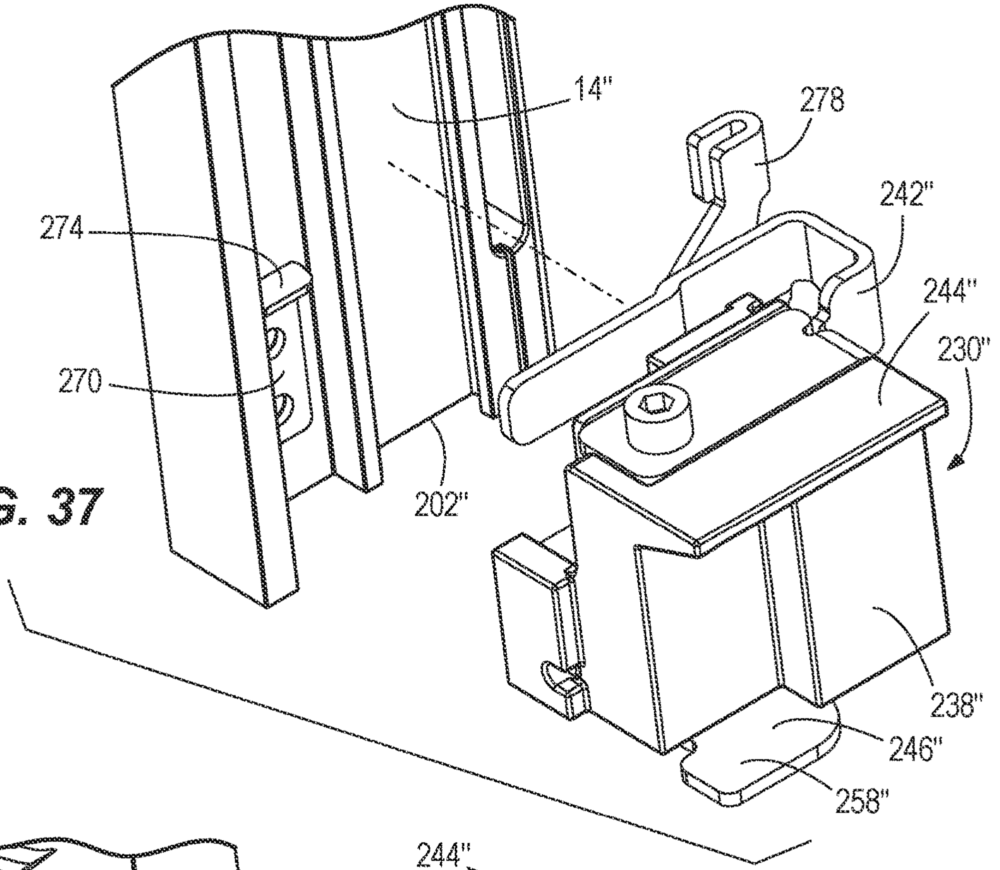
FIG. 37 is a perspective exploded view of yet another magazine and pusher assembly for use with the powered fastener driver of FIG. 1.
Figure 38:
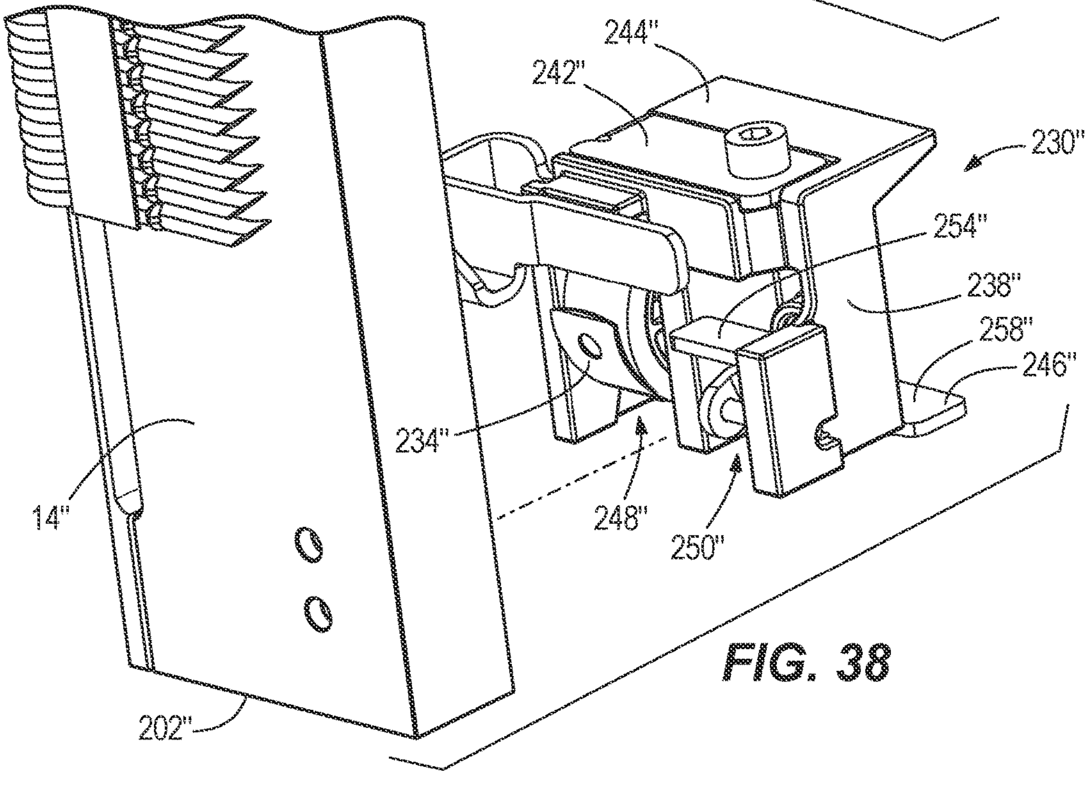
FIG. 38 is another perspective exploded view of the magazine and pusher assembly of FIG. 37.
Figure 39:
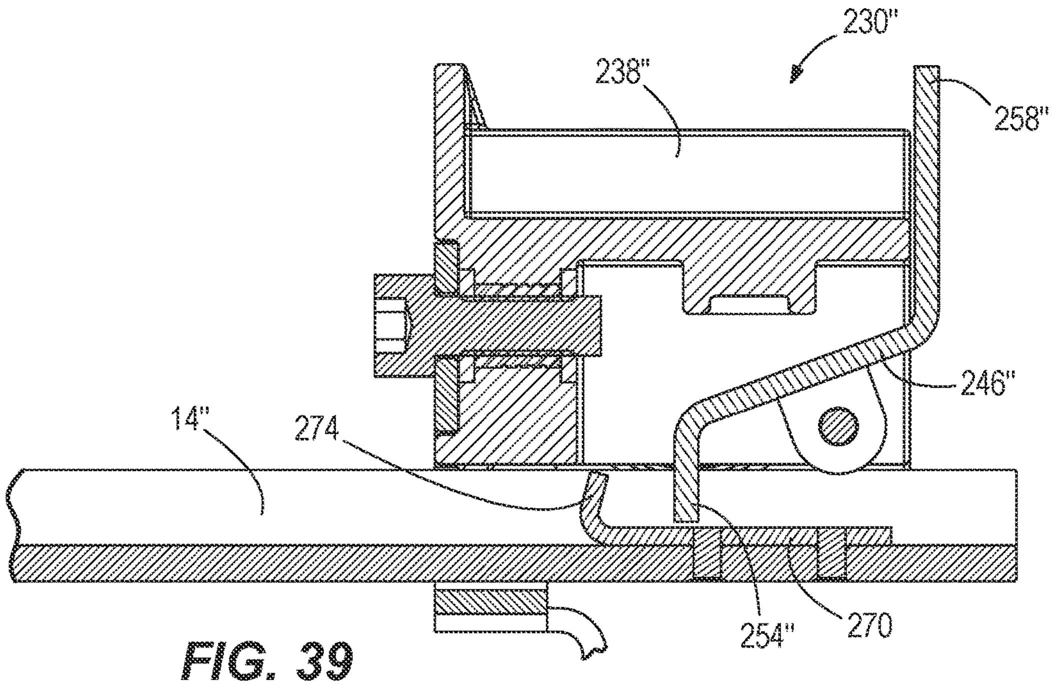
FIG. 39 is a cross-sectional view of the pusher assembly of FIG. 37.

FIGS. 37-39 illustrate another alternative magazine 14" and pusher assembly 230" of the powered fastener driver 10 according to another embodiment of the invention, with like components and features as the first embodiment of the magazine 14 and pusher assembly 230 of the powered fastener driver 10 shown in FIGS. 16-19 being labeled with like reference numerals plus a double prime symbol """. The magazine 14" and pusher assembly 230" is adapted for use with the powered fastener driver 10 of FIGS. 1-19 and, accordingly, the discussion of the powered fastener driver 10 above similarly applies to the magazine 14" and pusher assembly 230" and is not re-stated. Rather, only differences between the magazine 14 and pusher assembly 230 of FIGS. 1-19 and the magazine 14" and pusher assembly 230" of FIGS. 37-39 are specifically noted herein.

In particular, rather than the magazine 14" including the opening 206, a detent plate 270 is fastened to the magazine 14" with which the lever 246" is engageable for maintaining the pusher assembly 230" in a latched position during loading. The detent plate 270 is coupled proximate the second end 202" of the magazine 14". The detent plate 270 includes a detent 274 formed on the detent plate 270. The illustrated detent plate 270 is formed separate from and securably coupled to the magazine 14". In other embodiments, the magazine 14" may include a projection, protrusion, or other member extending outwardly from the magazine 14" in which the member may be separate from or integral with the magazine 14".

In operation, a user pulls the pusher assembly 230" toward the second end 202" of the magazine 14", and pivots the first end 254" of the lever 246" laterally outward (i.e., upward toward the pusher assembly 230" from the frame of reference of FIG. 38) against the bias of a spring (not shown; e.g., see compression spring 262 in FIG. 18) such that the first end 254" is allowed to move over the detent 274. The pusher assembly 230" is pulled, under the bias of a spring 234", toward the nosepiece 102, thereby causing engagement between the first end 254" of the lever 246" and the detent 274 for maintaining the pusher assembly 230" in the latched position. A user may release the pusher assembly 230" by pivoting the first end 254" of the lever 246" laterally outward again to allow the first end 254" to move back over the detent 274.

Furthermore, similar to the first embodiment of the pusher assembly 230 shown in FIGS. 16-19, the pusher assembly 230" includes a fastener support member 242" integrated with the pusher body 238". The fastener support member 242" includes a blocking member 278 of a dry-fire lockout mechanism 338, as further discussed below. In particular, as shown in FIG. 37, the blocking member 278 extends from the fastener support member 242" toward the nosepiece 102.

Figure 40:
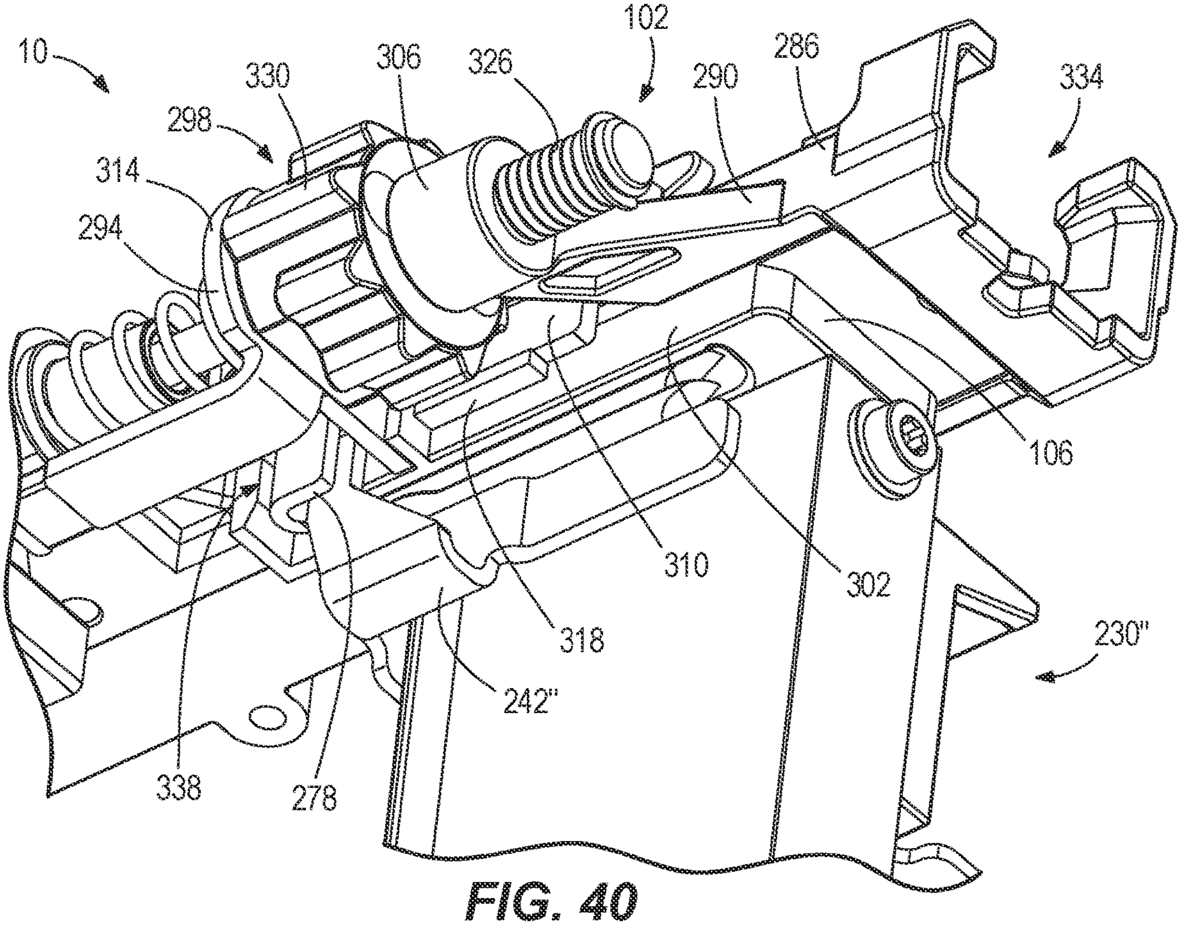
FIG. 40 is a rear perspective view of the nosepiece of FIG. 4, illustrating a dry-fire lockout mechanism.
Figure 41:
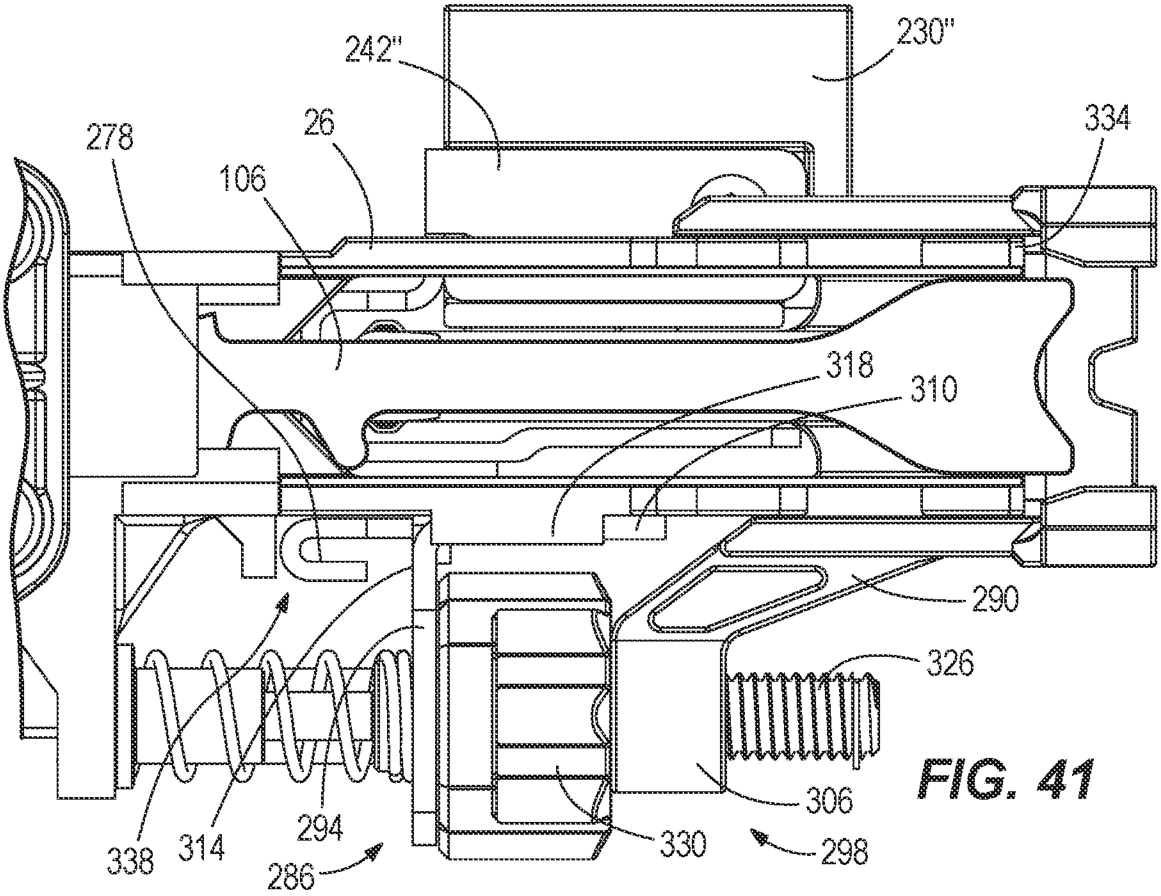
FIG. 41 is a rear view of the nosepiece of FIG. 40.
Figure 42:
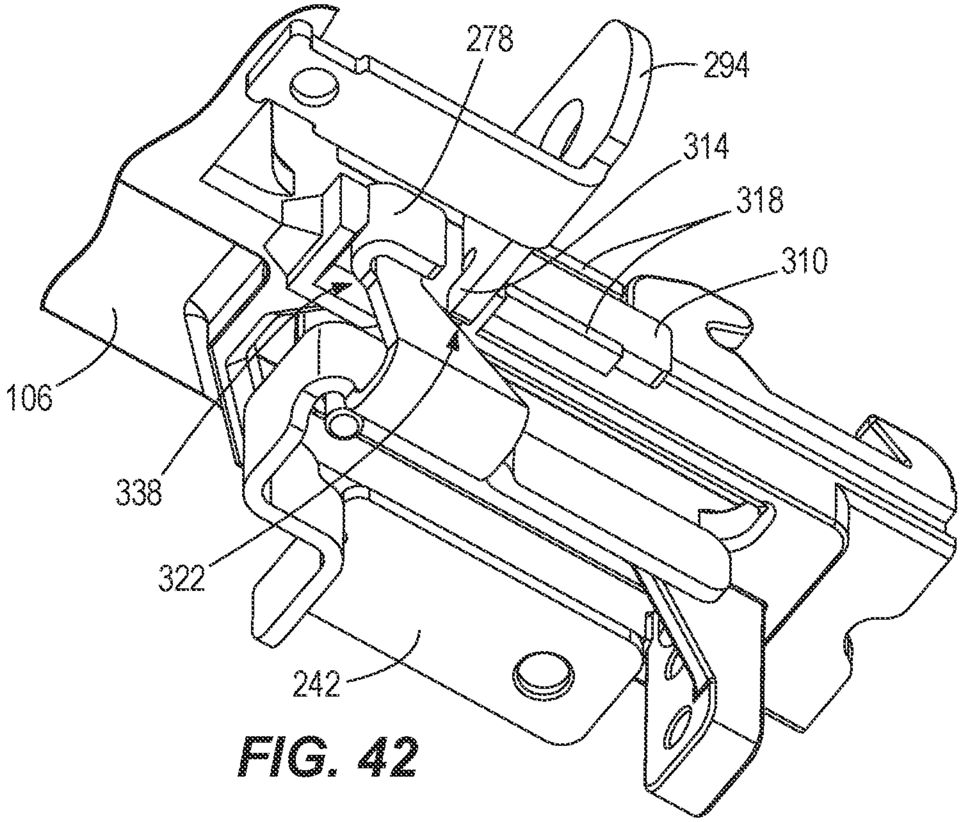
FIG. 42 is a rear perspective view of a portion of the nosepiece of FIG. 40.

With reference to FIGS. 40-42, the driver 10 further includes a workpiece contact element 286 supported by the nosepiece 102 (e.g., the nosepiece base 106). The illustrated workpiece contact element 286 includes generally two portions 290, 294 (FIG. 40). The first and second portions 290, 294 are movably coupled together by a depth of drive adjustment mechanism 298, which adjusts the effective length of the workpiece contact element 286. The first portion 290 is slidably guided along an outer surface 302 of the nosepiece base 106. In addition, the first portion 290 includes a support member 306 having internal threads.

The second portion 294 of the workpiece contact element 286 includes an elongated member 310 and an engagement member 314 extending therefrom. The elongated member 310 is slidably guided along the outer surface 302 of the nosepiece base 106. In the illustrated embodiment, the nosepiece base 106 includes ribs 318 protruding outwardly from the outer surface 302. The ribs 318 defined a channel therebetween configured to receive the elongated member 310 to facilitate guiding of the elongated member 310 along the outer surface 302 of the nosepiece base 106. The illustrated engagement member 314 is configured as a bracket coupled to the elongated member 310 by a bend 322 (FIG. 42). The engagement member 314 is configured to selectively engage with the blocking member 278 of the dry-fire lockout mechanism 338.

The workpiece contact element 286 is movable with respect to the nosepiece 102 between an extended position and a retracted position. The workpiece contact element 286 moves from the extended position to the retracted position when the workpiece contact element 286 contacts a workpiece and a force directed toward the workpiece is applied to the fastener driver 10. The workpiece contact element 286 is configured as a guide member when driving one of the staples 12 into a workpiece. In one example, the workpiece contact element 286 may facilitate a user aligning the driving axis 70 in a direction transverse to a wire member positioned adjacent the workpiece. In another example, the workpiece contact element 286 may facilitate a user aligning the driving axis 70 in a direction at an angle (e.g., forty-five degrees) relative to a wire member positioned adjacent the workpiece.

The depth of drive adjustment assembly 298 includes a screw portion 326 and an adjustment knob 330. The screw portion 326 extends between the first portion 290 and the second portion 294 of the workpiece contact element 286. The support member 306 of the first portion 290 of the workpiece contact element 286 is threadably coupled to the screw portion 326. The adjustment knob 330 is coupled for co-rotation with the screw portion 326. Rotation of the adjustment knob 330 axially threads the first portion 290 along the screw portion 326 for adjusting a protruding length of the workpiece contact element 286 relative to a distal end 334 of the nosepiece 102. More specifically, rotation of the adjustment knob 330 moves the first portion 290 relative to the second portion 294 for adjusting an effective length of the workpiece contact element 286.

The depth of drive adjustment assembly 298 adjusts the depth to which a fastener is driven into the workpiece. In particular, the depth of drive adjustment assembly 298 adjusts the length that the workpiece contact element 286 protrudes relative to the distal end 334 of the nosepiece 102, thereby changing the distance between the distal end 334 of the nosepiece 102 and the workpiece contact element 286 in the extended position. In other words, the depth of drive adjustment assembly 298 adjusts how far the workpiece contact element 286 extends past the nosepiece 102 for abutting with a workpiece. The larger the gap between the distal end 334 of the nosepiece 102 and the workpiece, the shallower the depth a fastener will be driven into the workpiece. As such, the position of the workpiece contact element 286 with respect to the nosepiece 102 is adjustable to adjust the depth to which a fastener is driven.

With continued reference to FIGS. 40-42, the powered fastener driver 10 further includes a dry-fire lockout assembly 338. The dry-fire lockout assembly 338 includes the engagement member 314 of the second portion 294 of the workpiece contact element 286 and the blocking member 278 of the pusher assembly 230".

The blocking member 278 is coupled for movement with the pusher assembly 230". The blocking member 278 is configured as a projection and is selectively engageable with the second portion 294 of the workpiece contact element 286. In particular, when a predetermined number of fasteners are remaining (e.g., five staples), the blocking member 278 is positioned in a blocking position in which the blocking member 278 overlaps the engagement member 314 of the second portion 294 of the workpiece contact element 286 to block movement of the workpiece contact element 286 toward the retracted position (e.g., to the left from the frame of reference of FIG. 41), which is a prerequisite for initiating a fastener firing cycle. More specifically, the blocking member 278 of the pusher assembly 230" extends into a path of the second portion 294 of the workpiece contact element 286 in order to prevent movement of the workpiece contact element 286 (e.g., to the left from the frame of reference of FIG. 41).

The predetermined number of fasteners remaining may be five or less. For example, in some embodiments, the predetermined number of fasteners may be 1, 2, 3, etc. In other embodiments, the predetermined number of fasteners may be zero. When the number of fasteners remaining in the magazine 14 is greater than the predetermined number of fasteners, the blocking member 278 is spaced away from the engagement member 314 such that the blocking member 278 does not extend into the path of the second portion 294 of the workpiece contact element 286 to allow the workpiece contact element 286 to move from the extended position toward the retracted position.

Figure 28:
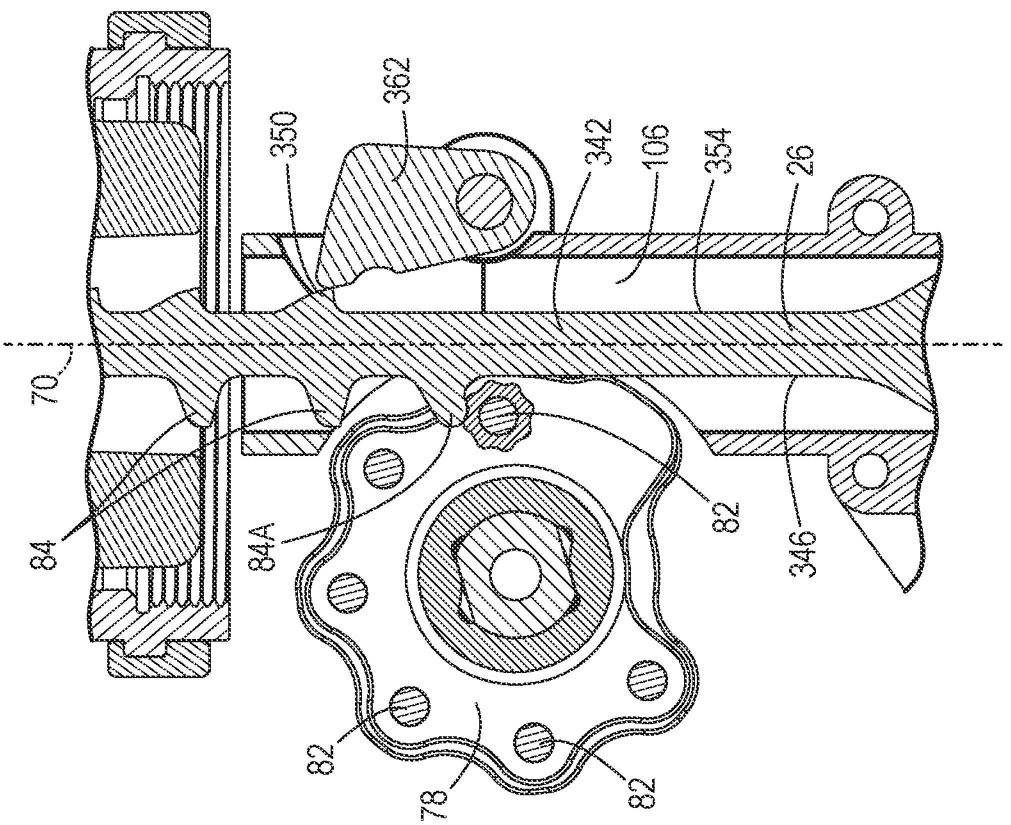
FIG. 28 is a front view of the lifting assembly of FIG. 26 and the latch of FIG. 25, illustrating the latch in a latched state, and the driver blade of FIG. 25 in the ready position.

With reference to FIGS. 4 and 28, the driver blade 26 includes a body 342. The driver blade 26 further includes the teeth 84 positioned along the length of the body 342. With particular reference to FIG. 28, the teeth 84 extend from a first side 346 of the driver blade 26 in a non-perpendicular direction relative to the driving axis 70. The drive pins 82 (or roller bushings positioned on each of the drive pins 82) of the lifting assembly 74 are engageable with the teeth 84 for returning the driver blade 26 from the BDC position to the TDC position (with stopping at the intermediate “ready” position just short of TDC). In the illustrated embodiment, a lowermost one 84A of the teeth 84 is configured to engage with the respective drive pin 82 for maintaining the driver blade 26 in the ready position. The driver blade 26 further includes axially spaced projections 350 formed on a second side 354 opposite the teeth 84.

With reference to FIG. 6, the driver 10 further includes a latch assembly 358 having a pawl or latch 362 for selectively holding the driver blade 26 in an intermediate position located between the BDC position and the ready position against a biasing force (i.e., the pressurized gas in the storage chamber 30) (i.e., for clearing a jam, etc.). The intermediate position may be any position at which the driver blade 26 stops between the BDC position and the ready position. A separate actuator 370, as further discussed below, is provided for releasing the latch assembly 358 from the driver blade 26. In other words, the latch assembly 358 is moveable between a latched state in which the driver blade 26 is held in the intermediate position (e.g., for clearing a jam, etc.), and a released state in which the driver blade 26 is permitted to be driven by the biasing force toward the driven position.

Figure 26:
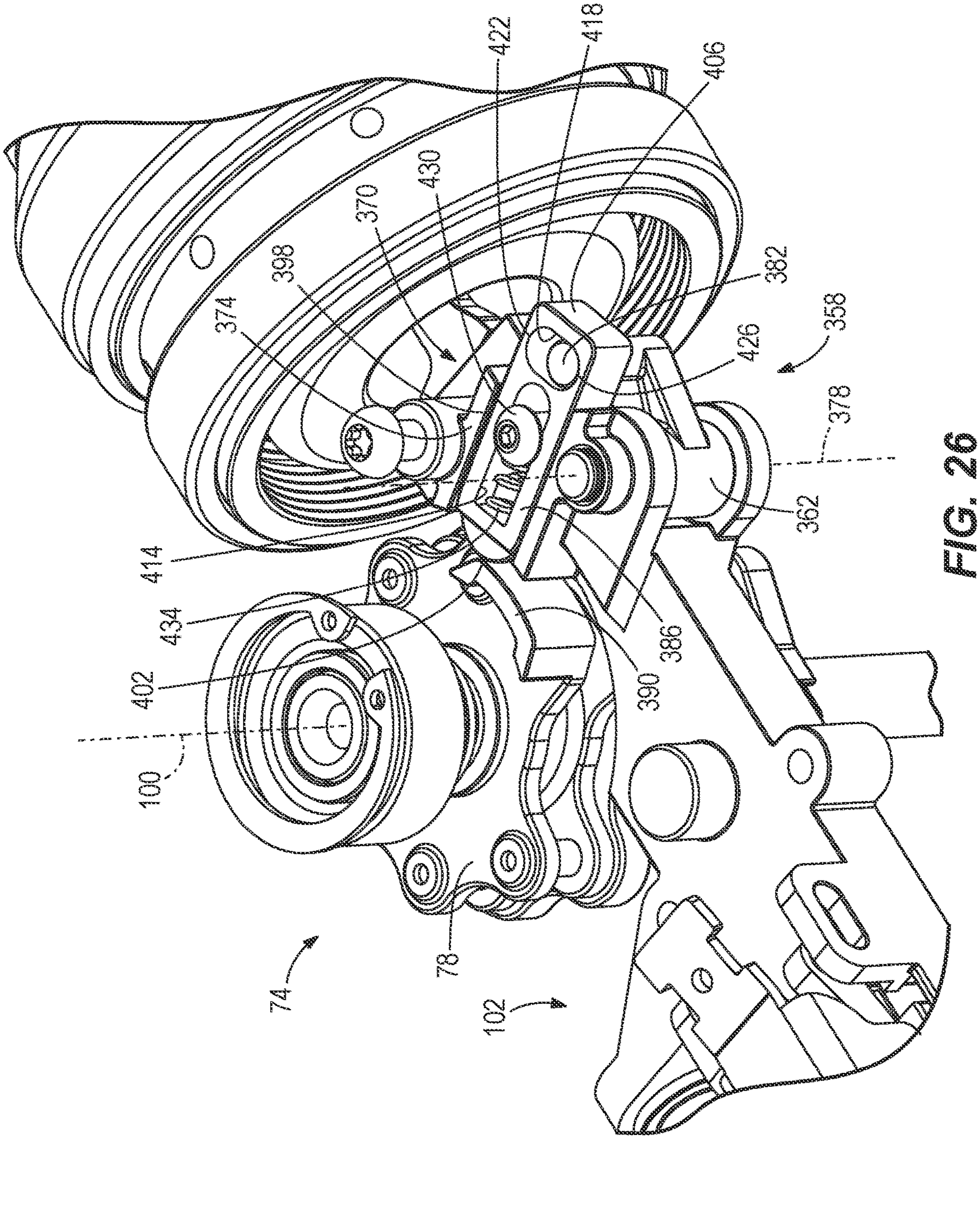
FIG. 26 is a perspective view of the nosepiece and the latch of FIG. 25, the latch operatively coupled to a lifting assembly by a latch actuator assembly.

With reference to FIG. 26, the latch 362 is movably supported by a support portion 374 of the nosepiece 102. More specifically, the latch 362 is rotatable about a pivot axis 378 defined by a shaft (not shown) of the latch assembly 358. The pivot axis 378 is parallel with the rotational axis 100 of the lifter 78. The latch 362 includes a protrusion 382 extending therefrom, as further discussed below.

The latch 362 is moveable between a latched position (coinciding with the latched state of the latch assembly 358) in which the latch 362 is engaged with one of the projections 350 on the driver blade 26 for holding the driver blade 26 in the intermediate position, and a released position (coinciding with the released state of the latch assembly 358) in which the latch 362 is moved away from the driver blade 26 to permit the driver blade 26 to be driven by the gas spring from the intermediate position to the driven position.

FIGS. 25-36 illustrate one embodiment of the actuator 370 of the latch assembly 358 for selectively releasing the latch 362 from the driver blade 26. The actuator 370 is referred to herein as a latch actuator assembly. In particular, the latch actuator assembly 370 is integrated with the lifting assembly 74 for selectively moving the latch 362 from the latched position to the released position. The latch assembly 358 is mechanically operated by the latch actuator assembly 370, rather than electrically operated such as via a solenoid, for controlling the movement of the latch 362.

The latch actuator assembly 370 includes a latch actuator member 386 and a cam member 390. The latch actuator member 386 is operatively coupled between the lifter 78 and the latch 362. The latch actuator assembly 370 is supported by the support portion 374 of the nosepiece 102. In addition, the latch actuator assembly 370 is positioned proximate the lifter 78 and forward of the driver blade 26 (e.g., above the driver blade 26 from the frame of reference of FIG. 26). The frame 86 of the driver 10 may surround the latch actuator assembly 370, as shown in FIG. 25, or alternatively the frame 86 may include the support portion 374 defining a slot 394 configured to receive the latch actuator assembly 370, as shown in FIG. 6.

Figure 27:
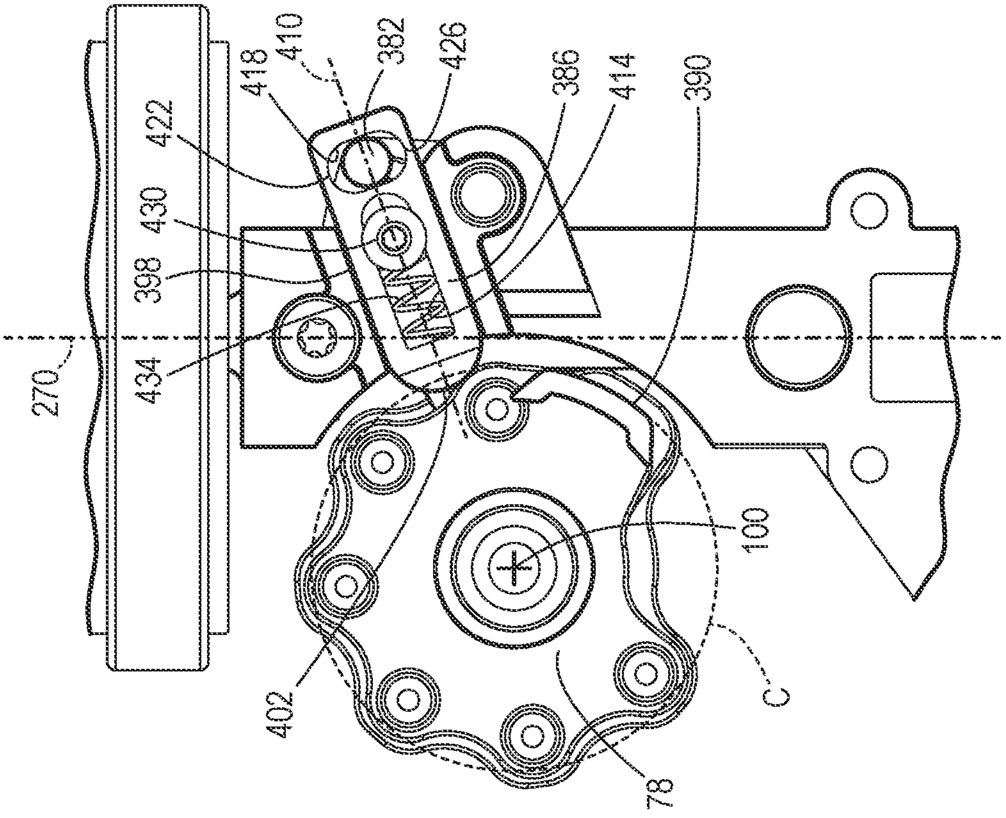
FIG. 27 is a front view of the lifting assembly and latch actuator assembly of FIG. 26.

The latch actuator member 386 includes a body 398 extending between a first end 402 and a second end 406. The body 398 defines a sliding axis 410 extending through the first end 402 and the second end 406. The sliding axis 410 extends at an angle relative to the driving axis 70 (FIG. 27). The body 398 further defines a first elongated slot 414 and a second elongated slot 418. The first elongated slot 414 extends along the sliding axis 410. The second elongated slot 418 is positioned between the first elongated slot 414 and the second end 406 of the latch actuator member 386. The second elongated slot 418 extends perpendicular to the sliding axis 410 between a first end 422 and a second, opposite end 426.

A connector 430 (e.g., fastener such as a screw) and a biasing member 434 (e.g., compression spring) are received within the first elongated slot 414. The connector 430 movably supports the latch actuator member 386 on the support portion 374 of the nosepiece 102. More specifically, the connector 430 is fixedly coupled to the nosepiece base 106, and the latch actuator member 386 is movable relative to the connector 430 along the sliding axis 410. The connector 430 is configured to inhibit or prevent movement of the latch actuator member 386 in a direction parallel to the pivot axis 378 (e.g., upward and downward from the frame of reference of FIG. 26.) The biasing member 434 extends between the connector 430 and an end of the first elongated slot 414 that is proximate the first end 402 of the body 398 (and the lifter 78). The biasing member 434 is configured to bias the latch actuator member 386 toward the lifter 78. The second elongated slot 418 receives the protrusion 382 of the latch 362. The second elongated slot 418 is sized such that the protrusion 382 is engageable with and movable relative to the latch actuator member 386.

The cam member 390 is coupled for co-rotation with the lifter 78 of the lifting assembly 74. In the illustrated embodiment, the cam member 390 is integral with the lifter 78. In other embodiments, the cam member 390 may be separate from the lifter 78. The cam member 390 has a surface that protrudes outwardly from the lifter 78. More specifically, with reference to FIG. 27, the lifter 78 defines a circumference C, and the cam member 390 extends radially outward relative to the rotational axis 100 of the lifter 78 past the circumference C defined by the lifter 78. A size of the circumference C is selected for allowing the engagement between the drive pins 82 of the lifter 78 and the teeth 84 of the driver blade 26. In other embodiments, the cam member 390 or portions thereof is positioned on or radially inward of the circumference C. In addition, the cam member 390 is positioned forward of the lifter 78 (e.g., above from the frame of reference of FIG. 26) such that the cam member 390 is positioned forward of the driver blade 26 and aligned with the first end 402 of the latch actuator member 386. The cam member 390 is located at a predetermined circumferential location about the circumference C such that the cam member 390 is configured to selectively engage the first end 402 of the latch actuator member 386 for moving the latch actuator member 386, and thereby the latch 362, from the latched position to the released position.

Figure 29:
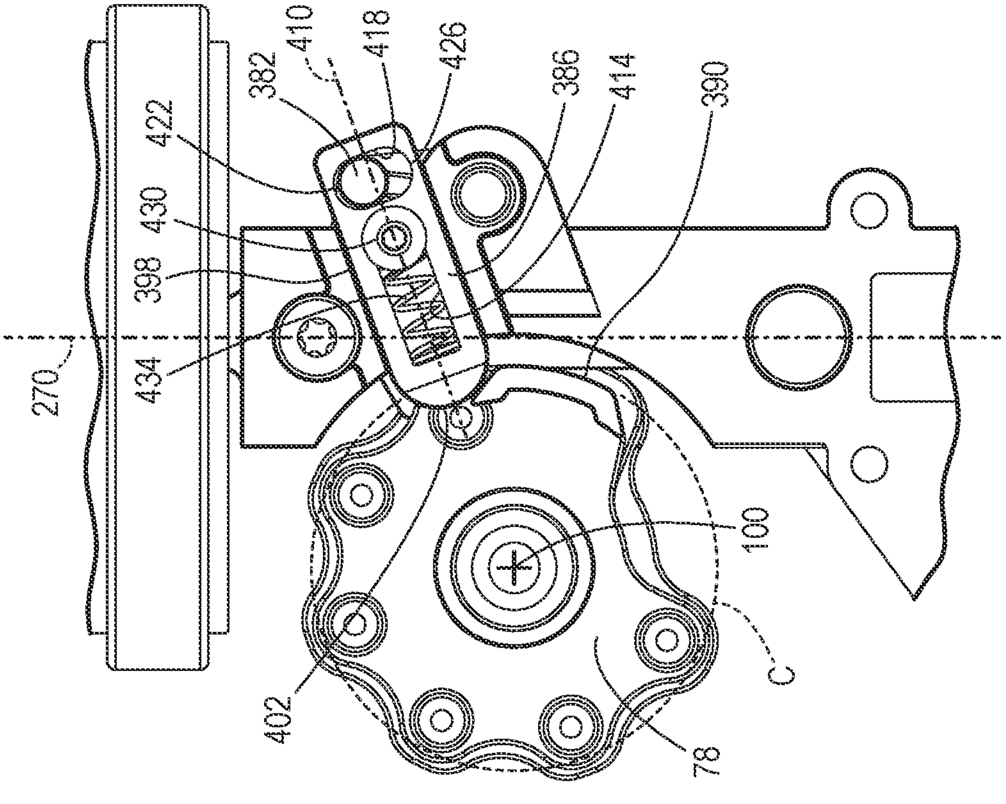
FIG. 29 is another front view of the lifting assembly and latch actuator assembly of FIG. 26, illustrating a position of the latch actuator assembly relative to the lifting assembly as the driver blade moves from the ready position toward the top-dead-center position.
Figure 34:
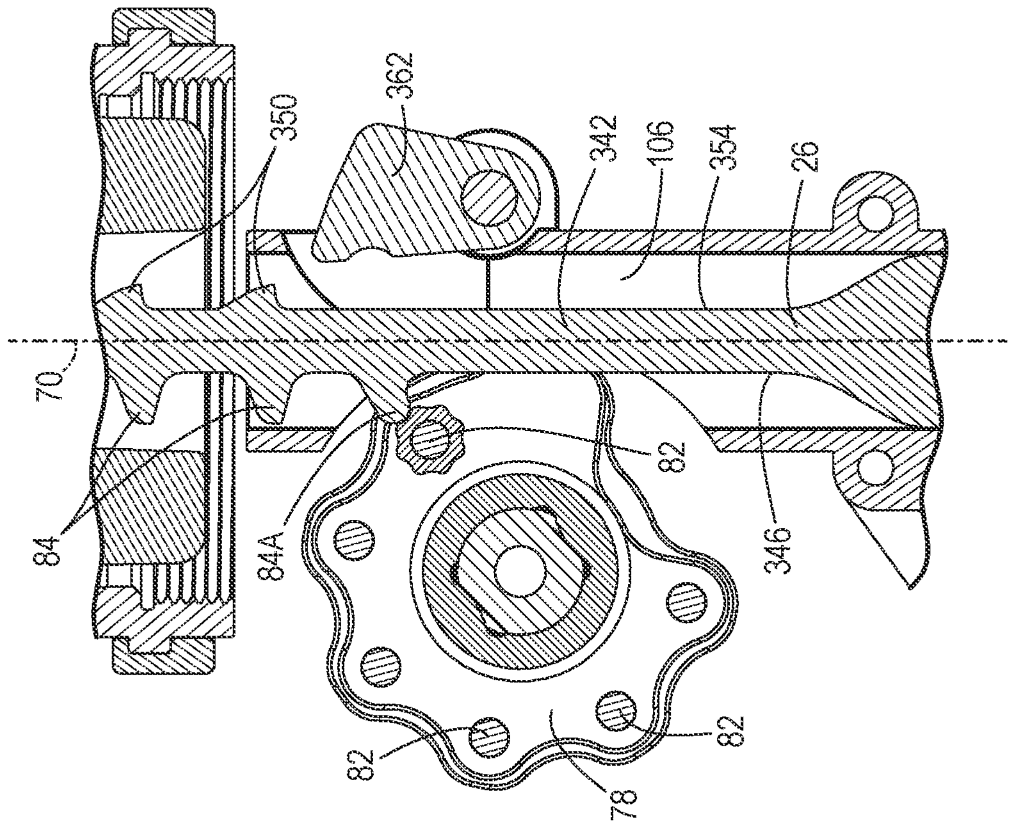
FIG. 34 is another front view of the lifting assembly of FIG. 26 and the latch of FIG. 25, illustrating the latch in the released state, and the driver blade of FIG. 25 in the top-dead-center position.
Figure 33:
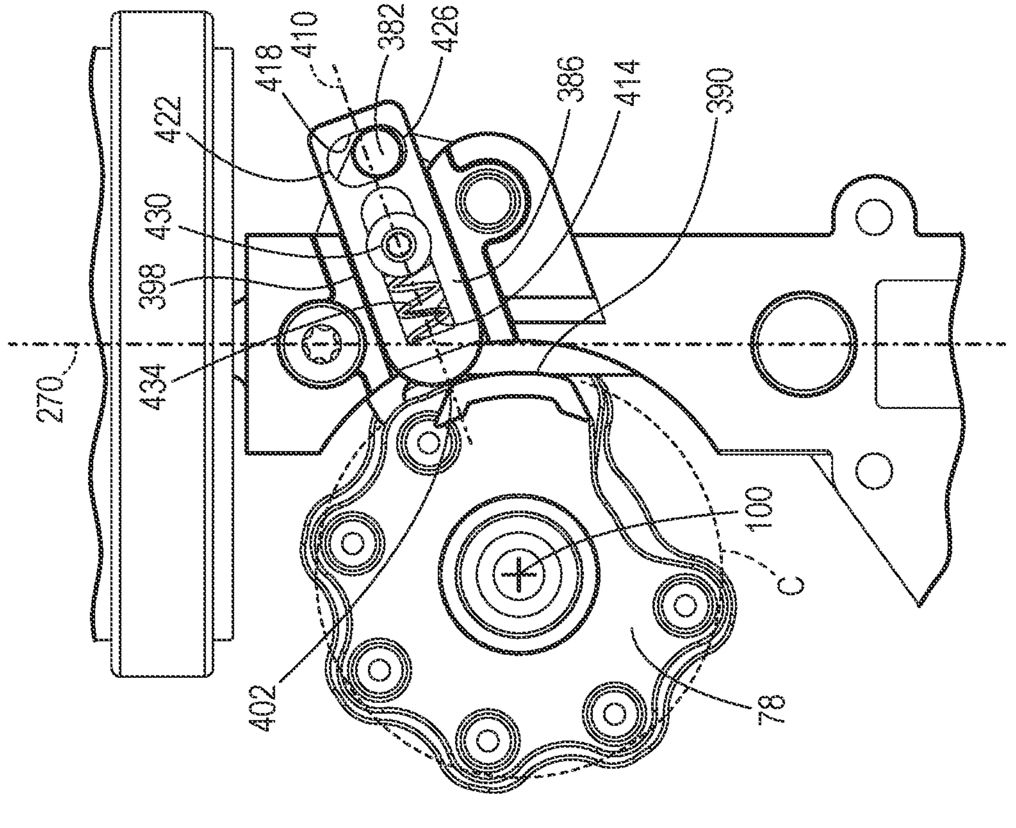
FIG. 33 is another front view of the lifting assembly and latch actuator assembly of FIG. 26, illustrating a position of the latch actuator assembly relative to the lifting assembly when the driver blade is in the top-dead-center position.

In particular, when the lifter 78 is returning the driver blade 26 toward the TDC position, the biasing member 434 is configured to bias the latch actuator member 386 toward the lifter 78, and the protrusion 382 is positioned proximate the first end 422 of the second elongated slot 418, thereby positioning the latch 362 is in the latched position, as shown in FIG. 28. As the driver blade 26 approaches the TDC position, as shown in FIG. 29, the cam member 390 is located at the predetermined circumferential location to engage the latch actuator member 386, and move the latch actuator member 386, and thereby the latch 362 from the latched position toward the released position against the bias of the biasing member 434. More specifically, with reference to FIGS. 27-34, as the lifter 78 rotates (to move the driver blade 26 from the ready position to the TDC position as shown in FIGS. 28 and 34, respectively), the cam member 390 is configured to linearly move the latch actuator member 386 along the sliding axis 410 away from the lifter 78. Concurrently, the second elongated slot 418 is configured to engage the protrusion 382 of the latch 362 as the latch actuator member 386 moves to pivot the latch 362 about the pivot axis 378 from the latched position toward the released position. In addition, the second elongated slot 418 moves relative to the protrusion 382, with the movement of the latch actuator member 386, to locate the protrusion 382 closer to the second end 426 of the second elongated slot 418.

When the protrusion 382 is positioned at the second end 426 within the second elongated slot 418 (FIG. 33), the driver blade 26 is at the TDC position and the latch 462 has been pivoted completely out of the way of the driver blade 26 (FIG. 34), and subsequently the driver blade 26 is configured to be driven from the TDC position to the BDC position by the gas spring. The lifter 78 continues to rotate to return the driver blade 26 from the BDC position toward the ready position such that the cam member 390 is configured to rotate past and disengage from the latch actuator member 386. The latch actuator member 386 is moved toward the lifter 78 again by the bias of the biasing member 434 after the cam member 390 has completely disengaged from the latch actuator member 386. The second elongated slot 418 moves relative to the protrusion 382, thereby repositioning the protrusion 382 proximate the first end 422 of the second elongated slot 418, and the latch 462 is again in the latched position. As such, the movement of the latch 462 between the latched position and the released position is based on the predetermined circumferential location of the cam member 390 as the lifter 78 rotates through a firing cycle. Furthermore, the latch actuator assembly 370 is configured to adjust rotational movement of the lifter 78 into select pivoting movement of the latch 362 via a linear sliding movement of the latch actuator assembly 370.

Figure 30:
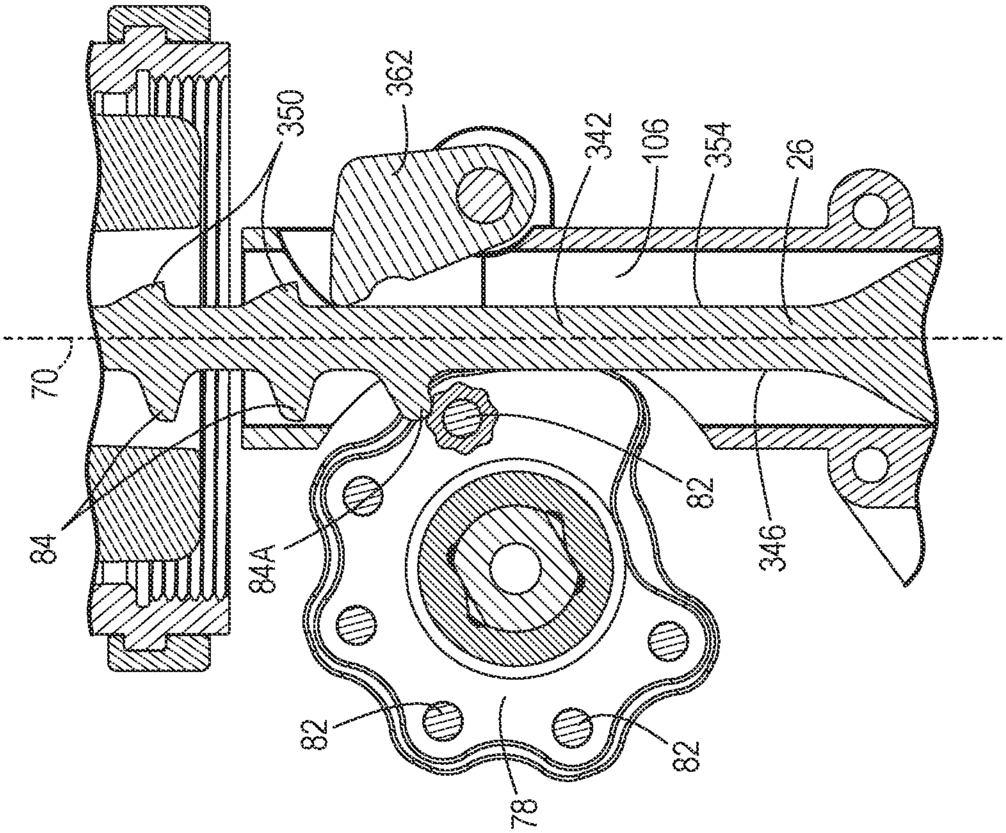
FIG. 30 is another front view of the lifting assembly of FIG. 26 and the latch of FIG. 25, illustrating the latch in the latched state, and the driver blade of FIG. 25 in a position between the ready position and the top-dead-center position.
Figure 32:
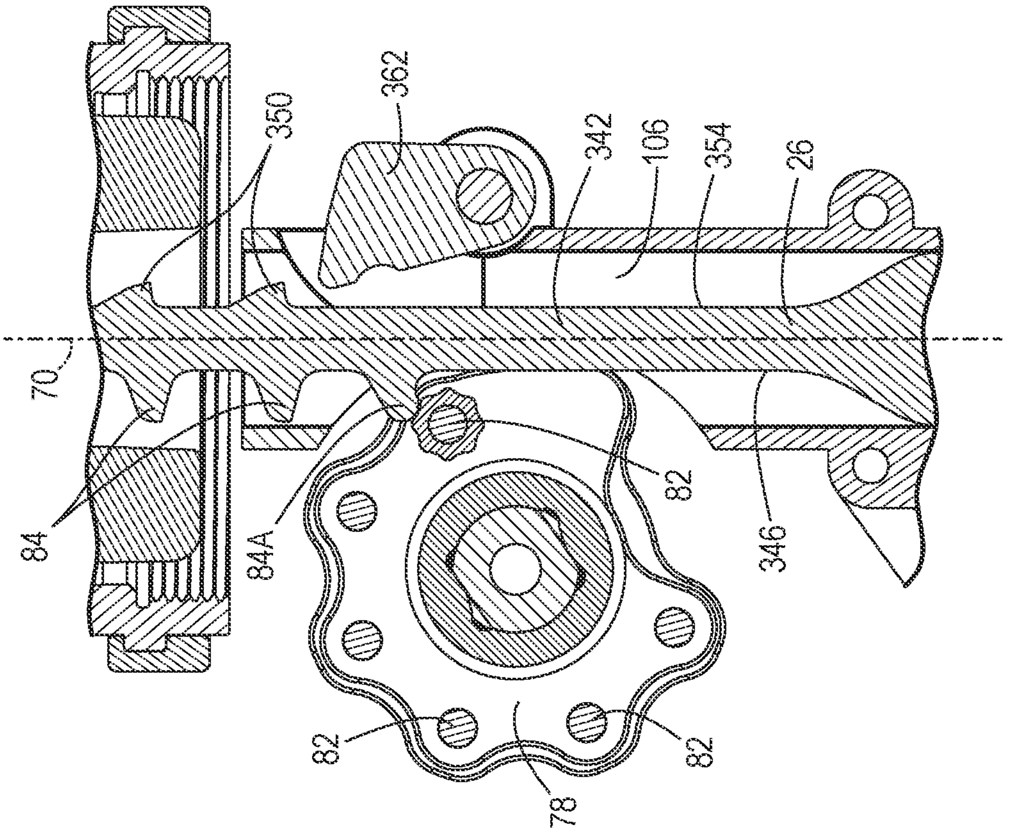
FIG. 32 is another front view of the lifting assembly of FIG. 26 and the latch of FIG. 25, illustrating the latch in a position between the latched state and a released state, and the driver blade of FIG. 25 in a position between the ready position and the top-dead-center position.
Figure 31:
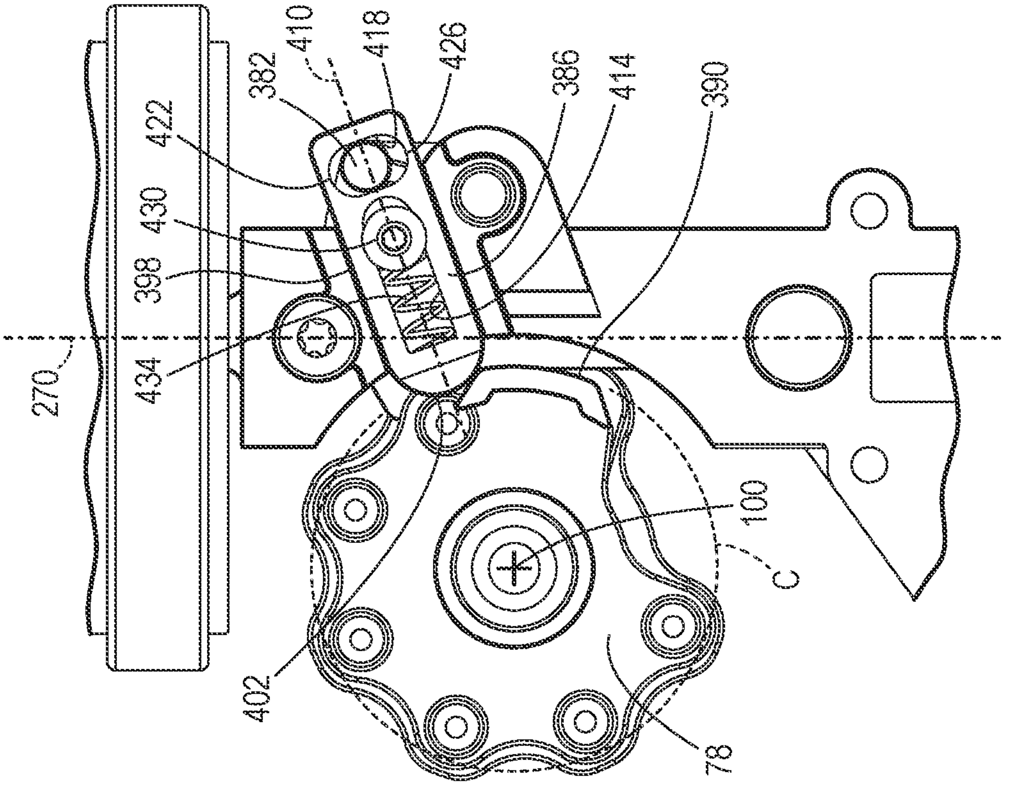
FIG. 31 is another front view of the lifting assembly and latch actuator assembly of FIG. 26, illustrating a position of the latch actuator assembly relative to the lifting assembly as the driver blade moves from the ready position toward the top-dead-center position.
Figure 36:
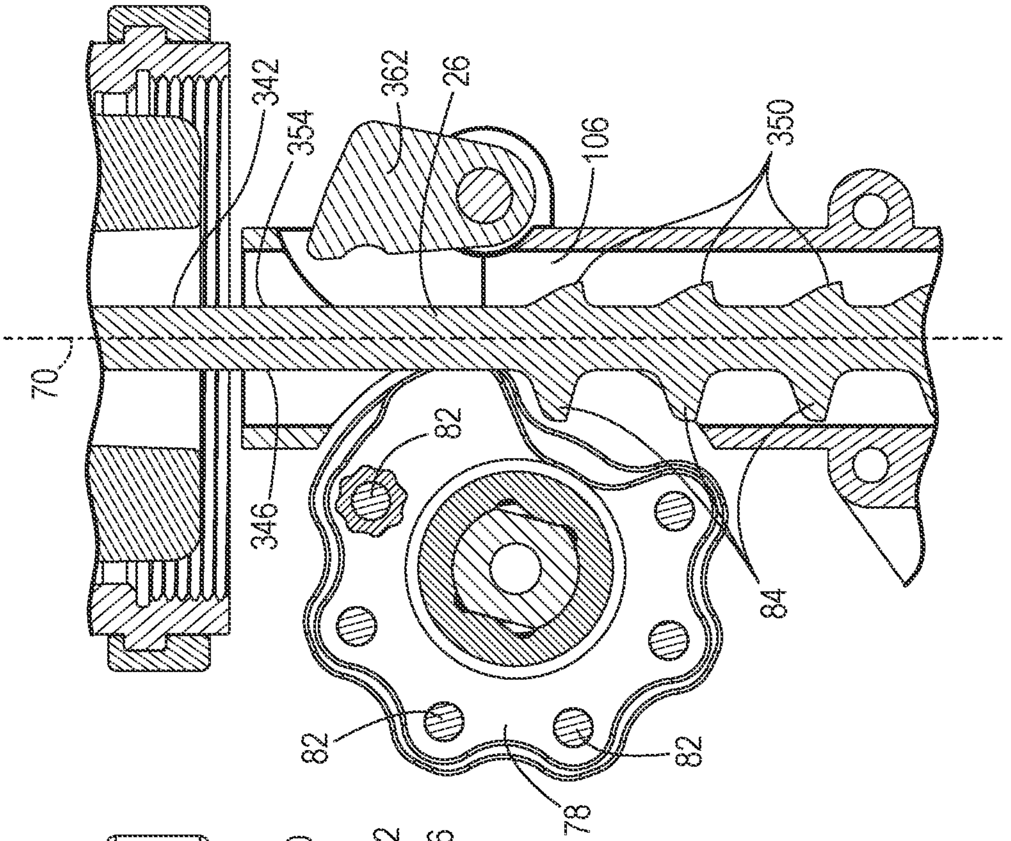
FIG. 36 is another front view of the lifting assembly of FIG. 26 and the latch of FIG. 25, illustrating the latch in the released state, and the driver blade of FIG. 25 in a position between the top-dead-center position and the bottom-dead-center position.
Figure 35:
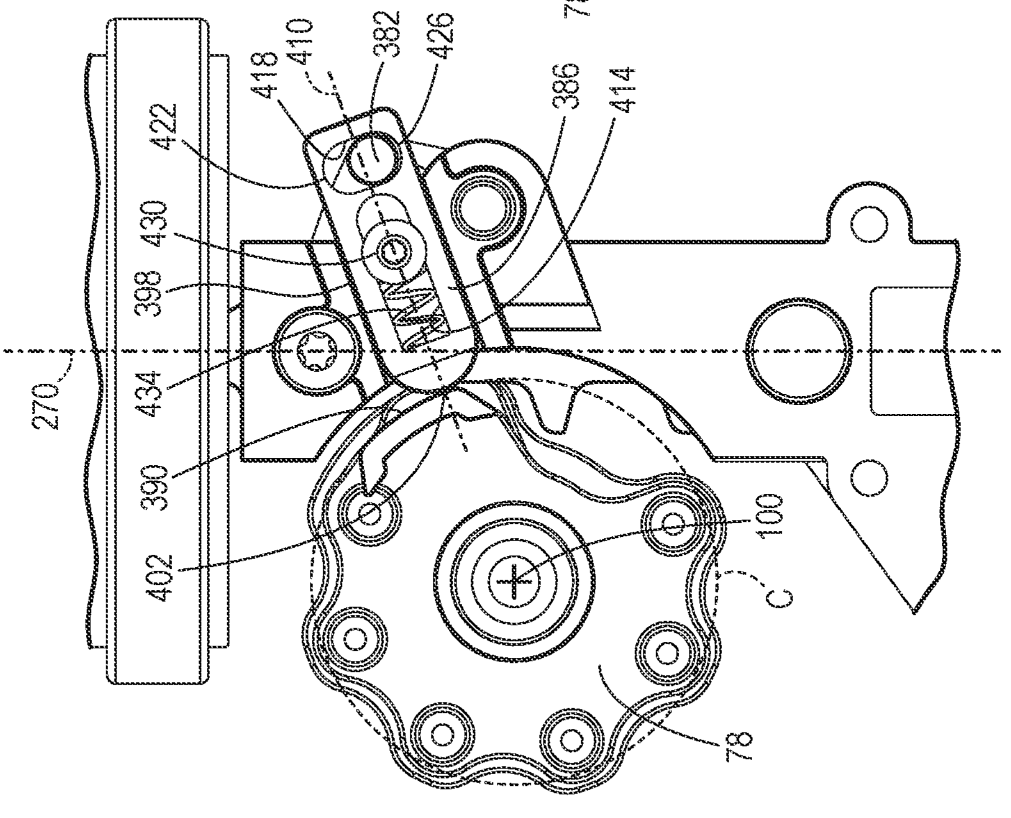
FIG. 35 is another front view of the lifting assembly and latch actuator assembly of FIG. 26, illustrating a position of the latch actuator assembly relative to the lifting assembly as the driver blade moves from the top-dead-center position toward the bottom-dead-center position.

In operation, as shown in FIG. 28, the lowermost one 84A of the teeth 84 is in engagement with one of the drive pins 82 for holding the driver blade 26 in the ready position. In addition, when the driver blade 26 is in the ready position, the latch 462 is in contact with (e.g., resting on) a lowermost one of the projections 350. As shown in FIGS. 30, 32, and 34, as the driver blade 26 moves from the ready position toward the TDC position, the latch 362 first moves toward and contacts the second side 354 of the driver blade 26 (FIG. 30) before moving away from the driver blade 26 toward the released position (FIG. 34). The latch 362 is moved completely out of the way as the driver blade 26 reaches the TDC position. With reference to FIGS. 35-36, the cam member 390 is shaped to maintain the latch 362 in the released position as the driver blade 26 moves from the TDC position to the BDC position.

Figure 12:
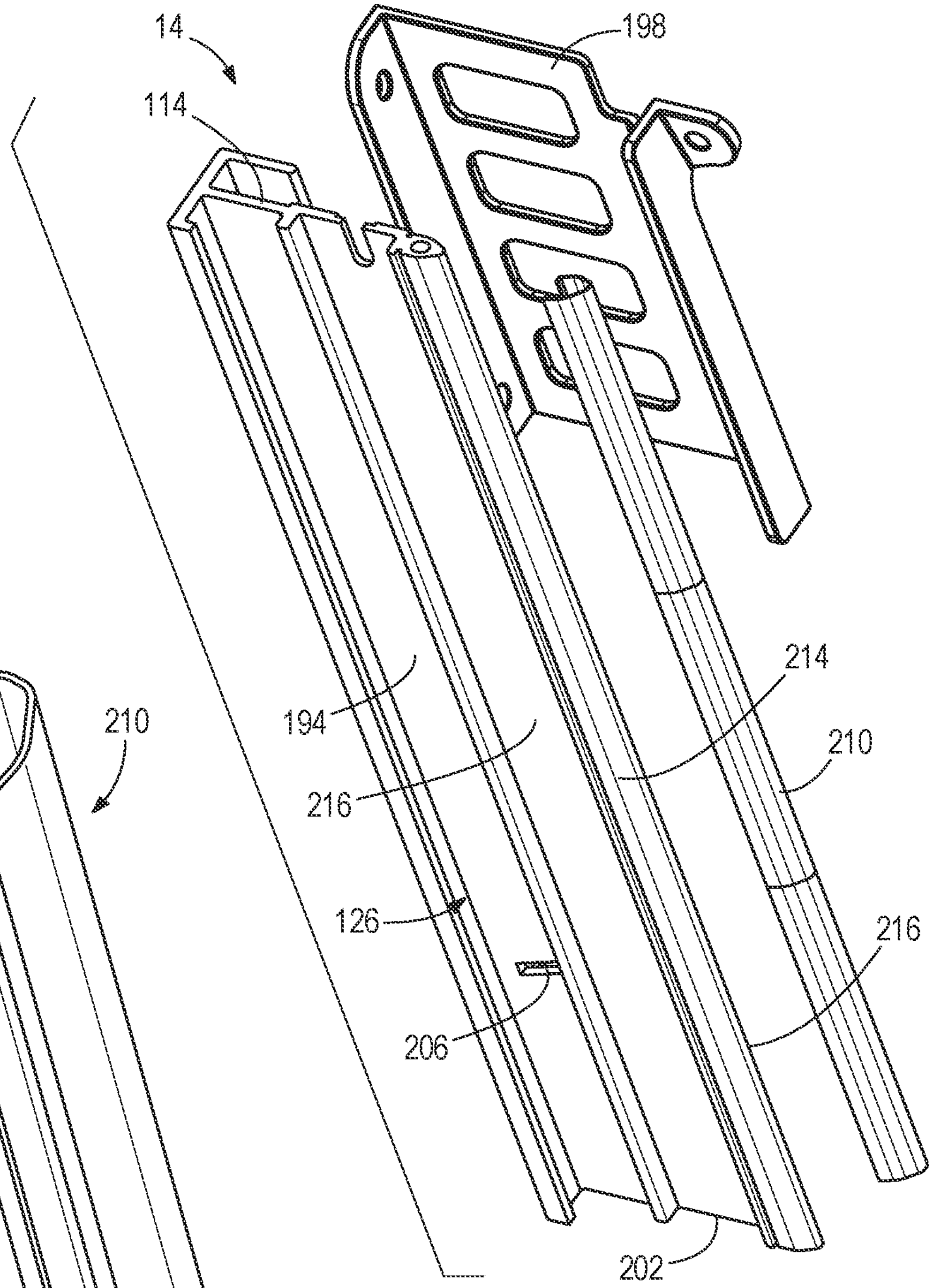
FIG. 12 is an exploded view of the magazine of FIG. 1, illustrating a plate member of the magazine of FIG. 1.
Figure 13:
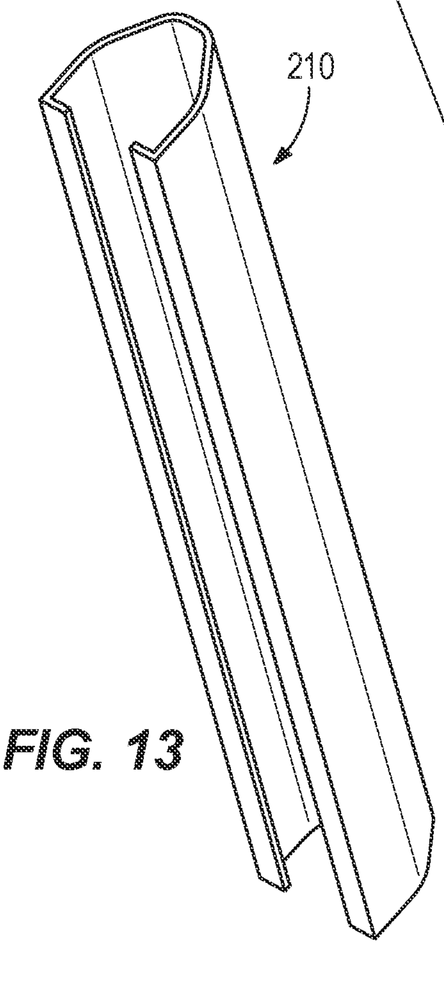
FIG. 13 is a perspective view of the plate member of FIG. 12.
Figure 43:
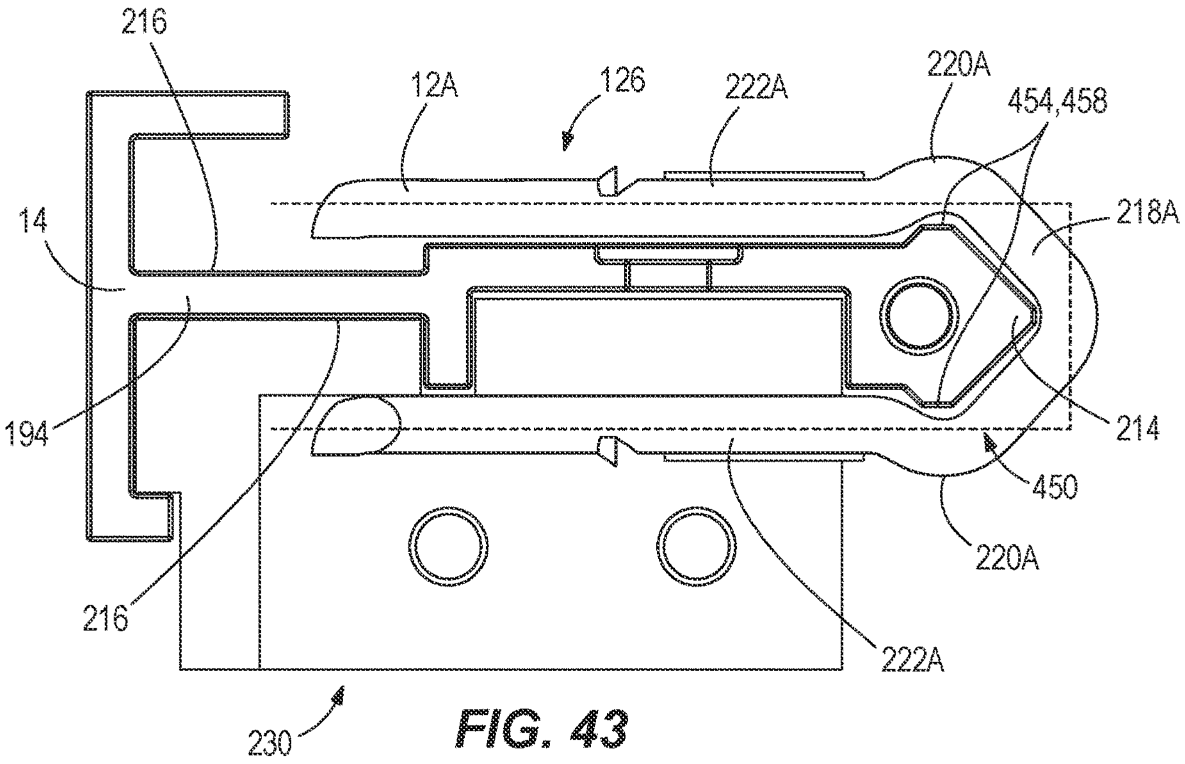
FIG. 43 is a cross-sectional view of the magazine and a portion of the pusher assembly of FIG. 16, and further including the plurality of fasteners of FIG. 14, illustrating a fastener retention portion of the magazine.
Figure 44:
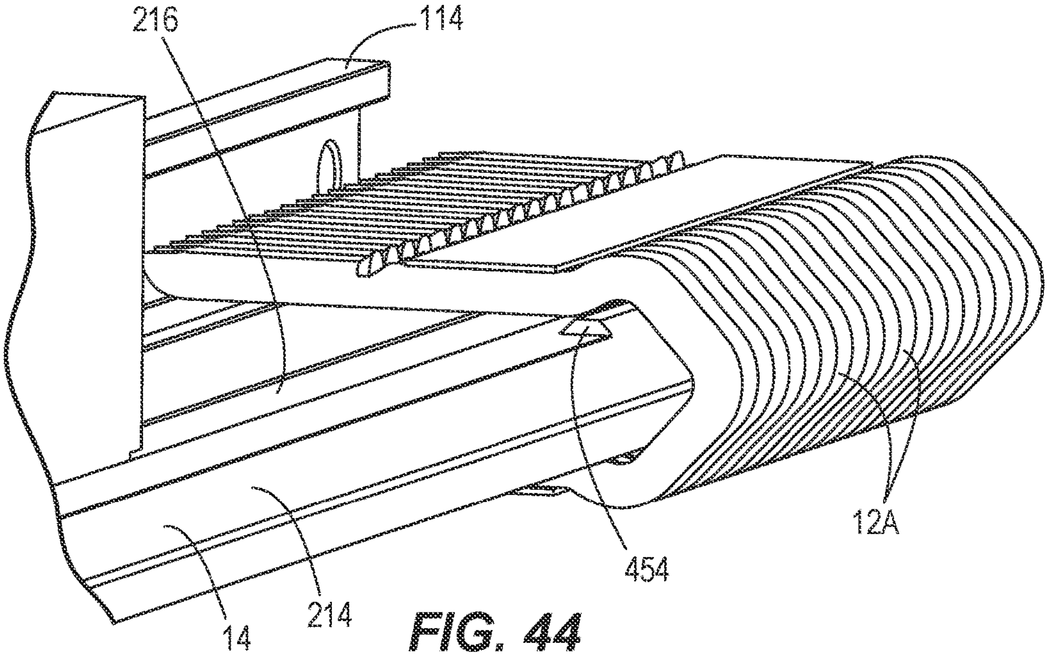
FIG. 44 is a partial cutaway of the magazine of FIG. 43 and including the plurality of fasteners positioned in a fastener channel of the magazine of FIG. 43 and engaged with the fastener retention portion of FIG. 43.

With reference to FIGS. 43 and 44, the magazine 14 includes a fastener retention portion 450 integrated with the magazine 14. The fastener retention portion 450 is positioned on the edge portion 214 of the rail 194 of the magazine 14. The fastener retention portion 450 includes a first projection 454 and a second projection 458 laterally extending away from and on opposite sides of the edge portion 214. In some embodiments, each of the first and second projections 454, 458 extends along a length of the magazine 14 from the first end 114 (proximate the nosepiece 102) toward the second end 202. Or, in some embodiments, one or both of the first and second projections 454, 458 may only partially extend along the length of the magazine 14. In the illustrated embodiment, the first projection 454 extends partially along the magazine length, and the second projection 458 extends along the entire length of the magazine 14. The fastener retention portion 450 is configured to inhibit or prevent the fasteners 12 from disengaging the edge portion 214 and falling out of the fastener channel 126. The portion of the length of the magazine 14 that does not have the one or both of the first and second projections 454, 458 may facilitate loading of the fasteners 12 into the fastener channel 126 (i.e., onto the edge portion 214) behind the fastener retention portion 450 (e.g., to the left from the frame of reference of FIG. 44). The guide 210 (not shown; FIG. 12) may be positioned on the fastener retention portion 450, in which the guide 210 is shaped to compliment the shape of the fastener retention portion 450.

The fastener retention portion 450 is shaped to complement a predetermined shape of a fastener 12A (e.g., staple). For example, in the illustrated embodiment, the fasteners 12A are staples in which each leg portion 222A is coupled to the crown portion 218A by a bend 220A (FIG. 43). The first and second projections 454, 458 of the fastener retention portion 450 are positioned to be received within the interior of the respective bends 220A of the staple 12A. As such, the first and second projections 454, 458 are configured to engage with the fasteners 12A. Accordingly, the fastener retention portion 450 is shaped to retain the fasteners 12A on the magazine 14.

Figure 48:
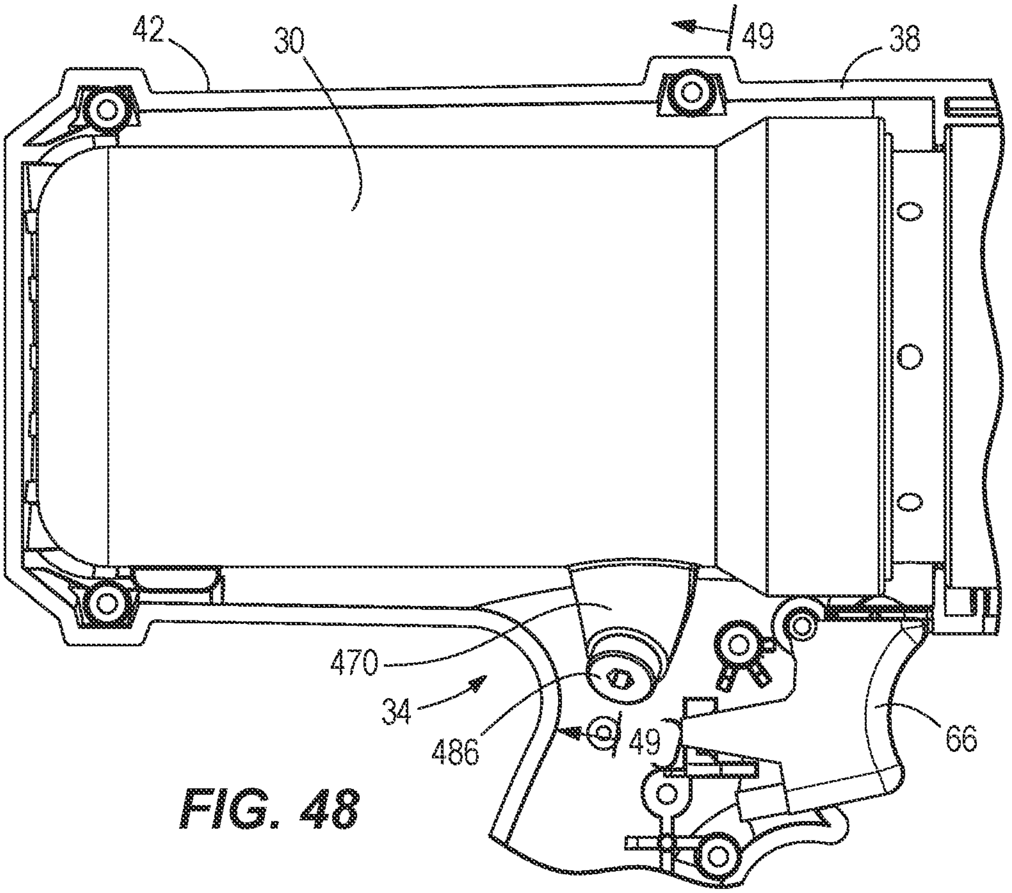
FIG. 48 is a partial side view of the powered fastener driver of FIG. 45, with portions removed for clarity and illustrating a storage chamber cylinder and a fill valve assembly of the powered fastener driver.
Figure 49:
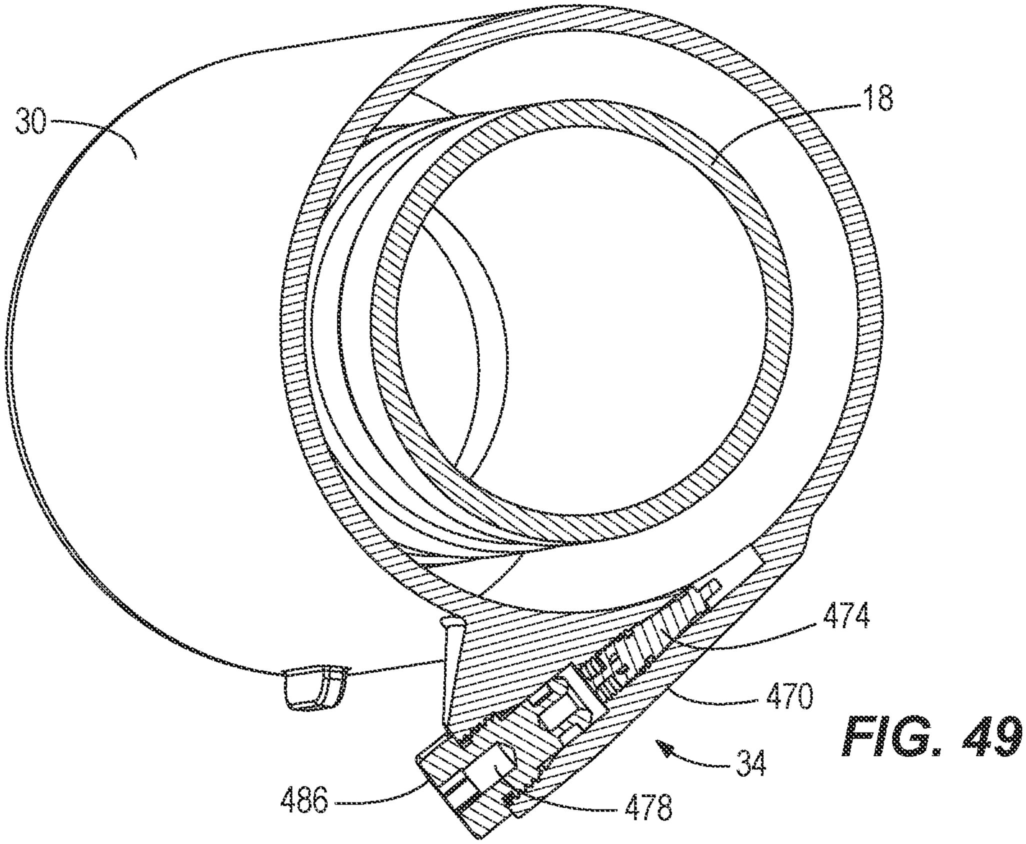
FIG. 49 is a cross-sectional view of the storage chamber cylinder of FIG. 48, illustrating a port, a fill valve, and a plug of the fill valve assembly of FIG. 48.
Figure 50:
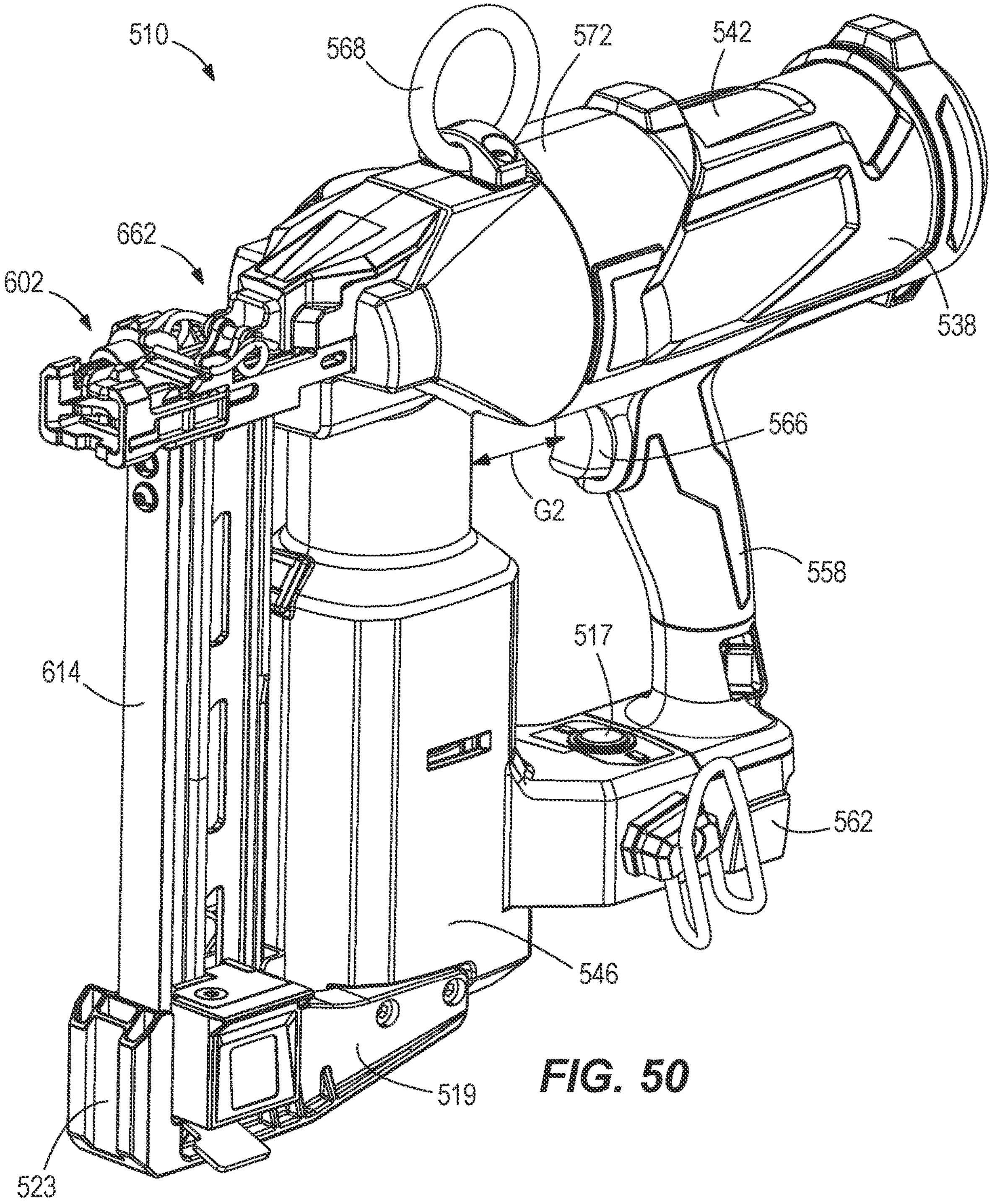
FIG. 50 is a perspective view of a powered fastener driver, according to another embodiment of the invention.

With reference to FIGS. 4, 5, 48, and 49, the fill valve assembly 34 is partially positioned within the handle portion 58 of the housing 38. The fill valve assembly 34 includes a port 470, a fill valve 474, and a plug 478 (FIG. 49). The port 470 extends from the storage chamber cylinder 30 behind the trigger 66 (FIG. 48). In the illustrated embodiment, the fill port 470 is configured as a protrusion that is integral with the storage chamber cylinder 30. The fill valve 474 is positioned within the port 470. An end of the fill valve 474 is in fluid communication with the storage chamber cylinder 30. The plug 478 is threaded to an end portion of the port 470. The plug 478 is at least partially positioned within the port 470. The plug 478 is upstream of the fill valve 474, preventing access to the fill valve 474 when threaded to the port 470.

Figure 45:
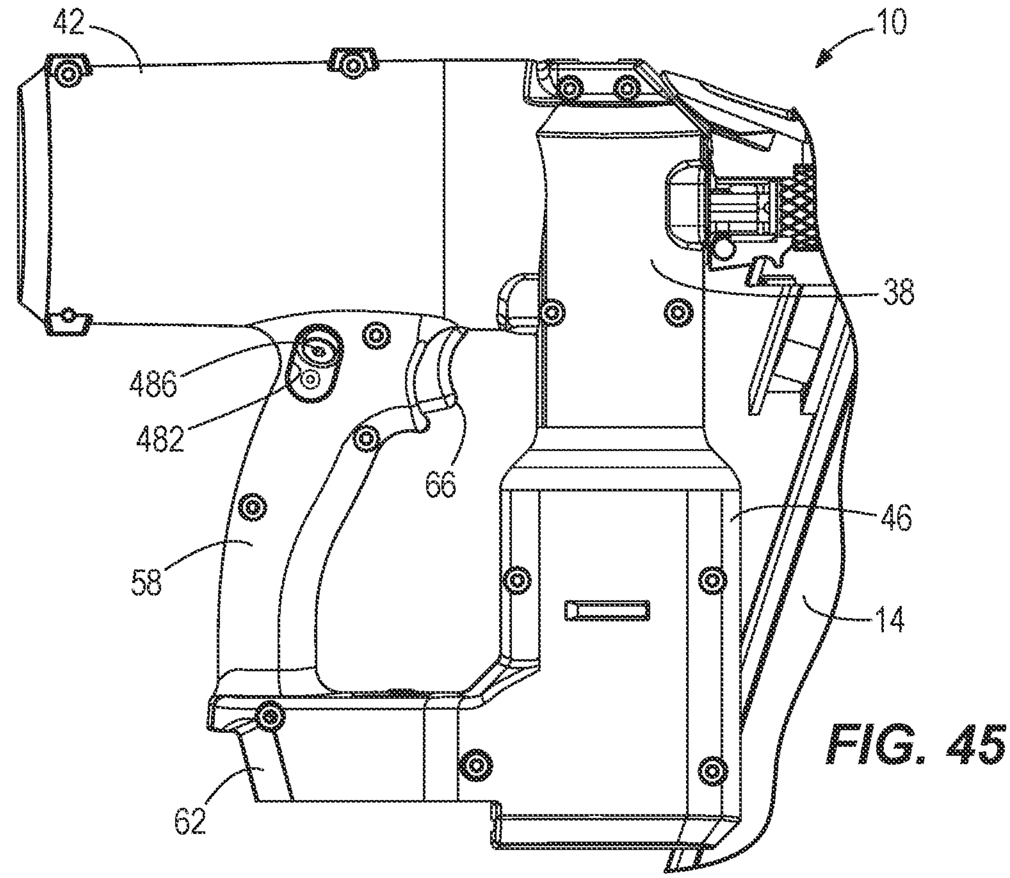
FIG. 45 is a side view of the powered fastener driver of FIG. 1, illustrating a window defined by a handle portion of the powered fastener driver of FIG. 1.
Figure 46:
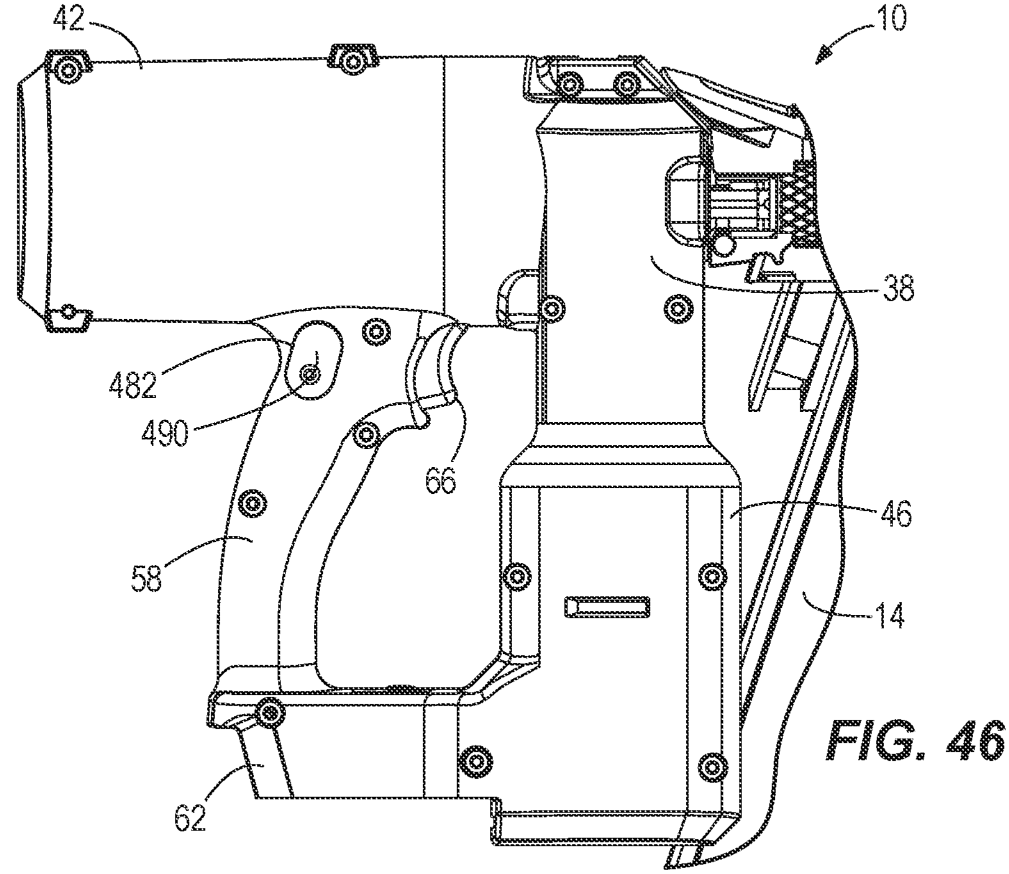
FIG. 46 is another side view of the powered fastener driver of FIG. 1, illustrating a cover member received in the window.
Figure 47:
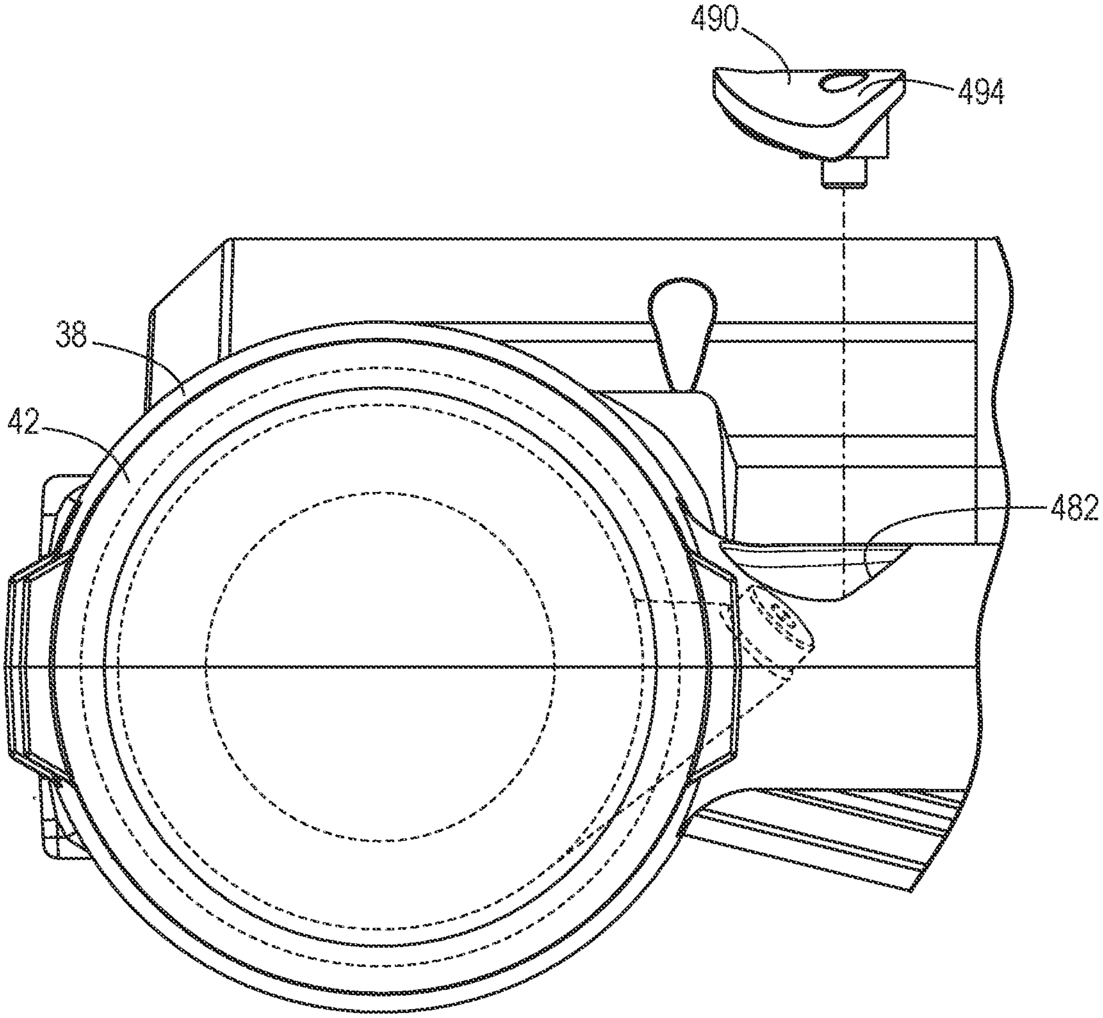
FIG. 47 is a partial top view of the powered fastener driver of FIG. 46, illustrating the cover member of FIG. 46 spaced away from the window.

With reference to FIGS. 45-47, the driver 10 includes a window 482 defined within the handle portion 58 of the housing 38. When the driver 10 is assembled, the window 482 is positioned adjacent an end 486 of the plug 478 (FIG. 45), with the port 470 and the fill valve 474 being accessible through the window 482 when the plug 478 is removed.

With continued reference to FIGS. 45-47, the driver 10 further includes a cover 490 removably received in the window 482. The cover 490 includes a body 494 shaped to compliment a shape of the window 482 (FIG. 47). As such, the cover 490 is contiguous with the handle portion 58 of the housing 38 when covering the window 482 when the fill valve assembly 34 does not need to be accessed by a user. The cover 490 is removable from the window 482 by a user for accessing the fill valve assembly 34. In some embodiments, the cover 490 is secured within the window 482 by a threaded fastener, which must be removed prior to removing the cover 490 from the window 482. In other embodiments, a nominal press-fit may be used to secure the cover 490 within the window 482, requiring a user to pull the cover 490 from the window 482 to access the fill valve assembly 34.

FIGS. 50-66 illustrate a powered fastener driver 510 according to another embodiment of the invention. The powered fastener driver 510 is similar to the powered fastener driver 10 shown in FIG. 1-49 and described above. Therefore, like features are identified with like reference numerals plus "500", and only the differences between the two will be discussed.

With reference to FIGS. 50-53, the fastener driver 510 includes a housing 538 having a cylinder housing portion 542 and a motor housing portion 546 extending therefrom. The cylinder housing portion 542 is configured to support a cylinder 530 (FIG. 52), whereas the motor housing portion 546 is configured to support a motor 550 and a transmission 554 operatively coupled to the motor 550. A handle portion 558 extends from the cylinder housing portion 542, and a battery attachment portion 562 is coupled to an opposite end of the handle portion 558. A battery pack (not shown) is electrically connectable to the motor 550 for supplying electrical power to the motor 550. The handle portion 558 supports a trigger 566, which is depressed by a user to initiate a firing cycle of the fastener driver 510.

Figure 52:
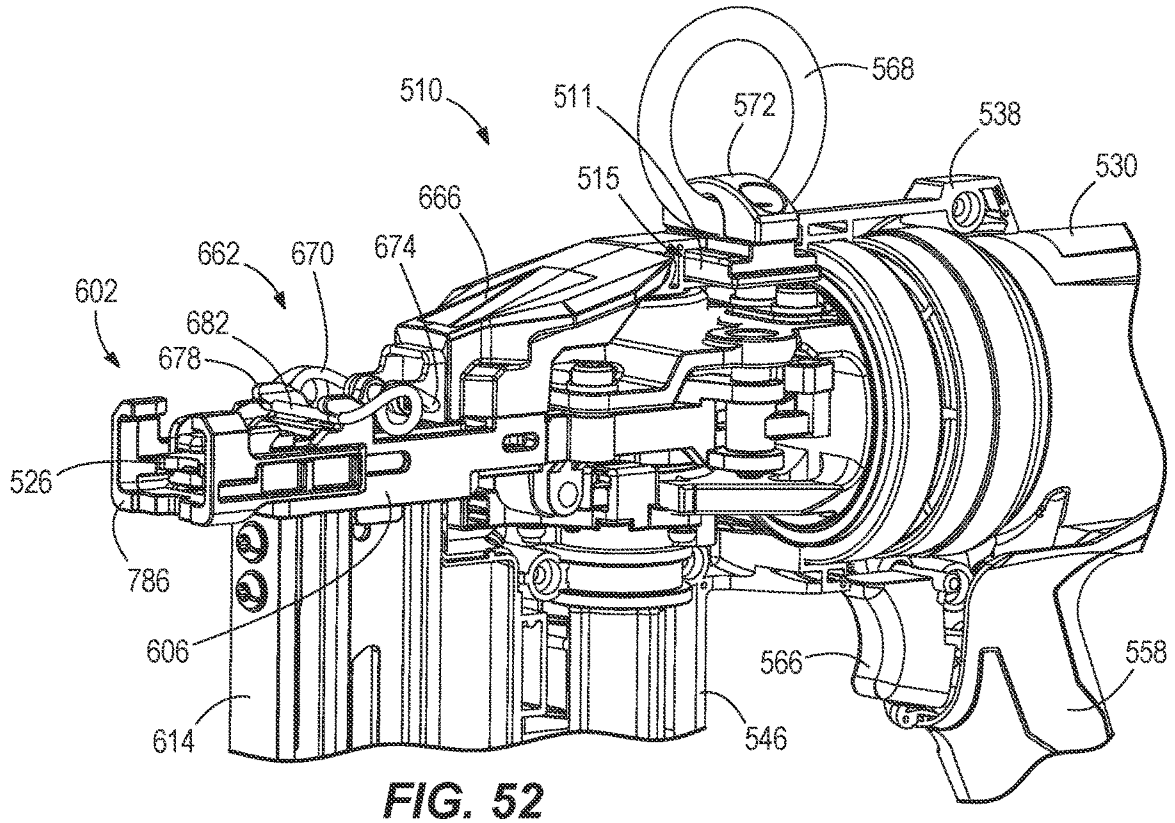
FIG. 52 is another perspective view of a portion of the powered fastener driver of FIG. 50, with portions of a housing removed for clarity and illustrating a mounting portion having an insert and a tether ring secured to the mounting portion.

A hog ring or tether 568 may be coupled to the housing 538 via a mounting structure 572. The tether 568 may be pivotably supported within the mounting structure 572. As shown in FIG. 52, the mounting structure 572 includes an insert 511 positioned within a recess 515 formed within the housing 538. The insert 511 further includes an attachment portion that receives a fastener to secure the mounting structure 572, and therefore the tether 568, to the housing 538. A lanyard or other device may be coupled to the tether 568 (e.g., via a carabiner) so that the driver fastener 510 may be more easily held and supported by the user. In the illustrated embodiment, the housing 538 is a clam-shell housing having a first portion and a second portion removably coupled to the first portion. The recess 515 is formed in each of the first and second portions of the housing 538 in a direction perpendicular to a driving axis 570 extending centrally through a driver blade 526. Further, the mounting structure 572 is positioned between the cylinder 530 and a nosepiece 602.

Figure 53:
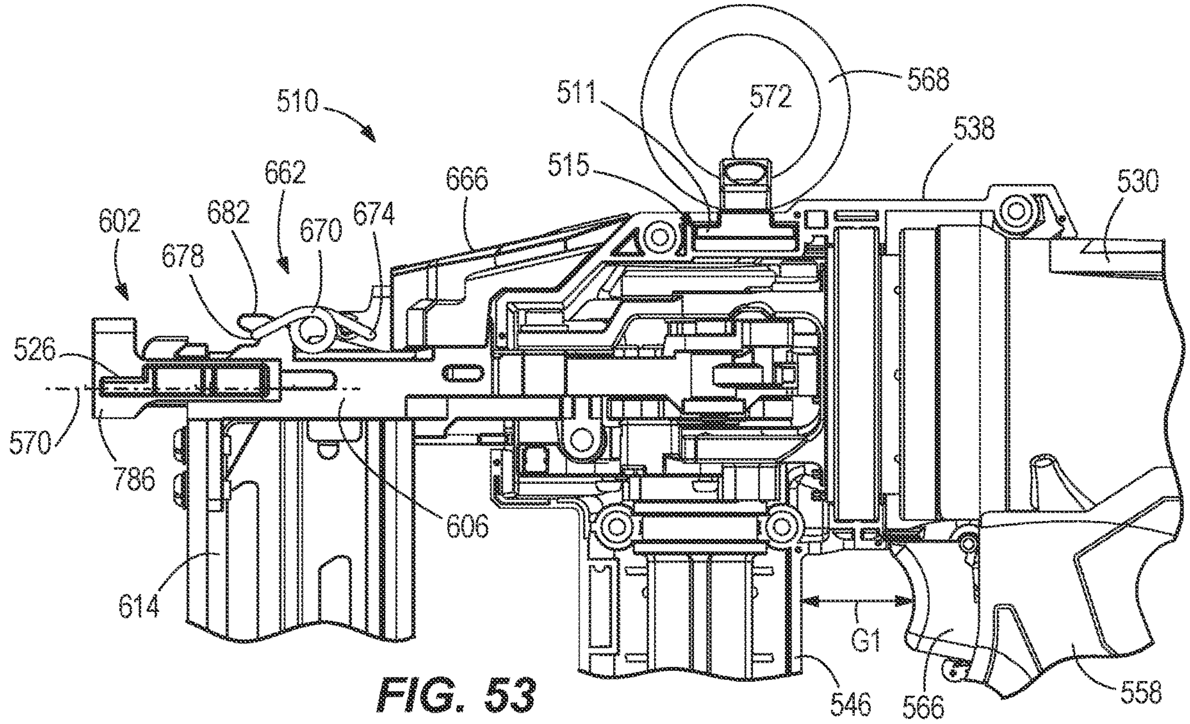
FIG. 53 is a side view of a portion of the powered fastener driver of FIG. 50, with portions of the housing removed for clarity and illustrating the mounting portion having the insert and the tether ring secured to the mounting portion.
Figure 54:
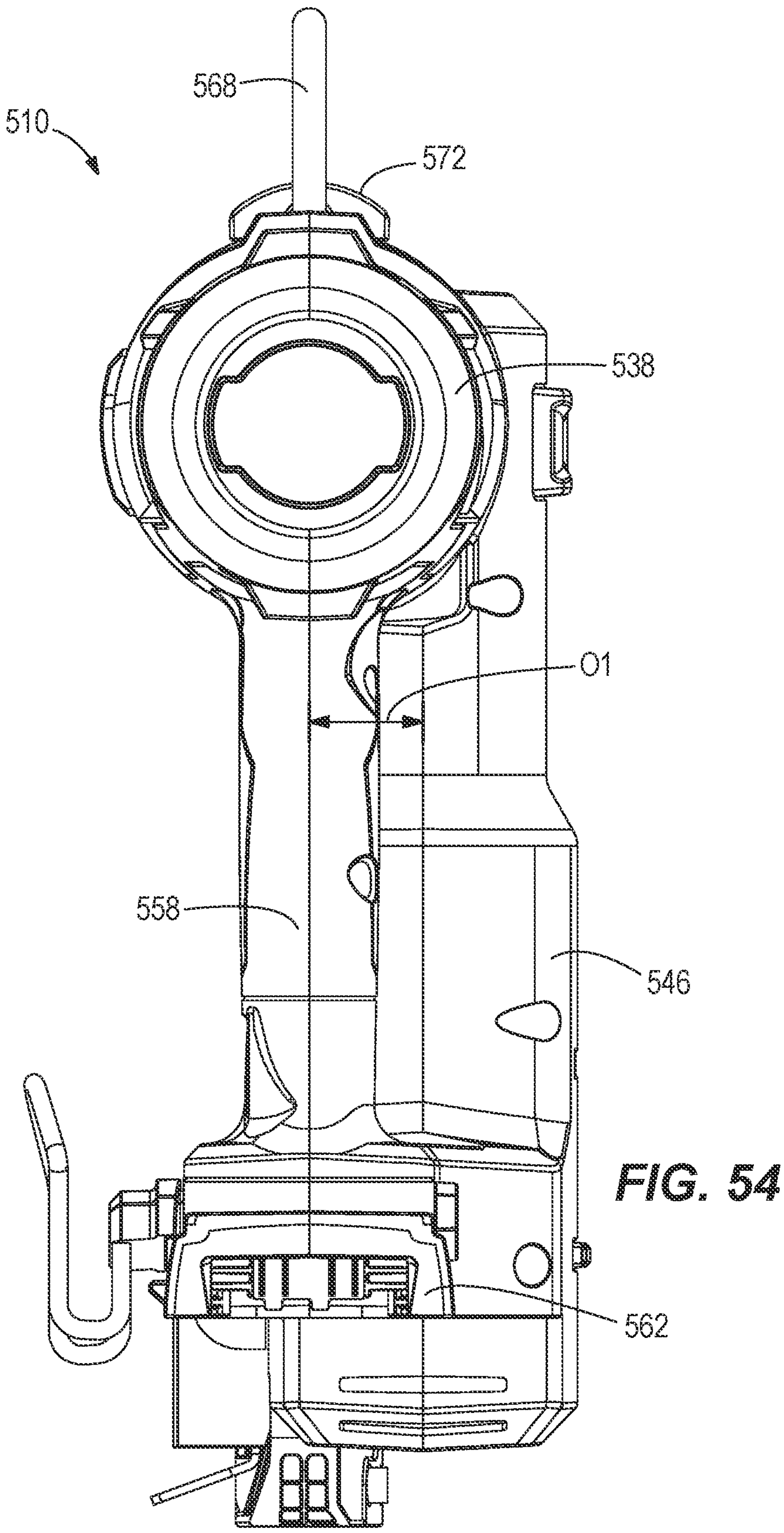
FIG. 54 is a rear view of the powered fastener driver of FIG. 50, illustrating an offset between a handle portion and a motor housing portion of the driver.

During operation of the fastener driver 10, the user may wear utility gloves, which increases the functional size of the user's hand. As shown in FIG. 53, a gap G1 is defined between the trigger 566 and the motor housing portion 546. In the illustrated embodiment, the gap G1 is measured between a central portion of the trigger 566 and a peripheral surface of the motor housing 546 opposite the trigger 566, when viewed from the side (FIG. 53). The gap G1 may be greater than or equal to 30 millimeters to accommodate the user's hand with a utility glove. As shown in FIG. 54, the central portion of the handle portion 558 and the trigger 566 are offset by a distance O1 from the central portion of the motor housing portion 546. In the illustrated embodiment, the offset distance O1 is 25 millimeters. In other embodiments, the offset may be greater than 25 millimeters.

Due to the cylindrical construction of the motor housing portion 546 and the offset distance O1 of the handle portion 558, a distance G2 (FIG. 50) defined between the trigger 566 and the motor housing portion 546 positioned directly in front of the trigger 566 is larger than the gap G1. In other words, since a parting line (e.g., a closest portion of the motor housing portion 546 relative to the trigger 566) is offset from the trigger 566, the trigger 566 is not directly in front of a smallest opening (i.e., the gap G1) when viewed in a side view. The distance G2 may be equal to or greater than 35 millimeters. The second distance G2 provides additional clearance for the user's fingers during actuation of the trigger 566 with utility gloves.

Figure 51:
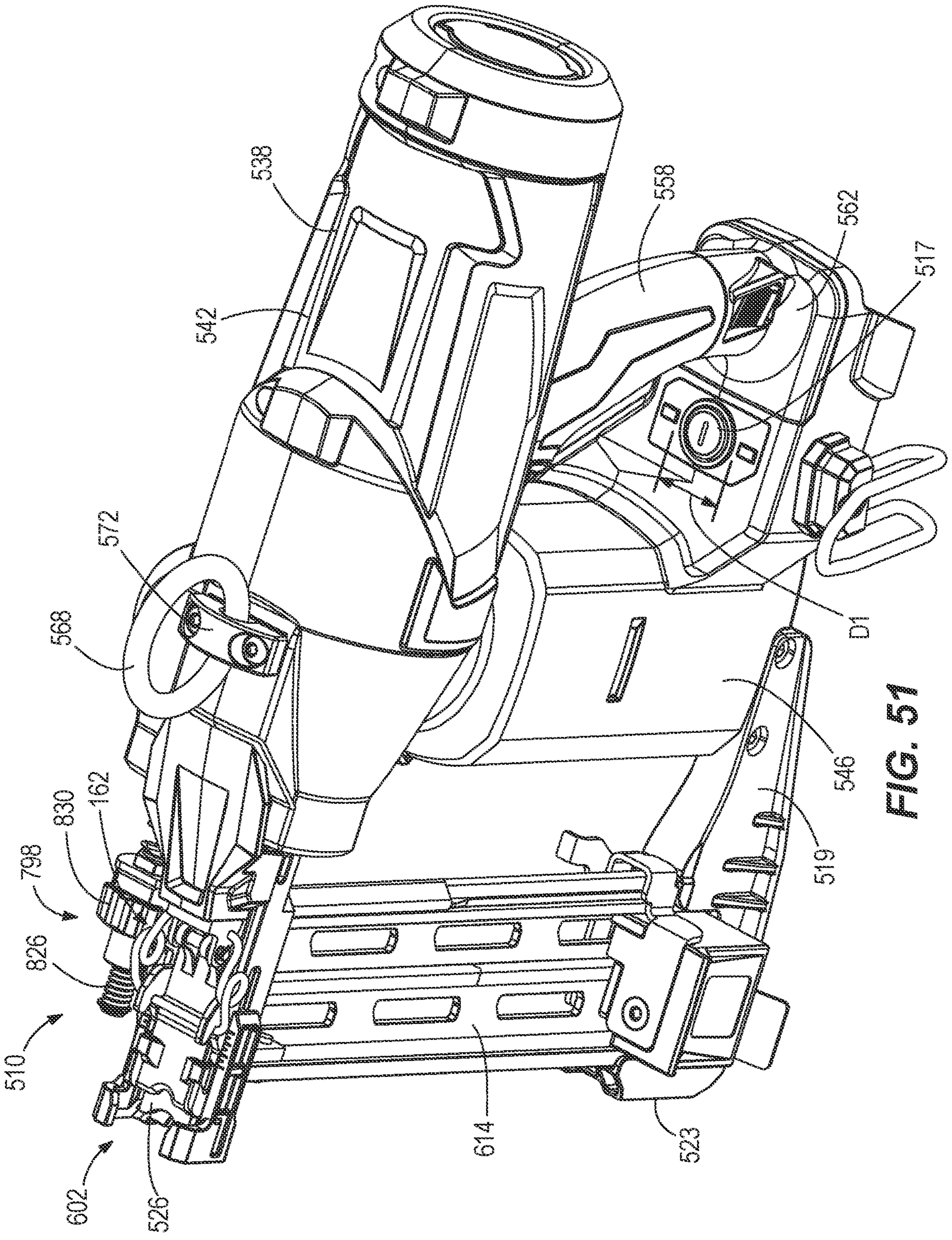
FIG. 51 is a top perspective view of the powered fastener driver of FIG. 50.

With reference to FIG. 51, the fastener driver 510 includes a power button 517 coupled to the battery attachment portion 562 and positioned between the handle portion 558 and the motor housing portion 546. The power button 517 includes an outer diameter D1, which is greater than 17 millimeters. In the illustrated embodiment, the power button 517 the outer diameter D1 is 21 millimeters. The outer diameter D1 of the power button 517 allows the user to easily actuate the power button 517 while wearing utility gloves.

Figure 55:
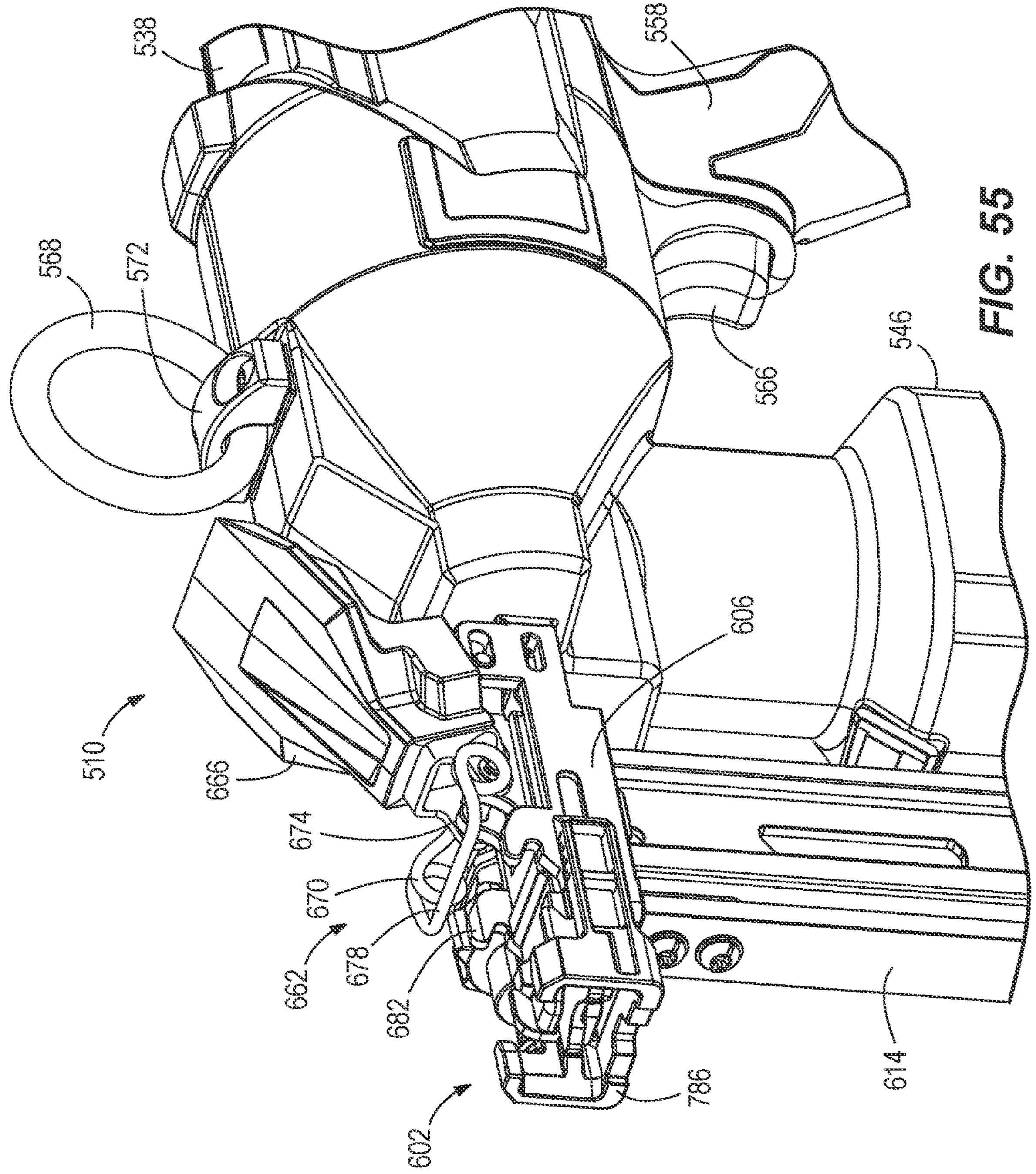
FIG. 55 is a perspective view of a portion of the powered fastener driver of FIG. 50, illustrating a latch of the nosepiece in an open position.

As shown in FIG. 55, the driver 510 further includes the nosepiece 602 that has a nosepiece base 606 and a nosepiece cover 610 movably coupled to the nosepiece base 606. The nosepiece cover 610 is releasably coupled to the nosepiece base 606 by a latch 662. If a fastener becomes jammed within a firing channel, the nosepiece cover 610 can be pivoted to an open position to clear the jam. The nosepiece cover 610 is secured in a closed position by the latch 662. The latch 662 includes a lever 666 that is pivotable about the nosepiece cover 610 and has a top surface defining a surface area that is configured to be grasped by the user. The surface area of the lever 666 may be greater than 500 square millimeters. In the illustrated embodiment, the surface area of the lever 666 is approximately 2600 square millimeters. The latch 662 further includes a spring 670 that has a first end 674 connected to the lever 666, and a second end 678 opposite the first end 674. The second end 678 of the spring 670 is received within hooks 682 formed on the nosepiece base 606 for securing the nosepiece cover 610 to the nosepiece base 606, thereby positioning the latch 662 in a latched state (FIGS. 50-53). The latch 662 is adjustable from the latched state to a released state (FIG. 55).

Figure 56:
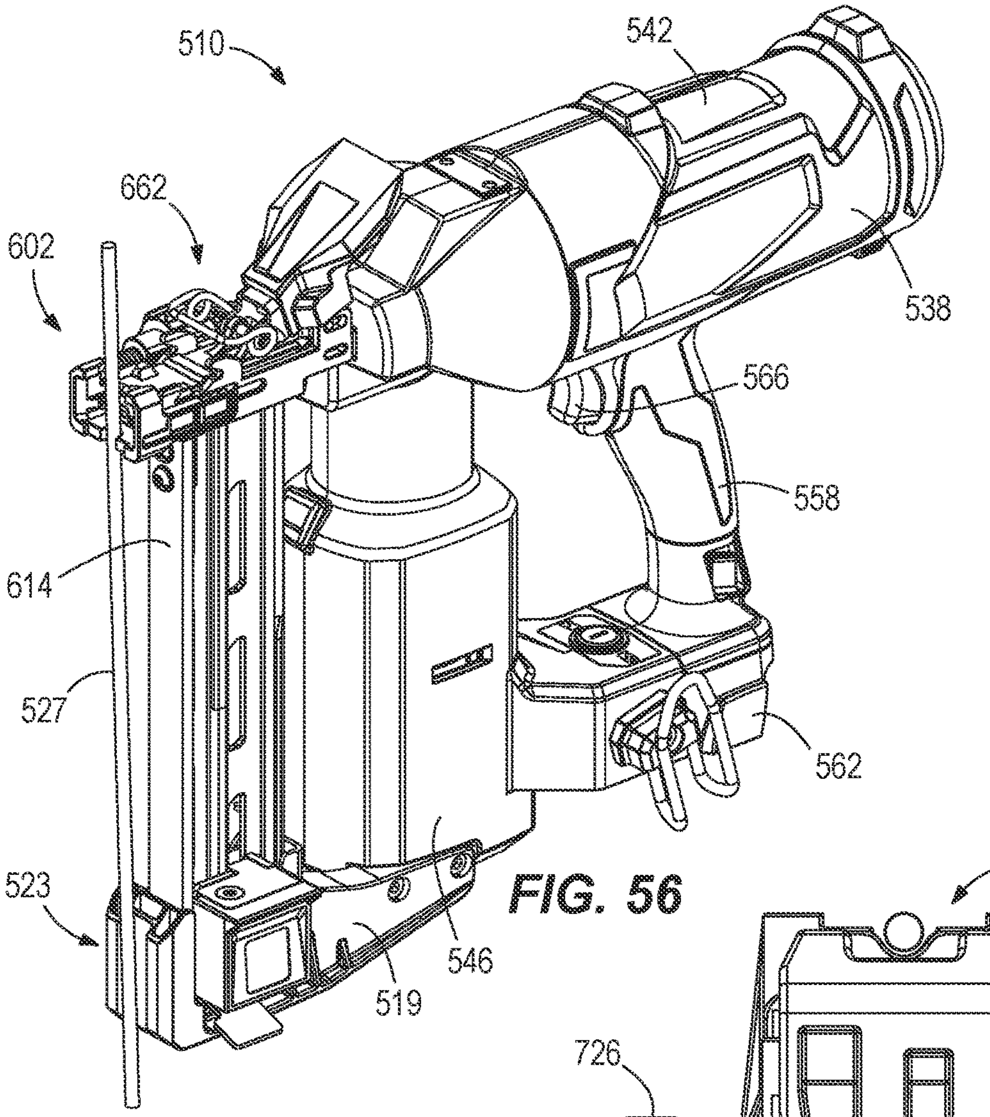
FIG. 56 is another perspective view of the powered fastener driver of FIG. 50, illustrating a wire guiding structure engaging a cable.
Figure 57:
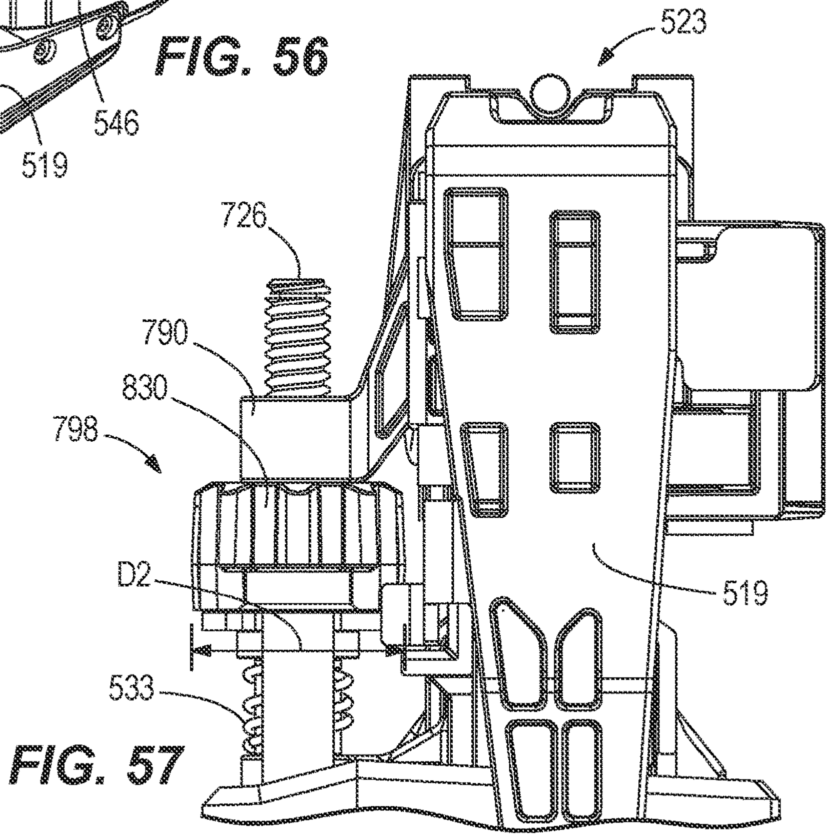
FIG. 57 is a bottom view of the powered fastener driver of FIG. 50, illustrating the wire guiding structure engaging the cable.

As shown in FIGS. 56 and 57, the fastener driver 510 includes a magazine support 519 extending between the motor housing portion 546 and the magazine 514. The magazine support 519 has a wire guiding structure 523 that is spaced from the nosepiece 602. In the illustrated embodiment, the wire guiding structure 523 is formed as a recess in a front portion of the magazine support 519. In other embodiments, the wire guiding structure 523 may be formed directly on the magazine 614.

During operation, the fastener driver 510 may be used to secure a cable 527 to a workpiece. The wire guiding structure 523 may be engageable with the cable 527 during a fastener driving operation, which allows the user to orientate the nosepiece 602 in a desired positioned relative to the cable 527. For example, the wire guiding structure 523 engages the cable 527 to ensure that the fastener (e.g., a staple) exiting the nosepiece 602 does not damage the cable 527 (e.g., the legs of the staple engage the workpiece on opposing sides of the cable 527). Additionally, the wire guiding structure 523 may allow the user to adjust the position of the nosepiece 602 relative to the cable 527 and secure the fasteners to the workpiece at various positions along the cable 527.

As shown in FIGS. 57-61, the fastener driver 510 further includes a workpiece contact element 786 supported by the nosepiece 602 (e.g., the nosepiece base 606). In the illustrated embodiment, a recess 788 is defined in the workpiece contact element 786. The wire guiding structure aligns with the cable 527 with the recess 788 formed in the workpiece contact element 786. The illustrated workpiece contact element 786 includes generally two portions 790, 794. The first and second portions 790, 794 are movably coupled together by a depth of drive adjustment mechanism 798, which adjusts the effective length of the workpiece contact element 786. The first portion 790 is slidably guided along an outer surface 802 of the nosepiece base 606. In addition, the first portion 790 includes a support member 806 having internal threads.

Figure 59A:
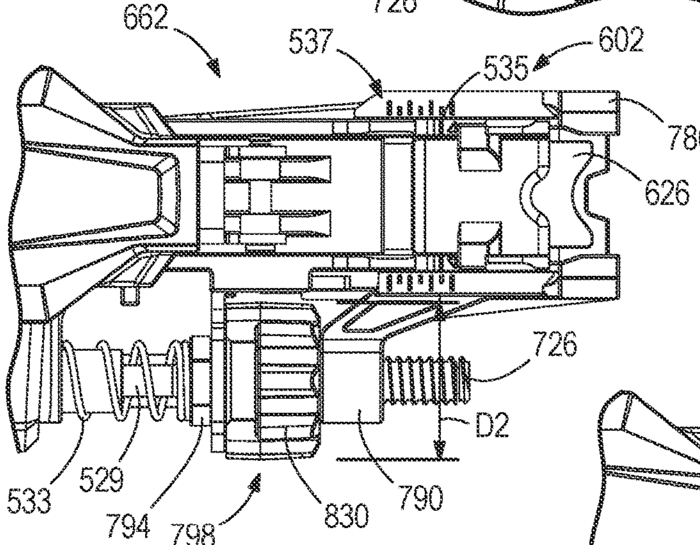
FIG. 59A is a top view of a portion of the powered fastener driver of FIG. 50, illustrating the depth of drive adjustment mechanism in a first position.

The depth of drive adjustment assembly 798 is coupled to the nosepiece 602 and includes a screw portion 826, an adjustment knob 830, a linear guide bolt 529 (FIGS. 60 and 61), and a bias member 533 positioned between the second portion 790 and the nosepiece 602. The screw portion 826 extends between the first portion 790 and the second portion 794. A support member 806 of the first portion 790 of the workpiece contact element 786 is threadably coupled to the screw portion 726. The adjustment knob 830 is coupled for co-rotation with the screw portion 826. As shown in FIG. 59A, the adjustment knob 330 may have a diameter D2 greater than or equal to 24 millimeters. In the illustrated embodiment, the diameter D2 is 30 millimeters.

Figure 59B:
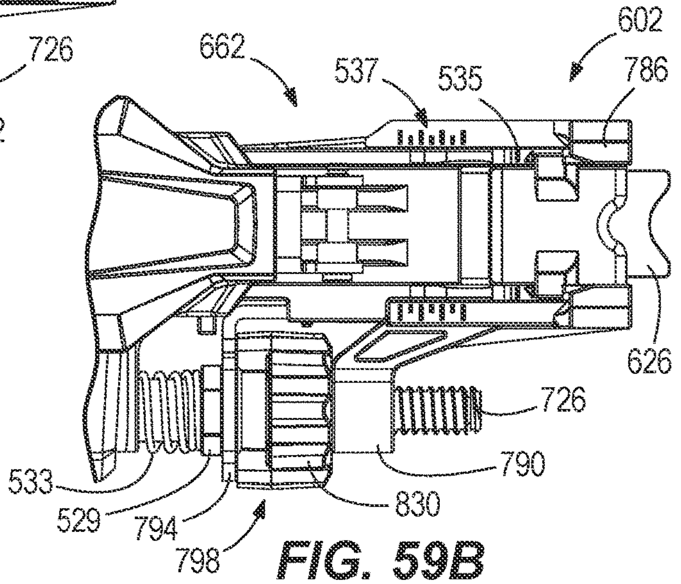
FIG. 59B is a top view of a portion of the powered fastener driver of FIG. 50, illustrating movement of a driver blade with the depth of drive adjustment mechanism in the first position.
Figure 59C:
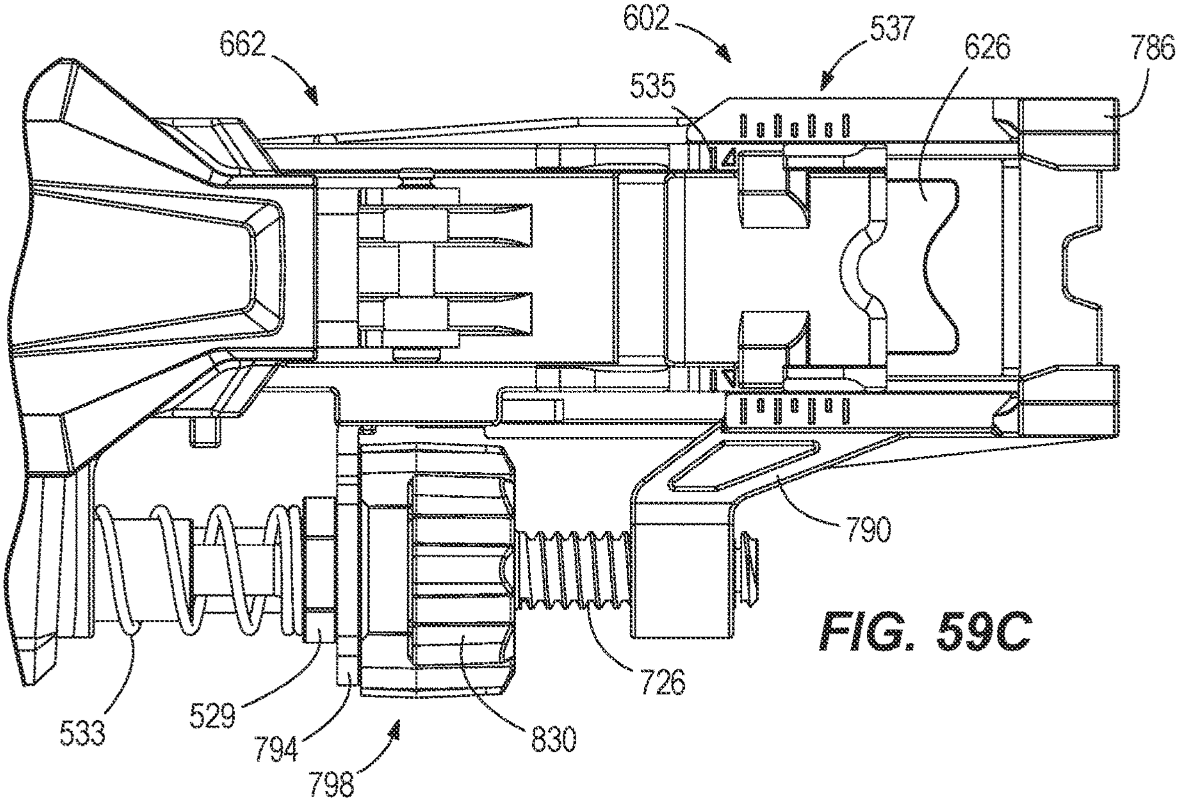
FIG. 59C is a top view of a portion of the powered fastener driver of FIG. 50, illustrating the depth of drive adjustment mechanism in a second position.
Figure 59D:
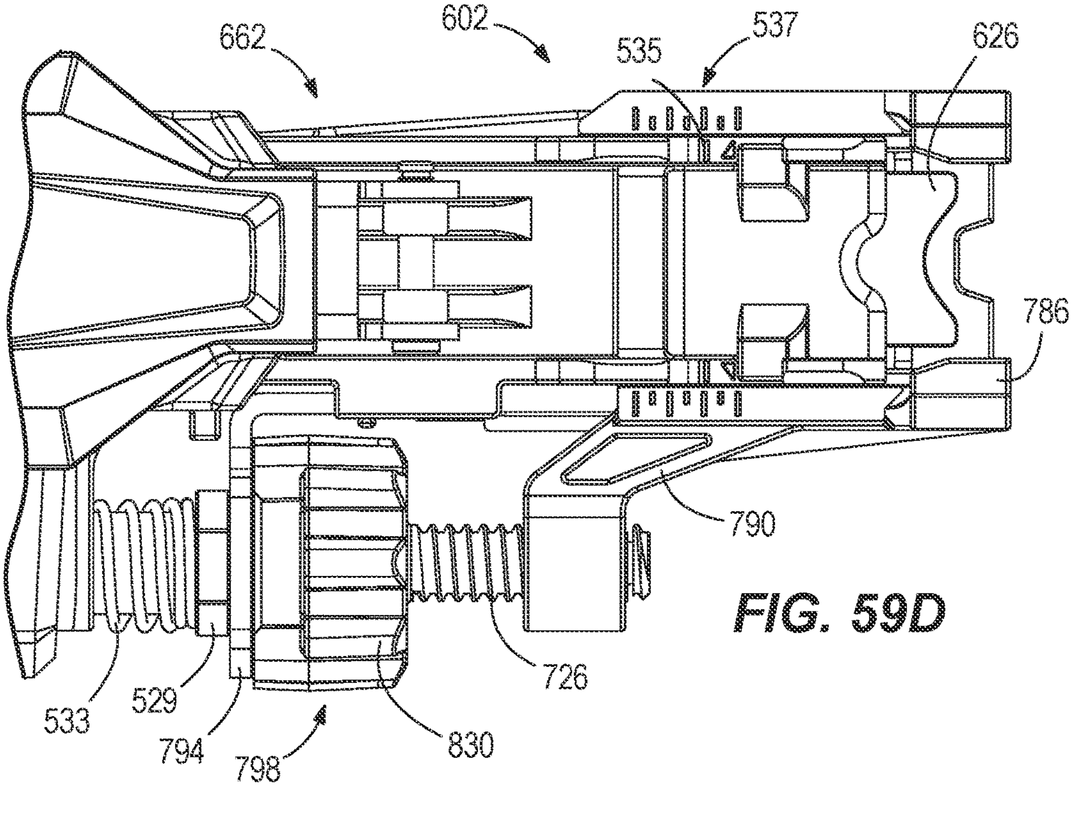
FIG. 59D is a top view of a portion of the powered fastener driver of FIG. 50, illustrating movement of a driver blade with the depth of drive adjustment mechanism in the first position.
Figure 60:
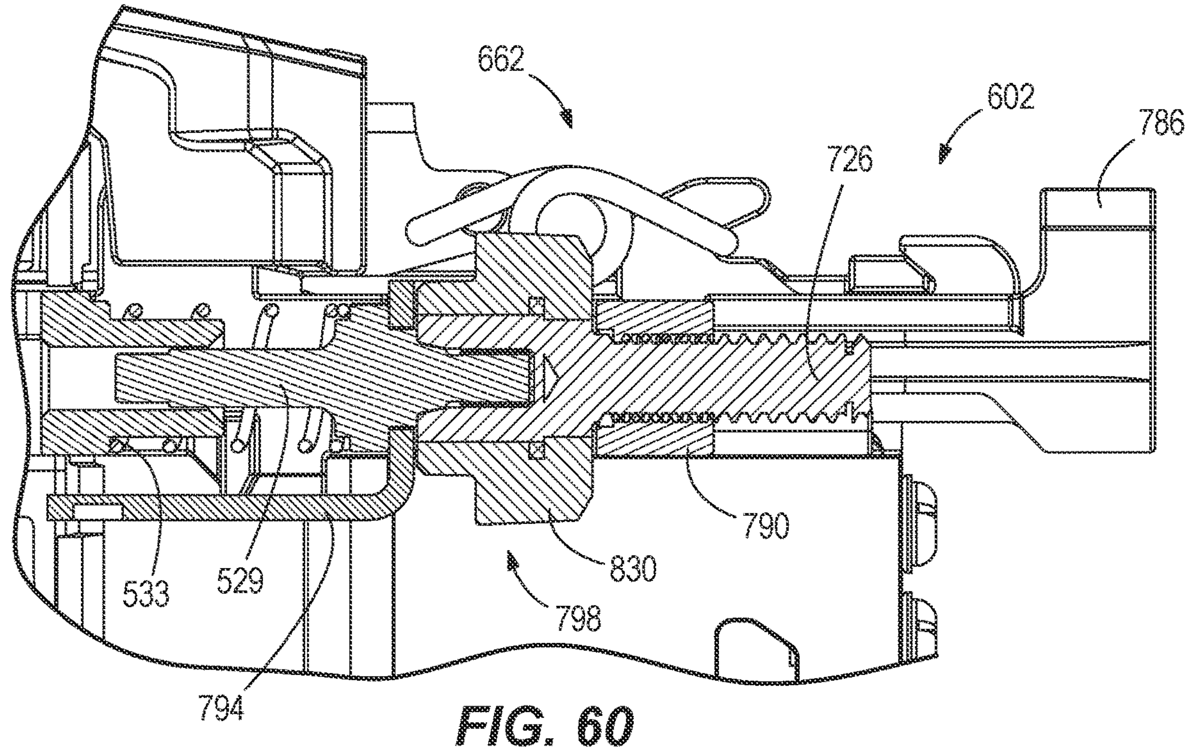
FIG. 60 is a cross-sectional view of a portion of the powered fastener driver of FIG. 50, illustrating a linear guide bolt of the depth of drive adjustment mechanism in a first position.
Figure 61:
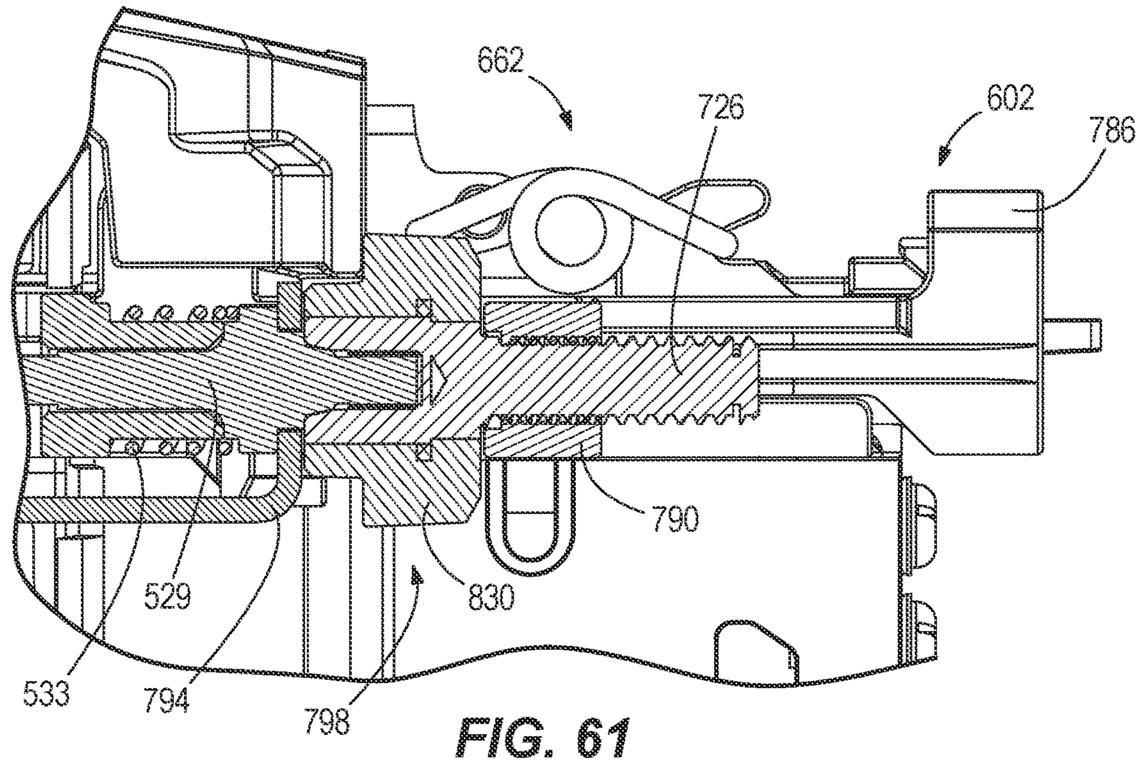
FIG. 61 is a cross-sectional view of a portion of the powered fastener driver of FIG. 50, illustrating the linear guide bolt of the depth of drive adjustment mechanism in a second position.

As shown in FIGS. 59A-59D, rotation of the adjustment knob 830 axially threads the first portion 890 along the screw portion 826 for adjusting a protruding length of the workpiece contact element 786 relative to a distal end 834 of the nosepiece 602. The linear guide bolt 529 guides the depth adjustment knob 830 and the workpiece contact element 786 together in response to rotation of the adjustment knob 830 (FIGS. 60 and 61). More specifically, the first portion 790 is moved relative to the second portion 794 to adjust an effective length of the workpiece contact element 786. For example, rotation of the adjustment knob 830 may adjust the position of the workpiece contact element 786 between a plurality of positions or effective lengths. For example, FIGS. 59A and 59B illustrate the workpiece contact element 786 in a first position and FIGS. 59B and 59D illustrate the workpiece contact element 786 in a second position.

Figure 58:
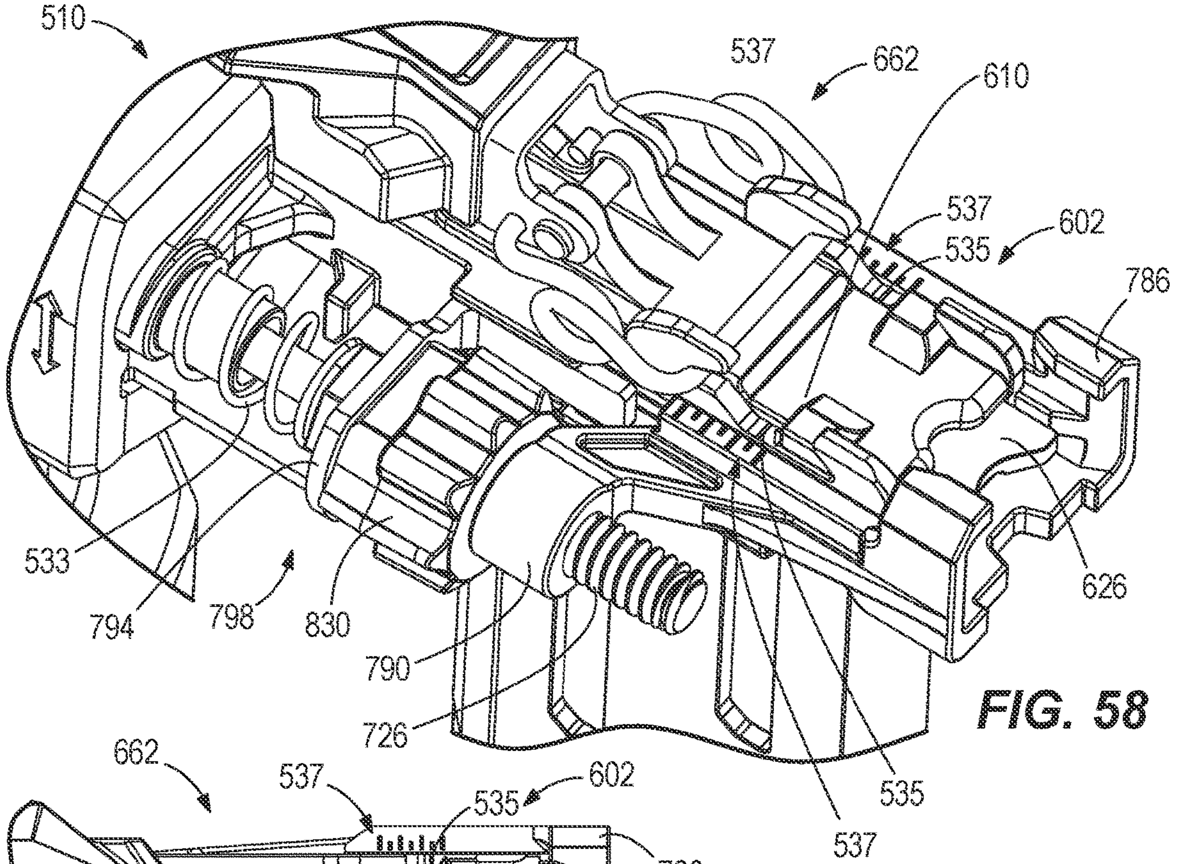
FIG. 58 is a perspective view of a portion of the powered fastener driver of FIG. 50, illustrating a depth of drive adjustment mechanism that adjusts a position of a workpiece contact element.

The nosepiece 602 further includes reference markings 535 and the workpiece contact element 786 includes depth adjustment markings 537 (FIGS. 58-59D). The alignment between the depth adjustment markings 537 and the reference markings 535 correlates to the position of the workpiece contact element 786 and the depth to which a fastener is driven into the workpiece. In particular, the reference markings 535 are molded into the nosepiece 602 (e.g., the nosepiece cover 610) and the depth adjustment markings 537 are molded into the workpiece contact element 786 as a series of lines. The depth adjustment markings 537 and the reference markings 535 may have a different color (e.g., using ink) than the nosepiece 602 or the workpiece contact element 786 to stand out relative to the nosepiece 602 or the workpiece contact element 786. In the illustrated embodiment, the reference markings 535 are positioned on a top portion of the nosepiece 602 and the depth adjustment markings 537 are positioned on a top portion of the workpiece contact element 786. In other embodiments, the depth adjustment markings 537 may be positioned on a side portion of the workpiece contact element 786. The depth of drive adjustment assembly 798 adjusts how far the workpiece contact element 786 extends past the nosepiece 602 for abutting with a workpiece. For example, the larger the gap between the distal end 834 of the nosepiece 602 and the workpiece, the shallower the depth a fastener will be driven into the workpiece. The smaller the gap between the distal end 834 and the workpiece, the deeper the depth a fastener will be driven into the workpiece. As such, the position of the workpiece contact element 786 with respect to the nosepiece 602 is adjustable to adjust the depth to which a fastener is driven.

Figure 62:
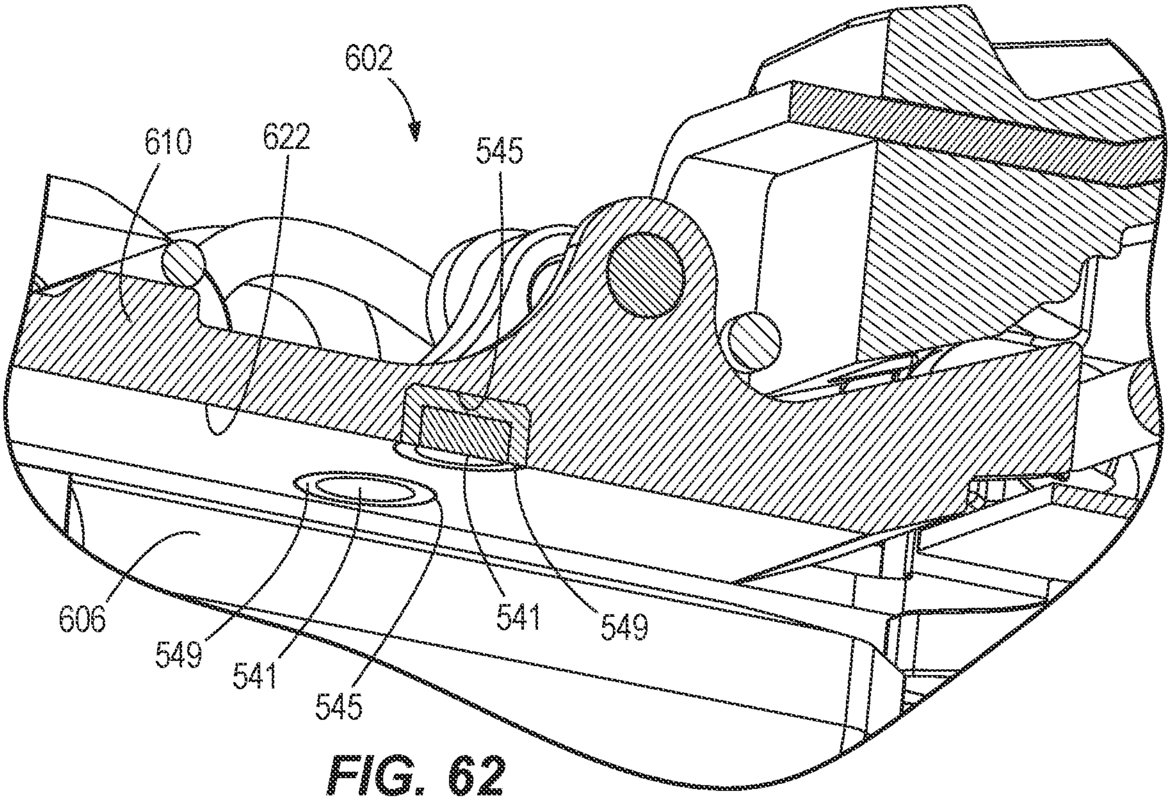
FIG. 62 is a cross-sectional perspective view of a portion of the powered fastener driver of FIG. 50, illustrating a magnet positioned within a nosepiece cover to retain the forward-most staple in the collated strip within the firing channel.

As shown in FIG. 62, the nosepiece 602 includes a magnet 541, and in the illustrated embodiment, two magnets 541, to retain the forward-most staple in the collated strip within the firing channel 622 of the nosepiece 602 prior to a firing operation. The illustrated magnets 541 may be received in first and second holes 545, respectively. The first and second holes may be formed on the nosepiece base 606 (FIG. 55) or on the nosepiece cover 610. As shown in FIG. 62, the nosepiece cover 610 includes the first and second holes 545. In other embodiments, the magnets 541 may be received in holes 545 formed in both the nosepiece base 606 and the nosepiece cover 610.

With reference to FIG. 62, the nosepiece cover 610 may also include first and second bushings 549 that receive the first and second magnets 541, respectively. The first and second bushings 549 are positioned in the first and second holes 545, and the magnets 541 are pressed into the respective bushings 549. The bushings 549, with the magnets 541, are pressed into the holes 545 of the nosepiece cover 610. The first and second magnets 541 are positioned based on a position of first and second legs of the staple 12 when the staple 12 is loaded into the firing channel 622. In other embodiments, the nosepiece cover 610 includes one magnet 541.

Figure 63:
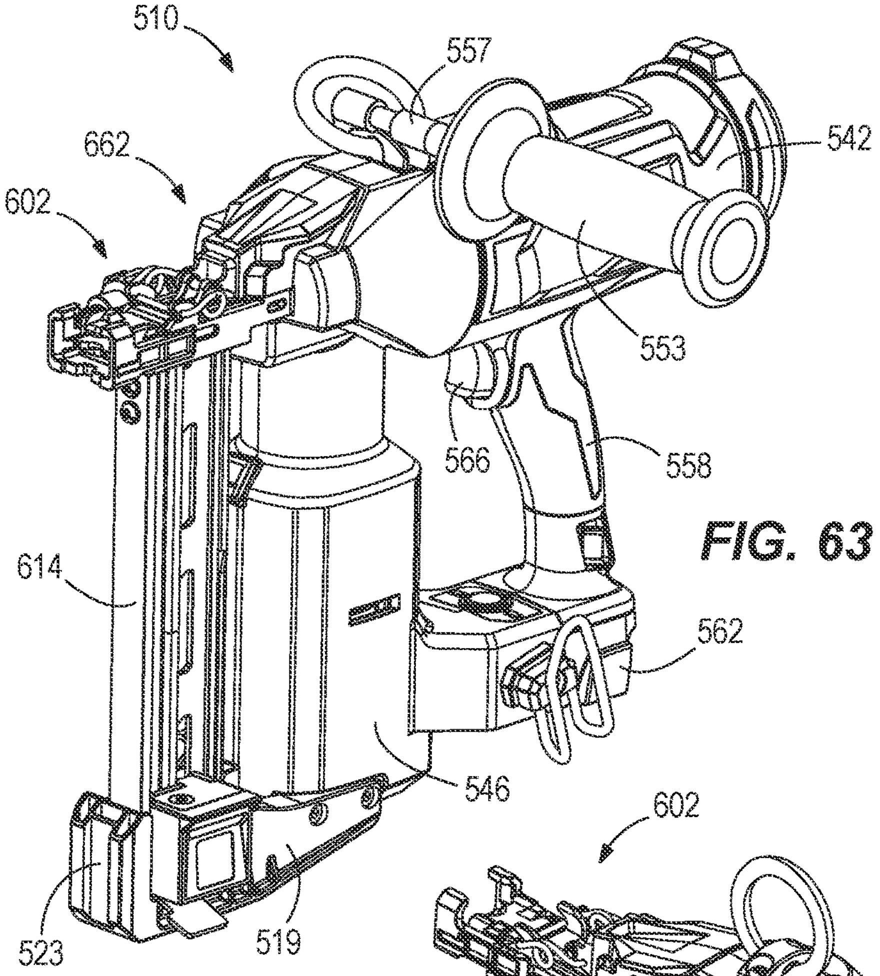
FIG. 63 is a perspective view of the powered fastener driver of FIG. 50, illustrating a secondary handle coupled to a top portion of the housing of the driver.
Figure 64:
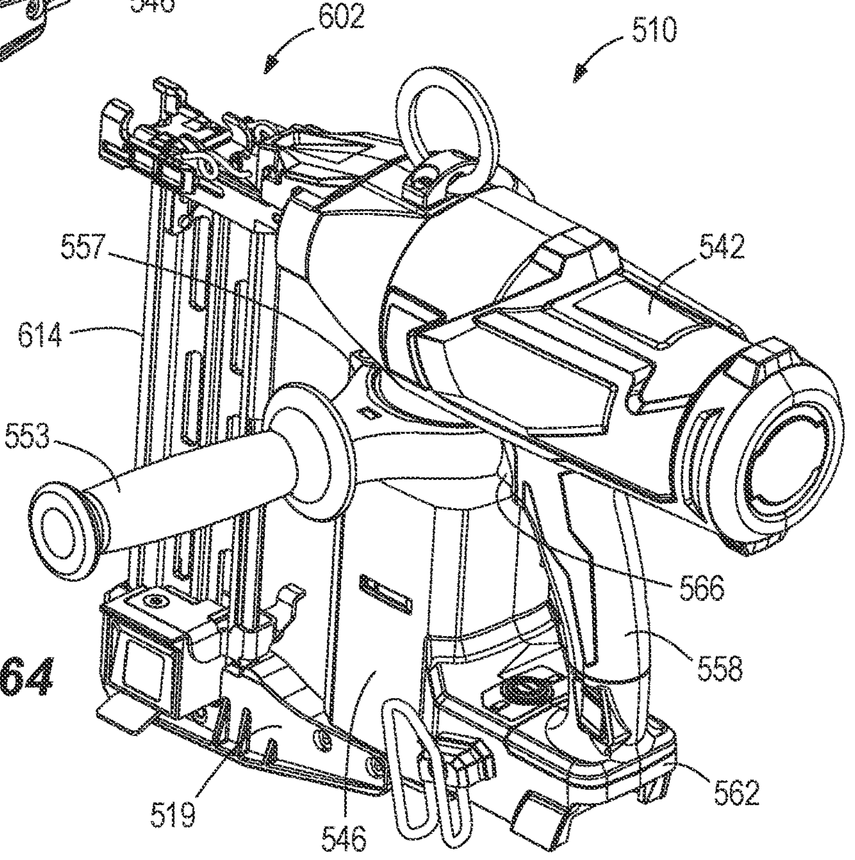
FIG. 64 is a perspective view of the powered fastener driver of FIG. 50, illustrating a secondary handle coupled to a side portion of the housing of the driver.
Figure 65:
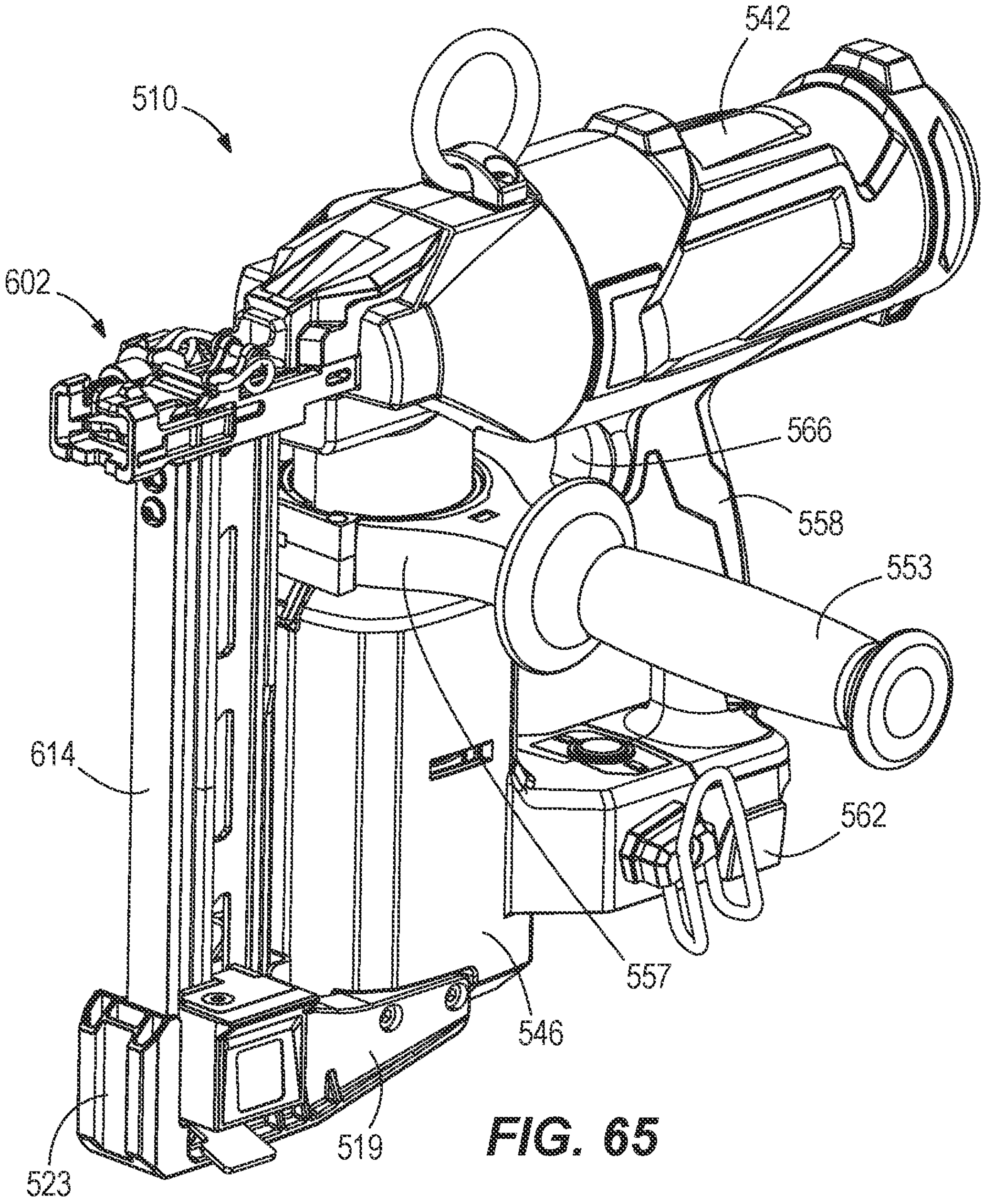
FIG. 65 is another perspective view of the powered fastener driver of FIG. 50, illustrating the secondary handle coupled to the side portion of the housing of the driver.

FIGS. 63-65 illustrate that the fastener driver 510 includes an accessory or secondary handle 553 coupled to the housing 538 of the fastener driver 510. The secondary handle 553 may be coupled to housing 538 with an attachment structure 557 (e.g., threadably coupled) supported by the housing 538. In some embodiments, the attachment structure 557 may be rigidly coupled to the housing 538. In other embodiments, the attachment structure 557 may be removably coupled to the housing 538 to allow the user to position the secondary handle 553 at a desired position. As shown in FIG. 63, the attachment structure 557 and the secondary handle 553 are coupled to a front portion of the cylinder housing portion 542. As shown in FIGS. 64 and 65, the attachment structure 557 and the secondary handle 553 are coupled to a side of the housing 538. In the illustrated embodiment, the attachment structure 557 and the secondary handle 553 are coupled to the motor housing portion 546. During operation, the user may grasp the handle portion 558 and the accessory handle 553 to reduce the amount of stress on the user.

Although the invention has been described in detail with reference to certain preferred embodiments, variations and modifications exist within the scope and spirit of one or more independent aspects of the invention as described.

What is claimed is:

1. A powered staple driver comprising:
- a housing;
- a cylinder supported within the housing;
- a drive piston supported within the cylinder;
- a drive blade attached to the drive piston, the drive piston and the drive blade movable from a top dead center (TDC) position toward a bottom dead center (BDC) position within the cylinder;
- a lifter mechanism for returning the drive piston and drive blade toward the TDC position;
- a magazine defining a fastener channel extending along a length thereof, the magazine configured to receive staples;
- a nosepiece including a staple driving channel from which consecutive staples from the fastener channel of the magazine are driven, the nosepiece includes a nosepiece base and a nosepiece cover that together form the staple driving channel, the nosepiece cover pivotably supported relative to the nosepiece base, the nosepiece cover configured to be pivoted to an open position to clear a jam in the staple driving channel, the staple driving channel extending along a driving axis; and
- a frame supported within the housing, the frame defining a cylinder support portion configured to be coupled to an end of the cylinder, a lifter housing portion configured to support the lifter mechanism, and the nosepiece base as a single piece,
- wherein the magazine obliquely extends from the nosepiece in both a first plane containing the driving axis when viewed from a side of the powered staple driver and a second plane that is perpendicular to the driving axis when viewed from a bottom of the powered staple driver,
- wherein the nosepiece base includes an elongated first guiding slot and an elongated second guiding slot, and wherein the nosepiece cover is slidable relative to the nosepiece base by sliding movement within the first and second guiding slots.

2. The powered staple driver of claim 1, wherein the fastener channel is in communication with the staple driving channel.

3. The powered staple driver of claim 1, wherein the housing defines a cylinder housing portion, a motor housing portion extending from the cylinder housing portion, and a handle portion extending from the cylinder housing portion.

4. The powered staple driver of claim 3, further comprising a motor positioned within the motor housing portion, the motor coupled to the lifter mechanism, and a battery pack electrically connectable to the motor for supplying electrical power to the motor, the battery pack coupled to handle portion.

5. The powered staple driver of claim 3, wherein the magazine is angled such that the magazine overlaps at least a portion of the motor housing portion when viewed from a side view.

6. The powered staple driver of claim 3, wherein the magazine is angled such that a majority of the motor housing portion is visible when viewed from a bottom view.

7. The powered staple driver of claim 1, wherein the cylinder support portion is threadably coupled to an inner surface of the cylinder.

8. The powered staple driver of claim 1, wherein the magazine includes a rail defining an edge portion and two opposed sidewalls adjacent the edge portion, and wherein each of the staples are configured to straddle the edge portion and the sidewalls of the rail when the staples are received in the fastener channel.

9. The powered staple driver of claim 8, wherein the magazine further includes a guide positioned along the edge portion of the rail, and wherein the staples are received on and slidable along the guide.

10. The powered staple driver of claim 1, wherein the nosepiece base includes hooks, wherein a latch mechanism is releasably coupled to the hooks and is adjustable between a latched and a released state, and wherein when the latch mechanism is in the released state, the nosepiece cover is pivotable relative to the nosepiece base.

11. The powered staple driver of claim 1, wherein the nosepiece base includes an elongated first guiding slot and an elongated second guiding slot, and wherein the nosepiece cover is slidable relative to the nosepiece base by sliding movement within the first and second guiding slots.

12. The powered staple driver of claim 11, wherein the nosepiece base further includes first and second projections, wherein the nosepiece cover includes first and second retaining members, and wherein the first and second retaining members are slidably engageable with the first and second projections, respectively.

13. The powered staple driver of claim 1, wherein the nosepiece cover is slidable in a direction parallel to the driving axis.

14. A powered staple driver comprising:

a housing;

a cylinder supported within the housing;

a drive piston supported within the cylinder;

a drive blade attached to the drive piston, the drive piston and the drive blade movable from a top dead center (TDC) position toward a bottom dead center (BDC) position within the cylinder;

a lifter mechanism for returning the drive piston and drive blade toward the TDC position;

a magazine defining a fastener channel extending along a length thereof, the magazine having a rail defining an edge portion and two opposed sidewalls adjacent the edge portion, the magazine configured to receive staples in the fastener channel, the staples configured to straddle the edge portion and the sidewalls of the rail when the staples are received in the fastener channel;

a nosepiece including a staple driving channel from which consecutive staples from the fastener channel of the magazine are driven, the nosepiece includes a nosepiece base and a nosepiece cover that together form the staple driving channel, the nosepiece cover pivotably supported relative to the nosepiece base, the nosepiece cover configured to be pivoted to an open position to clear a jam in the staple driving channel, the staple driving channel extending along a driving axis; and a frame supported within the housing, the frame defining a cylinder support portion configured to be coupled to an end of the cylinder, a lifter housing portion configured to support the lifter mechanism, and the nosepiece base as a single piece, wherein the magazine obliquely extends from the nosepiece in both a first plane containing the driving axis when viewed from a side of the powered staple driver and a second plane that is perpendicular to the driving axis when viewed from a bottom of the powered staple driver, wherein the nosepiece base includes an elongated first guiding slot and an elongated second guiding slot, and wherein the nosepiece cover is slidable relative to the nosepiece base by sliding movement within the first and second guiding slots.

15. The powered staple driver of claim 14, wherein the cylinder support portion is threadably coupled to an inner surface of the cylinder.

16. The powered staple driver of claim 14, wherein the magazine further includes a guide positioned along the edge portion of the rail, and wherein the staples are received on and slidable along the guide.

17. The powered staple driver of claim 14, wherein the nosepiece base includes hooks, wherein a latch mechanism is releasably coupled to the hooks and is adjustable between a latched and a released state, and wherein when the latch mechanism is in the released state, the nosepiece cover is pivotable relative to the nosepiece base.

18. The powered staple driver of claim 17, wherein the nosepiece base further includes first and second projections, wherein the nosepiece cover includes first and second retaining members, and wherein the first and second retaining members are slidably engageable with the first and second projections, respectively.

19. The powered staple driver of claim 14, wherein the nosepiece cover is slidable in a direction parallel to the driving axis.

20. A powered staple driver comprising:

a housing;

a cylinder supported within the housing;

a drive piston supported within the cylinder;

a drive blade attached to the drive piston, the drive piston and the drive blade movable from a top dead center (TDC) position toward a bottom dead center (BDC) position within the cylinder;

a lifter mechanism for returning the drive piston and drive blade toward the TDC position;

a magazine defining a fastener channel extending along a length thereof, the magazine configured to receive staples;

a nosepiece including a staple driving channel from which consecutive staples from the fastener channel of the magazine are driven, the nosepiece includes a nosepiece base and a nosepiece cover that together form the staple driving channel extending along a driving axis, the nosepiece base having hooks, a first projection, and second projections, a latch mechanism releasably coupled to the hooks and is adjustable between a latched and a released state, the nosepiece cover configured to be pivoted relative to the nosepiece base to an open position when the latch mechanism is in the released state to clear a jam in the staple driving channel; and a frame supported within the housing, the frame defining a cylinder support portion configured to be coupled to an end of the cylinder, a lifter housing portion configured to support the lifter mechanism, and the nosepiece base, wherein the magazine obliquely extends from the nosepiece in both a first plane containing the driving axis when viewed from a side of the powered staple driver and a second plane that is perpendicular to the driving axis when viewed from a bottom of the powered staple driver, wherein the nosepiece cover includes first and second retaining members, and wherein the first and second retaining members are slidably engageable with the first and second projections, respectively.

* * * * *